(12) United States Patent
Cho et al.

(10) Patent No.: US 10,037,130 B2
(45) Date of Patent: Jul. 31, 2018

(54) DISPLAY APPARATUS AND METHOD FOR IMPROVING VISIBILITY OF THE SAME

(71) Applicant: SAMSUNG ELECTRONICS CO., LTD., Suwon-si (KR)

(72) Inventors: Joo-yeon Cho, Seoul (KR); Min-jeong Moon, Seoul (KR); Sun-hwa Kim, Seoul (KR); Do-hyoung Kim, Suwon-si (KR); Yeon-hee Jung, Seoul (KR); Sun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 798 days.

(21) Appl. No.: 14/485,250

(22) Filed: Sep. 12, 2014

(65) Prior Publication Data

US 2015/0082162 A1    Mar. 19, 2015

(30) Foreign Application Priority Data

Sep. 13, 2013 (KR) .................. 10-2013-0110131
Mar. 5, 2014 (KR) .................. 10-2014-0025966
Aug. 12, 2014 (KR) .................. 10-2014-0104496

(51) Int. Cl.
*G06F 3/0482* (2013.01)
*G06F 3/0484* (2013.01)
(Continued)

(52) U.S. Cl.
CPC .......... *G06F 3/04842* (2013.01); *G06F 3/016* (2013.01); *G06F 3/0482* (2013.01);
(Continued)

(58) Field of Classification Search
CPC ......... G06F 3/0482; G06F 3/016; G06F 3/048
(Continued)

(56) References Cited

U.S. PATENT DOCUMENTS 6,429,846 B2 * 8/2002 Rosenberg .............. A63F 13/06
345/156
7,944,435 B2   5/2011 Rosenberg et al.
(Continued)

FOREIGN PATENT DOCUMENTS

JP        4840474 B2    12/2011
KR    10-2009-0106768 A    10/2009
(Continued)

OTHER PUBLICATIONS

Search Report dated Dec. 19, 2014 issued by the International Searching Authority in counterpart International Patent Application No. PCT/KR2014/008509 (PCT/ISA/210).

(Continued)

*Primary Examiner* — Phuong H Nguyen
(74) *Attorney, Agent, or Firm* — Sughrue Mion, PLLC

(57) ABSTRACT

A method for performing a function of a display apparatus including, displaying, in response to a first user input being received on an edge area among a plurality of edge areas of a screen, a menu on the screen, the displayed menu comprising at least one item, and performing, in response to a selection of the at least one item from the displayed menu, performing a function corresponding to the selected item, and when an item is selected from the menu, a function corresponding to the selected the at least one item, wherein the displayed menu corresponds to the edge area among the plurality of edge areas where the first user input is received, and wherein at least one other menu corresponds to at least one edge area among the plurality of edge areas where the user input was not received.

8 Claims, 92 Drawing Sheets

(51) Int. Cl.
*G06F 3/01* (2006.01)
*G06F 3/0488* (2013.01)
*G06F 3/16* (2006.01)

(52) U.S. Cl.
CPC .......... *G06F 3/04883* (2013.01); *G06F 3/167* (2013.01); *G06F 2203/014* (2013.01); *G06F 2203/04807* (2013.01)

(58) Field of Classification Search
USPC .................. 715/702, 810, 834, 835, 863
See application file for complete search history.

(56) References Cited

U.S. PATENT DOCUMENTS

| | | | | |
|---|---|---|---|---|
| 2007/0220444 | A1* | 9/2007 | Sunday | G06F 3/0488 715/788 |
| 2010/0037135 | A1* | 2/2010 | Iwase | G06F 3/0488 715/702 |
| 2011/0138275 | A1* | 6/2011 | Yu | G06F 3/04817 715/702 |
| 2011/0209093 | A1* | 8/2011 | Hinckley | G06F 3/04817 715/834 |
| 2013/0127754 | A1 | 5/2013 | Kwon et al. | |
| 2014/0007008 | A1* | 1/2014 | Baca | G06F 3/0482 715/810 |
| 2014/0282002 | A1* | 9/2014 | Mckiel, Jr. | G06F 3/167 715/727 |

FOREIGN PATENT DOCUMENTS

| | | |
|---|---|---|
| KR | 10-2011-0006251 A | 1/2011 |
| KR | 10-2011-0041231 A | 4/2011 |
| WO | 2013/094910 A1 | 6/2013 |

OTHER PUBLICATIONS

Written Opinion dated Dec. 19, 2014 issued by the International Searching Authority in counterpart International Patent Application No. PCT/KR2014/008509 (PCT/ISA/237).

\* cited by examiner

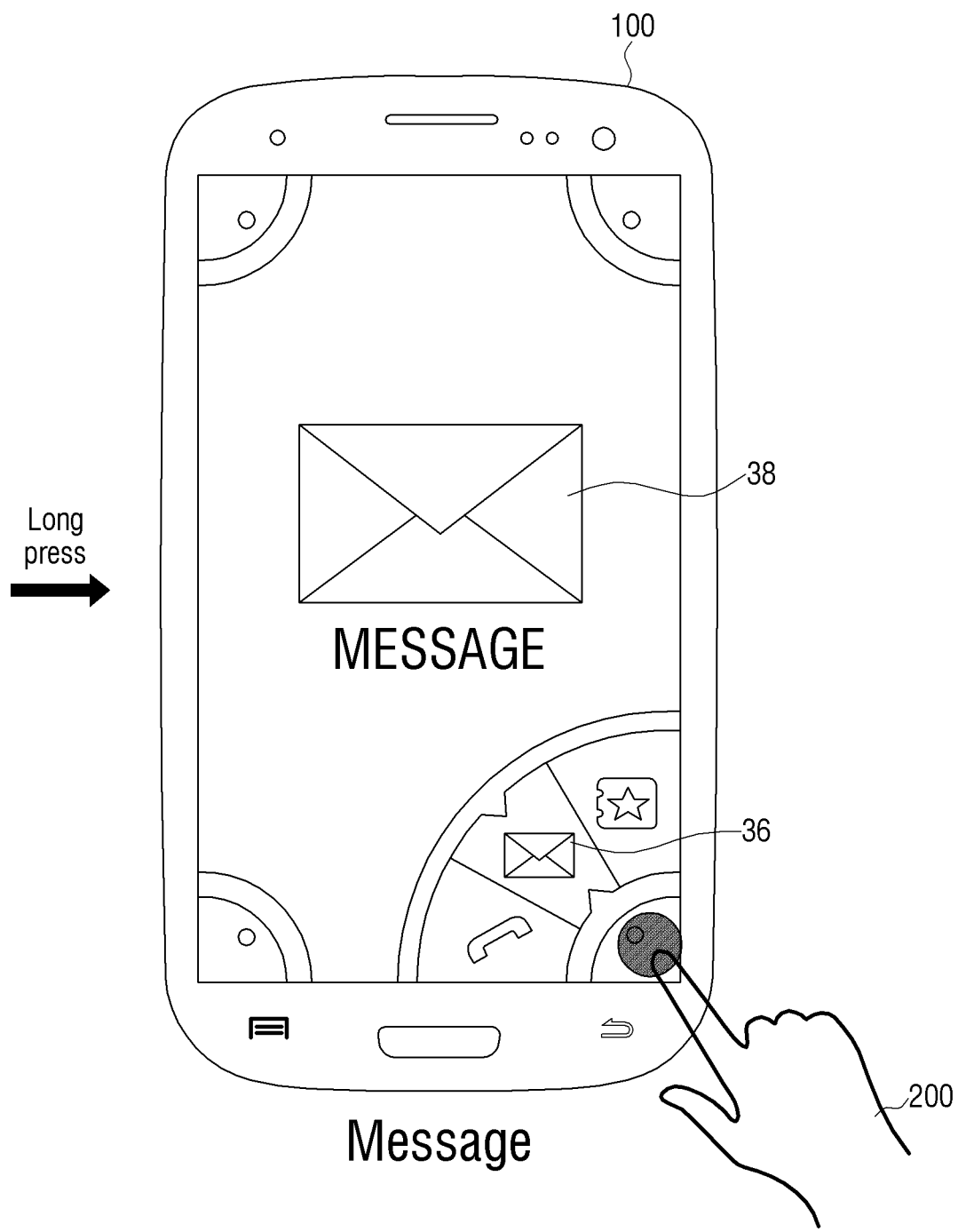

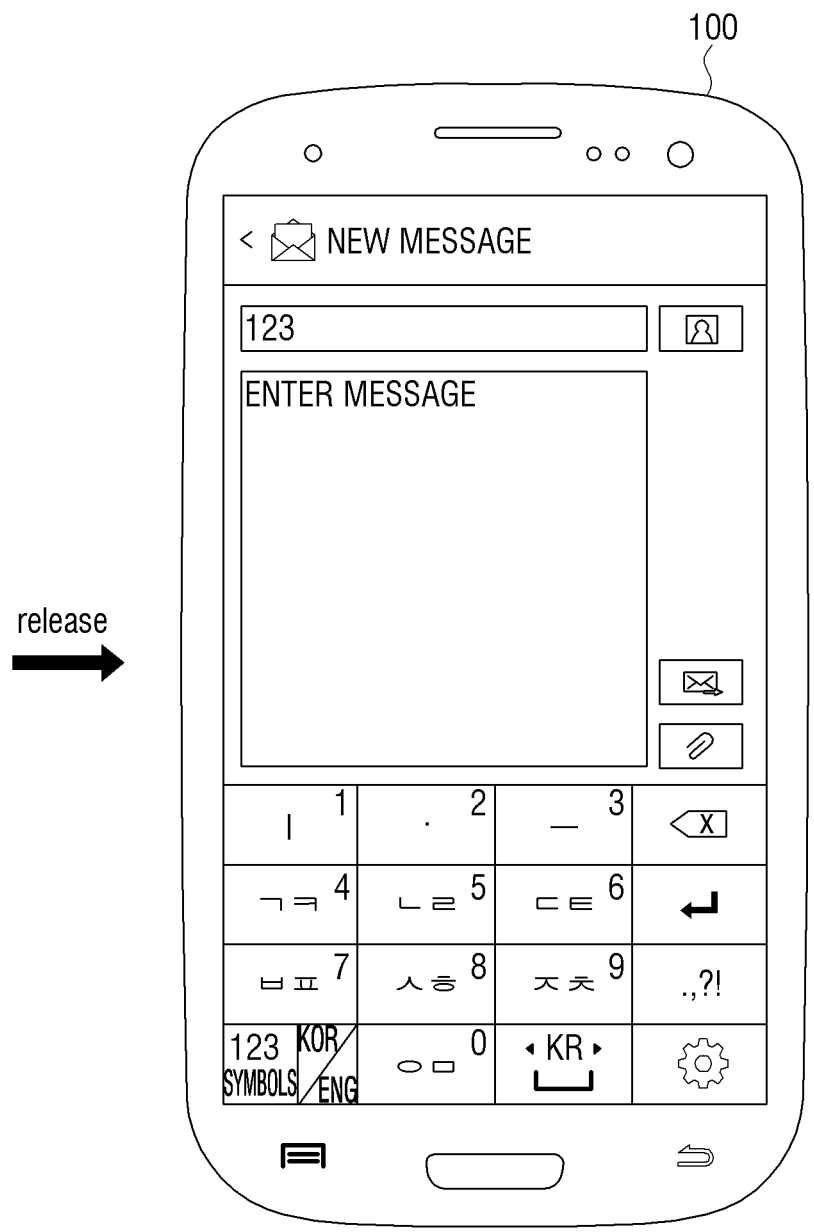

(EXECUTE)

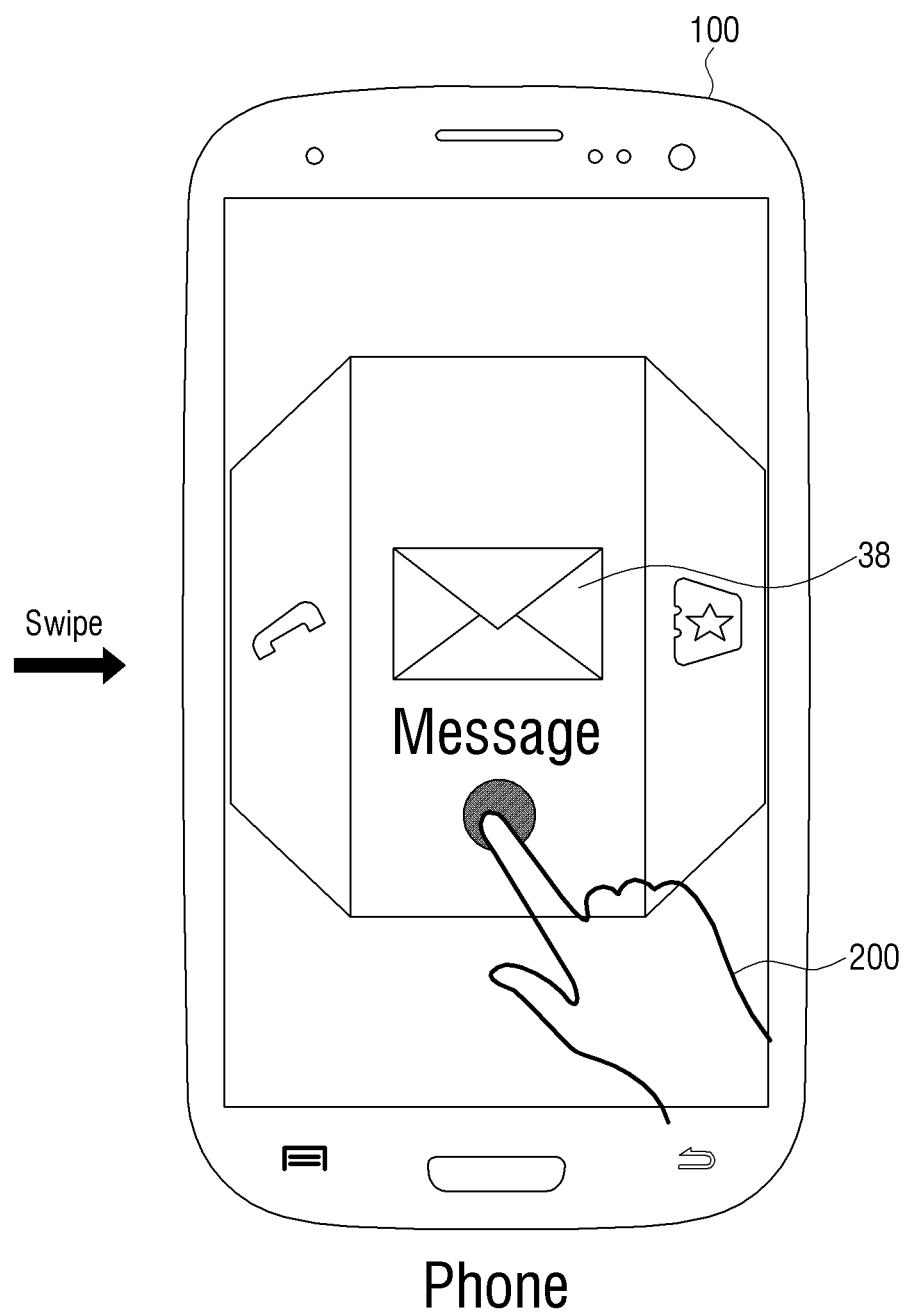

Sound 1

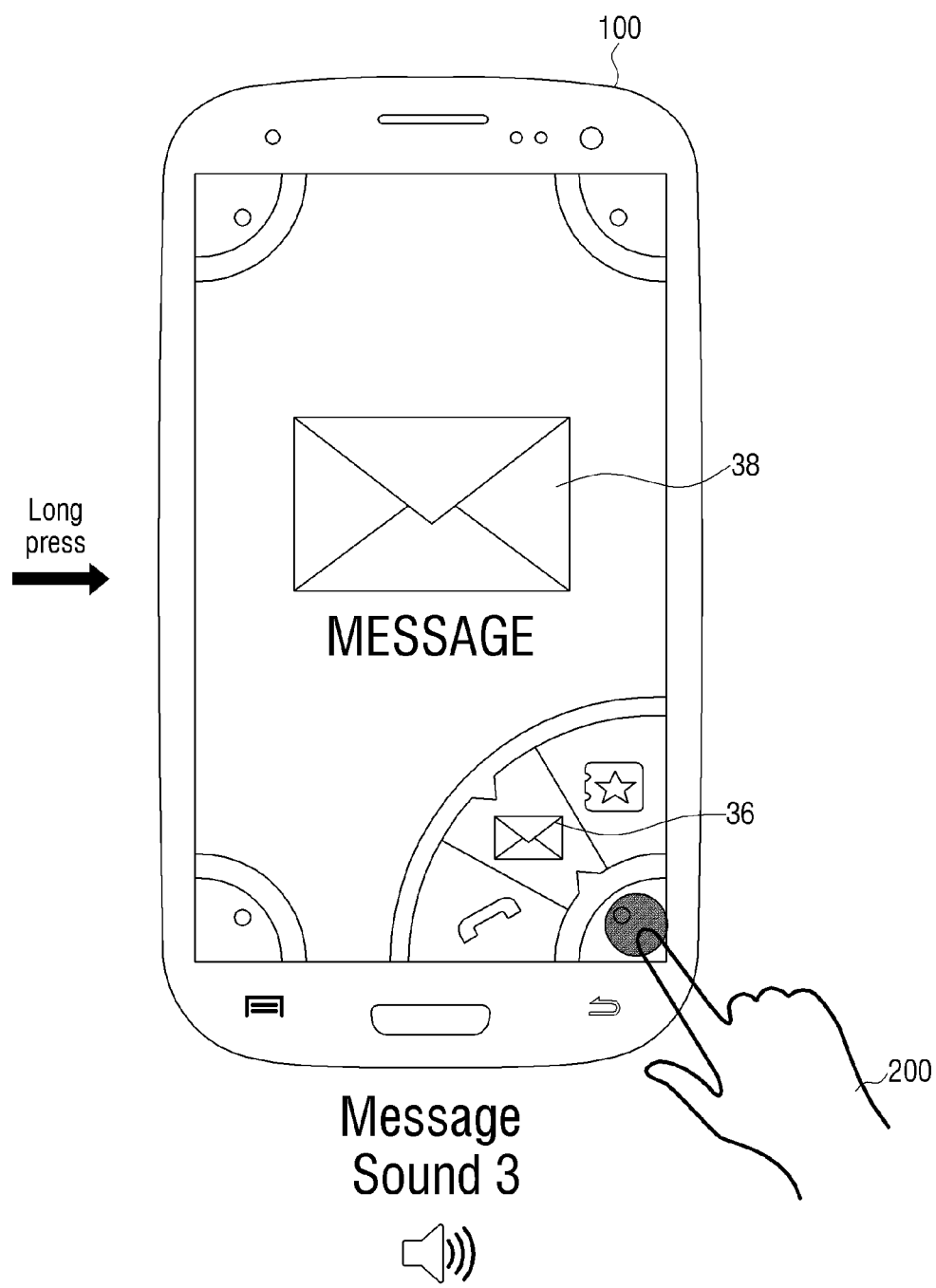

Sound 4

(EXECUTE)

Vibration 1

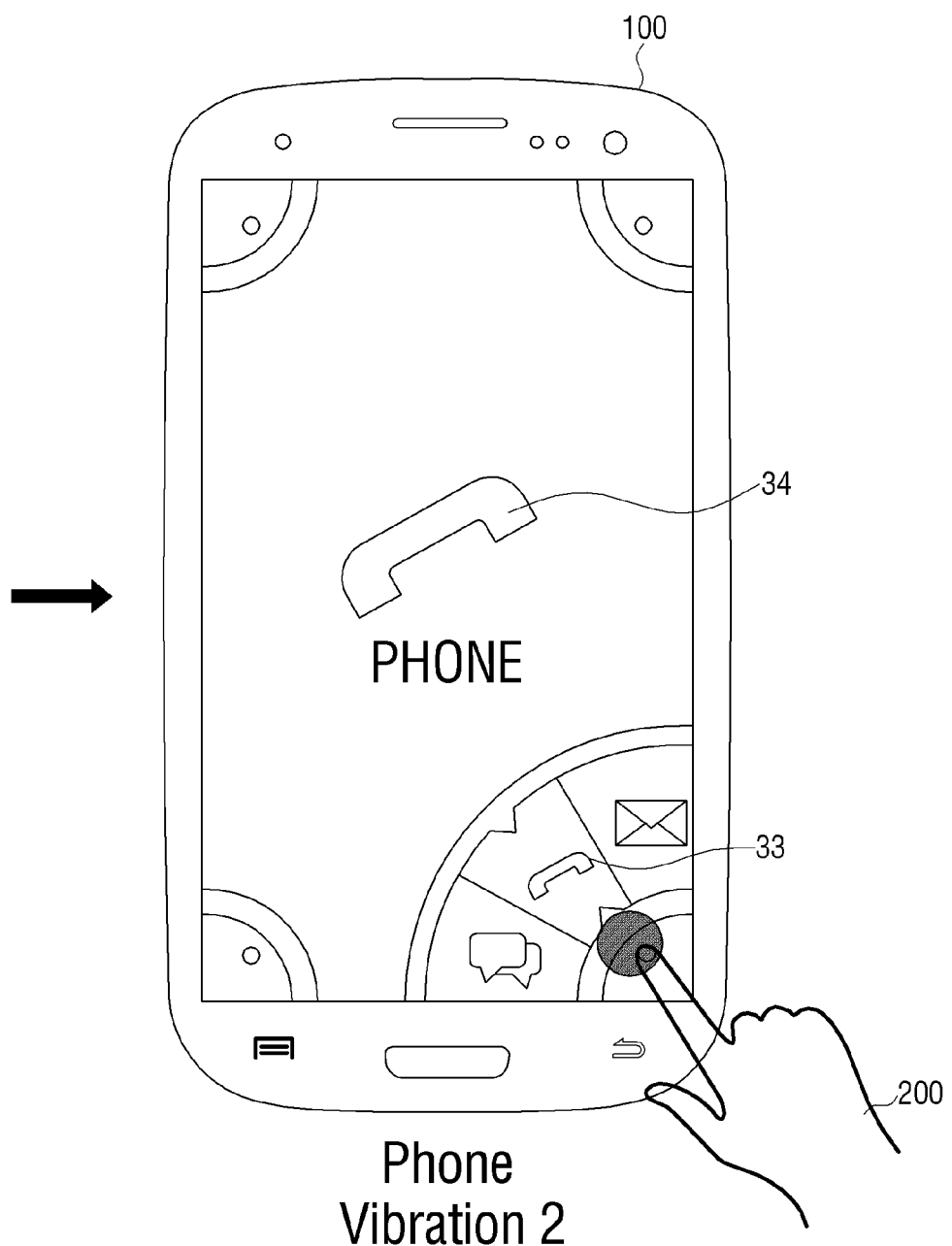

Long press →

Message
Vibration 3

Sound

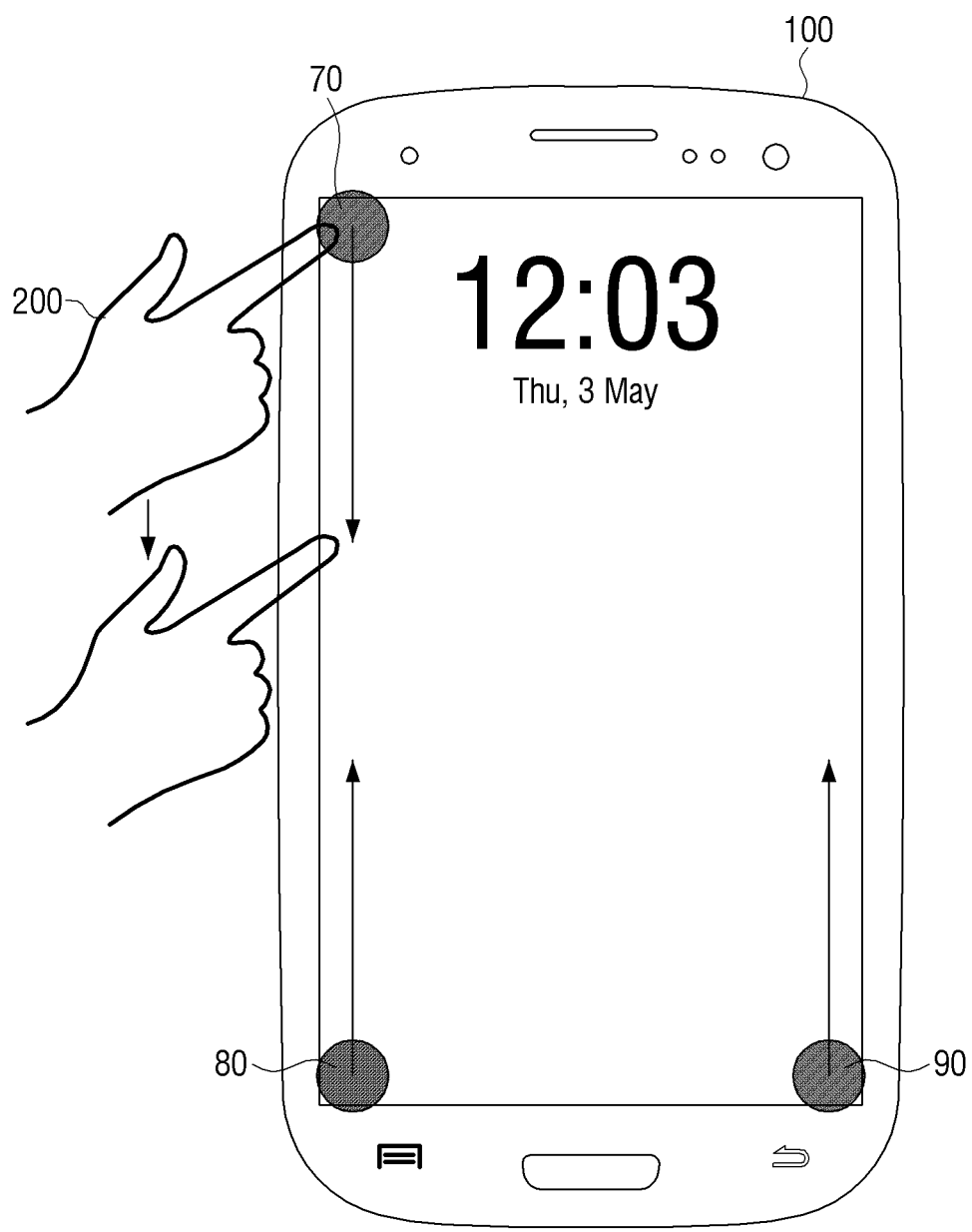

DISPLAY APPARATUS AND METHOD FOR IMPROVING VISIBILITY OF THE SAME

CROSS-REFERENCE TO RELATED APPLICATIONS

This application claims priority from Korean Patent Application No. 10-2013-0110131, filed Sep. 13, 2013, Korean Patent Application No. 10-2014-0025966, filed on Mar. 5, 2014 and Korean Patent Application No. 10-2014-0104496, filed on Aug. 12, 2014, in the Korean Intellectual Property Office, the disclosure of which is incorporated herein by reference in their entirety.

BACKGROUND

1. Field

One or more exemplary embodiments consistent with what is disclosed herein relate to an interface of a display apparatus, and more particularly, to a display apparatus configured to perform function of a display apparatus with a variety of functions using an interface that is easier and more intuitive to use, and a method for performing function of a display apparatus.

2. Description of the Related Art

Demands for convergence apparatus, which integrates therein functions of a variety of individual apparatuses, have recently increased. For example, a smart phone provides a camera module which can be used to replace a digital camera, or a web browser that is similar to that of desktop computer. Smart phones also provide a variety of applications to perform functions of a digital frame, an electronic dictionary, an MP3 player, a scheduler, or email transmission and reception.

As the functions of the electronic apparatus become more complex, the need for easier and more intuitive user interface increases. This has to enable users to access various and complex functions of the electronic apparatus with increased ease.

One representative example of a user interface is a window-type interface. The window-type interface, which is adopted by most recent electronic apparatuses, implements user interactions through menu icons on a touch screen.

The window type interface executes a corresponding application in response to a touch inputted by a user on a menu icon displayed on the touch screen. This type of interface, however, has a shortcoming. That is, the size is limited due to limited screen size, and the number of menu icons that can be displayed on a screen is also limited to ensure that the menu icons are identifiable. However, the number of menu icons increases as the electronic apparatus provides more functionality. When there are many menu icons to be displayed, the menu icons can be divided into several screens. However, a user may have difficulty of executing the intended function, as he has to switch between screens until he finally locates the menu icon of the intended function.

Meanwhile, a visually-impaired user may have particular difficulty using this type of interface whose use is not based on physical stroke keys, because the interface lacks a braille system. Accordingly, a consideration is required for those who are visually-impaired to separately design interface for them to use a display apparatus.

For example, a method is necessary, which can execute functions of the display with the use of an interface that is more intuitive to use on the display apparatus with complex functions, and that takes users with impaired vision into consideration.

SUMMARY

One or more exemplary embodiments overcome the above disadvantages and other disadvantages not described above. However, exemplary embodiments are not required to overcome the disadvantages described above, and an exemplary embodiment may not overcome any of the problems described above.

According to one or more exemplary embodiments, there is provided a method for performing a function of a display apparatus which has a complex of functions, through an interface which is easy and intuitive to use and which is provided in consideration of a visually-impaired user and a display apparatus In one or more exemplary embodiments, a method for performing a function of a display apparatus is provided, which may include displaying, in response to a first user input being received on an edge area among a plurality of edge areas of a screen, a menu on the screen; and performing, in response to a selection of an item from the displayed menu, a function corresponding to the selected item, wherein the displayed menu corresponds to the edge area among the plurality of edge areas where the first user input is received, and wherein at least one other menu corresponds to at least one edge area among the plurality of edge areas where the user input was not received.

The method may additionally include outputting, in response to receiving the first user input, a voice message corresponding to the first user input. The method may additionally include outputting, with a talkback function being set, a voice message corresponding to a received second user input. The received second user input may include a single tap touch.

Further, with talkback a function being set, the method may additionally include performing a function corresponding to a received second user input, the received second user input including a multi-tap touch.

The method may additionally include generating, in response to a user input being received, a haptic vibration. The haptic vibration may correspond to the edge area among the plurality of edge areas that received the first user input.

The method may additionally include highlighting, in response to the second user input, an object displayed on the screen. The second user input may be a single tap touch and may correspond to the object.

The method may additionally include outputting, in response to a second user input being received, haptic vibration. The second user input may correspond to the selection of the item from the displayed menu.

At least one edge area among the plurality of edge areas of the screen may include a corner area.

The method may include setting, in response to a second user input of a multi-tap touch received with respect to at least one edge area among the plurality of edge areas, a talkback function.

At least one edge area among the plurality of edge areas may include a side location of the screen corresponding to at least one of a home button and a speaker of the display apparatus.

The method may additionally include displaying, on at least one edge area among the plurality of edge areas of the screen, a guide object corresponding to the corresponding menu on the edge area of the screen, and removing the displayed guide object from the screen in response to a user input which may be a preset touch gesture received to the screen.

At least one edge area among the plurality of edge areas of the screen may include a center of a side of the screen, and the method may include performing, in response to a second user input of a multi-tap touch received with respect to at least one edge area among the plurality of edge areas, a function corresponding to the received user input, wherein the function corresponds to the number of taps of the multi-tap touch.

In one or more exemplary embodiments, a method for performing a function of a display apparatus may include receiving a first drag input beginning from a first corner area of the screen, receiving a second drag input beginning from a second corner area of the screen, perceiving a pattern combining the first and second drag inputs, matching the perceived pattern with a password pattern, and unlocking the screen of the display in response to a result of the matching.

The first and second drag inputs may include at least one from among upward, downward, leftward, and rightward drag inputs.

In one or more exemplary embodiments, a method for performing a function of a display apparatus may include receiving a drag input beginning from a corner area among a plurality of corner areas of the screen, and executing a preset application in response to the received drag input, wherein the preset application corresponds to the corner area among the plurality of corner areas that received the drag input.

The plurality of corner areas of the screen may include a first corner area and a second corner area, and the executing the preset application may include executing, in response to receipt of a drag input beginning from the first corner area, a phone book application, and executing, in response of a drag input beginning from the second corner area, a schedule application.

The method may additionally include displaying, in response to receiving a touch input for a preset time or longer on at least one corner area among the plurality of corner areas while the screen of the display apparatus is in a locked state, items relevant to the information received at the display apparatus.

The method may additionally include removing, in response to the touch input being ceased, the items relevant to the information received at the display apparatus and displaying a screen lock image.

The relevant items to the information received at the display apparatus may include at least one from among message alarm information, call alarm information and e-mail alarm information.

The relevant items to the information received at the display apparatus may be associated with data that is received from an external device within a preset time period.

The method may additionally include, in response to touch or approach input to the displayed item, outputting a voice message or haptic vibration with respect to the item.

In one or more exemplary embodiments, a display apparatus may be provided, the display apparatus may include: a display including a screen, the screen including a plurality of edge areas; and a controller configured to control the display to, in response to a first user input being received on an edge area among the plurality of edge areas of a screen, display a menu on the screen, and configured to, in response to a selection of an item from the displayed menu, control the performance of perform a function corresponding to the selected item. The displayed menu may correspond to the edge area among the plurality of edge areas that received the first user input.

The display apparatus may further include a speaker. The controller may be further configured to, in response to the first user input being received, control the speaker to output a voice message corresponding to the first user input The display apparatus may further include a vibrator. The controller may be further configured to, in response to the first user input being received, control the vibrator to generate a haptic vibration. The haptic vibration may correspond to the edge area among the plurality of edge areas that received the first user input.

The controller may be further configured to, when the display apparatus is in a locked mode, perceive a pattern of a plurality of drag inputs received by the display apparatus, compare the perceived pattern with a password pattern, and unlock the display apparatus in response to the comparison.

The controller may further configured to, in response to a drag input being input to the screen of the display apparatus, control the execution of a preset application. The preset application may correspond to at least one of the location and direction on the screen of the received drag input.

According to various exemplary embodiments, a display apparatus with complex functions, is provided, whose use is easy and intuitive, and even visually-impaired user can execute the functions of the display apparatus with the user-friendly interface.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIGS. 4A to 4D are views illustrating a graphic user interface (GUI) for selecting an item of a menu according to an exemplary embodiment;

FIGS. 6A to 6D are views illustrating a GUI for selecting an item of a menu according to another exemplary embodiment;

FIGS. 7A to 7D are views illustrating an operation of a display apparatus outputting voice message according to an exemplary embodiment;

FIGS. 9A to 9D are views illustrating an operation of a display apparatus outputting a variety of vibrations according to an exemplary embodiment;

FIGS. 23A to 23C are views illustrating unlock functions according to an exemplary embodiment;

DETAILED DESCRIPTION OF EXEMPLARY EMBODIMENTS

Figure 1A:
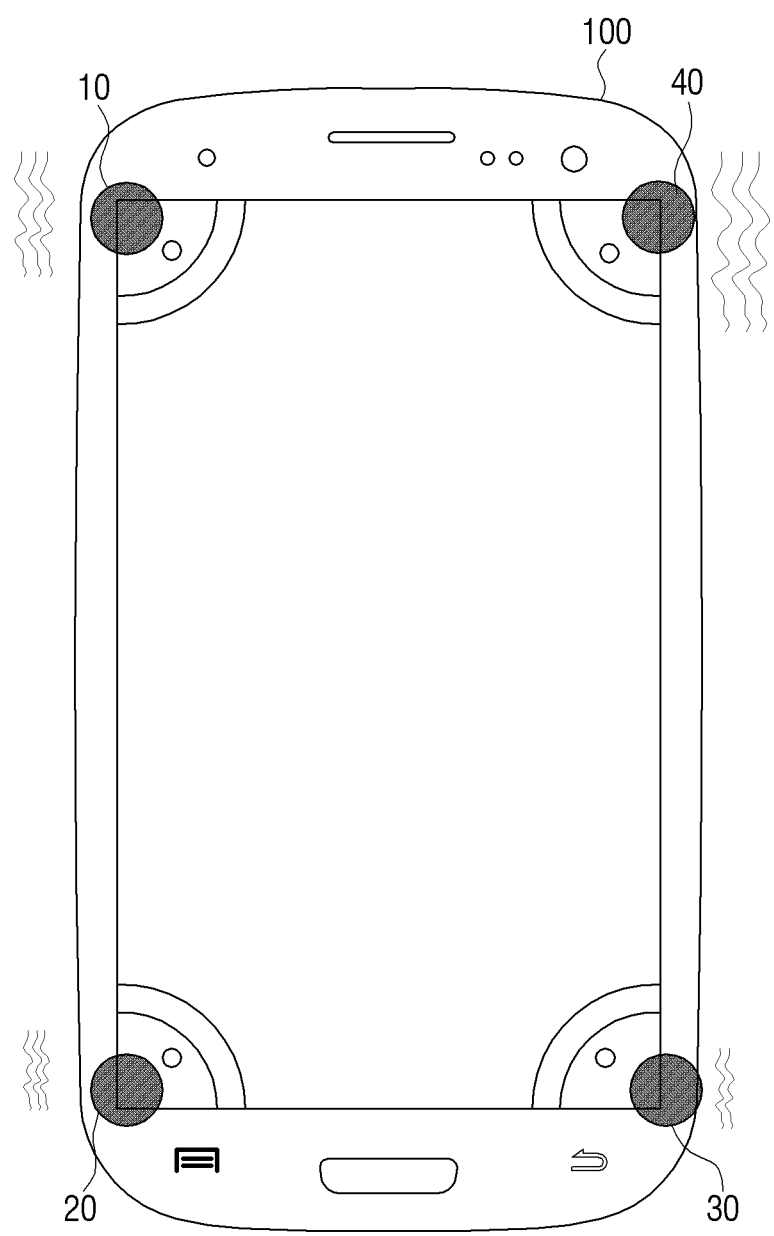
FIGS. 1A and 1B are reference views illustrating an interface of a display apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments can be carried out without those specifically defined matters. Also, well-known functions or constructions are not described in detail since they would obscure the disclosure with unnecessary detail.

Figure 1B:
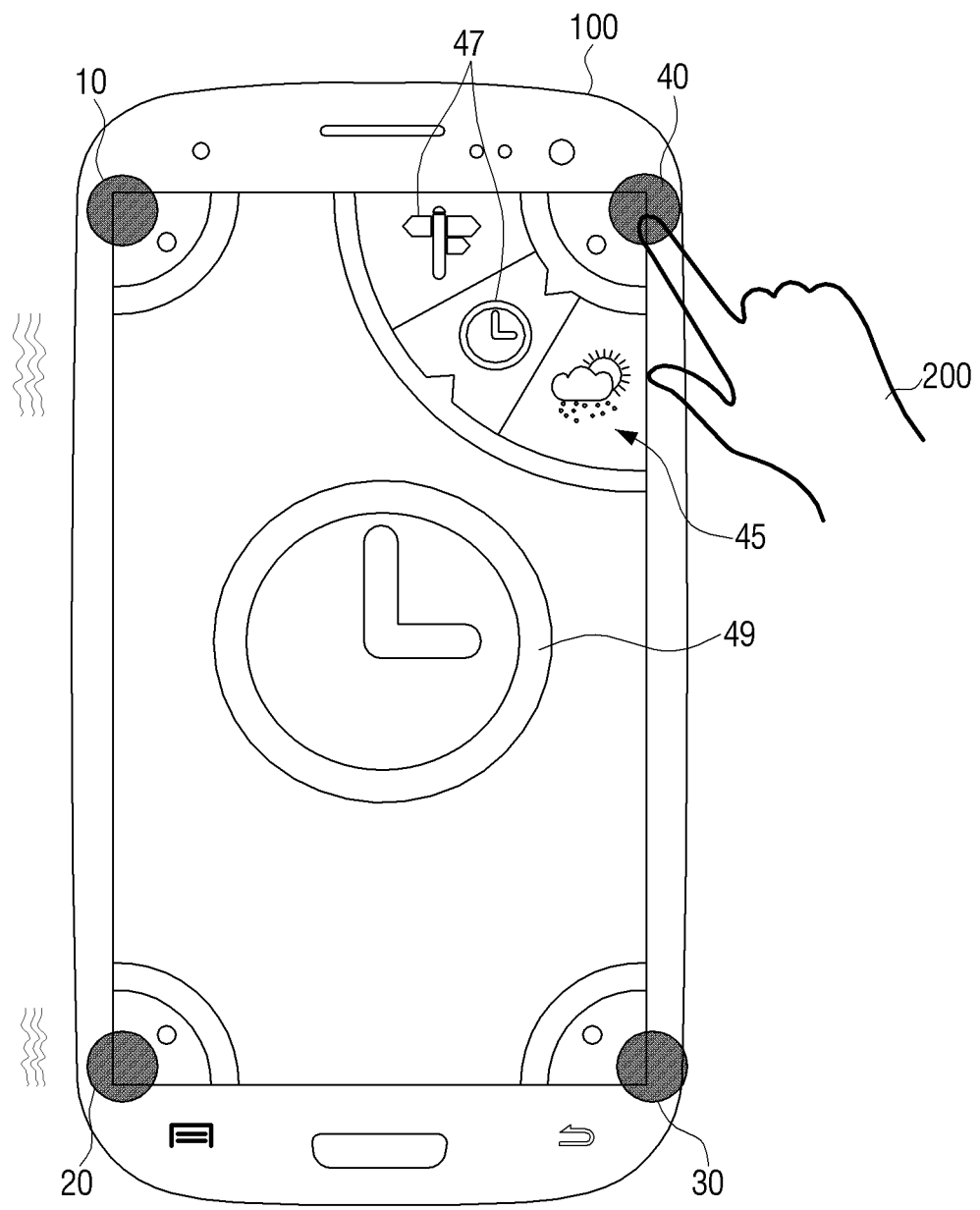

FIGS. 1A and 1B are reference views illustrating an interface of a display apparatus according to an exemplary embodiment.

Referring to FIG. 1A, the display apparatus 100 may receive a touch input through corner areas 10, 20, 30, and 40 of a screen. The corner areas of the display apparatus 100 may be those of the most accurate positions of the display apparatus where user can feel. That is, corner areas are one of the more accurate areas of the display apparatus 100 where even visually-impaired users can easily locate. Accordingly, the corner areas 10, 20, 30, and 40 may be the reference positions to receive user commands.

The corner areas 10, 20, 30, and 40 may be distinguished from each other so that user inputs received through the respective corner areas 10, 20, 30, and 40 may be regarded as different user inputs. That is, the first, second, third, and fourth corner areas 10, 20, 30, and 40, respectively may receive distinguishable user inputs from each other. In response to a user input being received through the corner areas 10, 20, 30, and 40, referring to FIG. 1A, the display apparatus 100 may generate respectively distinguishable haptic vibrations from each other. Feeling different haptic vibrations, the user knows which of the corner areas 10, 20, 30, and 40 of the display apparatus 100 he is currently touching.

Figure 2:
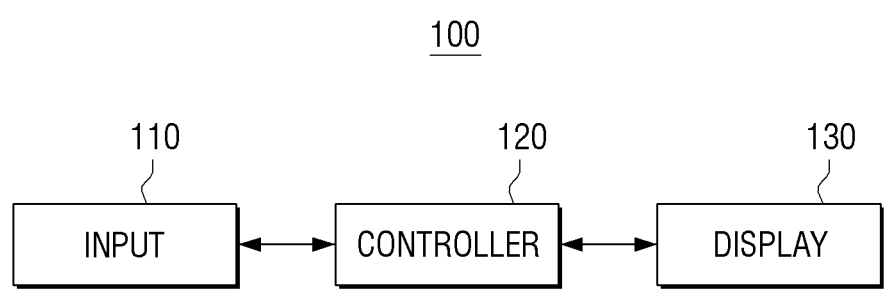
FIG. 2 is a block diagram of a display apparatus according to an exemplary embodiment.

Referring to FIG. 1B, in response to a user's touch input being made by a user object 200 on the corner area 40, a menu 45 is displayed on the screen. To distinguish an error from a user's touch input, it is considered that the user input is received only when the touch lasts a preset period of time. The user object 200 may be a human body part, such as a finger a hand as illustrated in FIG. 2, but not limited thereto. As non-limiting examples, the user object 200 may be a stylus pen or any other object that can conduct touch input. The menu 45 may include a plurality of menu items 47. When selected, the menu item 49 may be displayed at a center of the screen, as illustrated in FIG. 1B, although this may be optional. This will be explained in more detail below.

Before explaining various exemplary embodiments, one or more elements of the display apparatus 100 according to an exemplary embodiment will be described.

FIG. 2 is a block diagram of a display apparatus 100 according to an exemplary embodiment.

Referring to FIG. 2, the display apparatus 100 may include an inputter 110, a display 130 and a controller 120.

The inputter 110 is configured to receive user input. The inputter 110 may include a touch screen module (not illustrated) and a proximity sensor module (not illustrated). The touch screen module senses variation in electric field in response to a user's touch input being received on the touch screen. Then the object display at a location on the screen that corresponds to the user input coordinates is altered. The final display may appear in an altered form throughout the entire screen. Likewise, the proximity sensor module senses variation in an electric field in response to an approaching user object. Then the object display at a location on a screen corresponding to the user input coordinates is altered. The final display may appear in an altered form throughout the entire screen.

The inputter 110 may distinguish respective corner areas of the display apparatus 100. That is, the corner areas may be distinguished into a first corner area which is on left-upper position of the display apparatus 100, a second corner area which is on left-lower position, a third corner area which is on right-upper position, and a fourth corner area which is on right-lower position. The user touch inputs to the respective corner areas are thus distinguished from each other.

The types of user inputs received through the inputter 110 may be defined in various manners.

Table 1 below describes some of the user input types provided only as an example. Accordingly, different or additional definitions than those in the below table are also applicable.

TABLE 1

| User touch input type | Definition |
| --- | --- |
| Tab | a <= touch time < b |
| Long press | b <= touch time |
| Double tab | a <= 1st touch time < b, <br> a <= 2nd touch time < b <br> Interval between 1st touch time and 2nd touch time < c |
| Swipe | Simultaneous touching on two or more adjacent pixels <br> Moving touch area relative to adjacent pixel |
| Approach | Sensing by proximity sensor <br> Sensing by touch sensor x |

The controller 120 controls the overall operation of the display apparatus 100.

Under the control of the controller 120, the inputter 110 receives user input through the corner area and processes the input. The controller 120 also controls the display 130 to display a menu on a screen. To be more specific, the controller 120 controls the display so that the menu displayed on the screen varies, depending on the location where the user input is received. That is, in response to a user input being received at the first corner area, the controller 120 controls the display so that the first menu is displayed, or in response to a user input being received at the second corner area, the controller 120 controls the display so that the second menu is displayed, or in response to a user input being received at the third corner area, the controller 120 controls the display so that the third menu is displayed, or in response to a user input being received at the fourth corner area, the controller 120 controls the display so that the fourth menu is displayed. This will be explained in greater detail below with reference to the drawings.

Further, in response to a user input, the controller 120 may control the vibration module (not illustrated) to perform haptic output. The vibration module may include an actuator including an elastic member, and may use, as non-limiting examples, a coin type vibration motor, an eccentric shaft motor, or a voice coil.

The controller 120 may include a hardware constitution such as a micro processing unit (MPU), a central processing unit (CPU), a Cache memory or a data bus, and a software constitution such as an operating system, or an application to perform a specific purpose. Depending on system clock, a control command with respect to respective constituents for the operation of the display apparatus 100 may be read from the memory and in response to such read control command, an electric signal is generated to operate the respective constituents of the hardware.

In response to an item being selected from the menu, the controller 120 may perform a function that corresponds to the selected item. The controller may implement the application of the function that corresponds to the selected item, generate process, load the same on the memory and perform job scheduling.

The display 130 is configured so that in response to a user input being received through a corner area of the screen, the display 130 displays a menu on the screen. The display 130 may display not only the menu that includes a plurality of items, but also an interface screen to perform a corresponding function to an item as selected.

The display 130 may display a screen that includes a variety of other objects than those mentioned above. The 'object' as used herein refers to an image that is displayed on the screen corresponding to a specific function or content. The display 130 may display one whole image, and one whole image may include one or more objects.

As non-limiting examples, an object may be one or more of application icon, content icon, thumbnail image, folder icon, widget, list item, menu or content image. The 'application icon' executes an application included in the display apparatus 100 in response to selecting of a corresponding image. The 'content icon' plays back content in response to selecting of a corresponding image. The 'thumbnail image' is a reduced representation of an image to allow a user to notice the same at a glance, and the 'folder icon' displays a file in a folder in response to selecting of a corresponding image. The 'widget' is an icon that provides a user interface to instantly execute the application icon, thus saving several steps of selecting menus. The 'list item' represents files in a list form, and the 'menu image' represents menus available for selection.

The display 130 may be designed with a variety of display panels. That is, the display 130 may adopt a variety of display technologies including, as non-limiting examples, organic light emitting diodes (OLED), liquid crystal display (LCD) panel, plasma display panel (PDP), vacuum fluorescent display (VFD), field emission display (FED), or electro luminescence display (ELD). The display panel may be a light emitting type, but not limited to thereto. Accordingly, a reflective type display such as E-ink, P-ink, or photonic crystal is not excluded. Further, the display panel may be implemented as a flexible display or a transparent display. Further, the display apparatus 100 may be implemented as a multi display apparatus 100 that includes two or more display panels.

The display apparatus 100 includes essential components that are required for an electronic calculating apparatus. That is, in addition to a CPU with sufficient control and calculation ability, the display apparatus 100 may additionally include high capacity memory apparatus such as hard disk or Blu-ray disk, an output apparatus such as a speaker, a wired/wireless communication module including a local area communication module, HDMI, USB, or various other terminals, a motion sensor, an image sensor, a GPS module, or hardware component such as a chassis.

The display apparatus 100 may be implemented as a variety of electronic apparatuses. In one embodiment, the display apparatus 100 may be implemented as a variety of mobile devices such as, as non-limiting examples, a smart phone, a tablet PC, a smart watch, a PMP, an MP3 player, a PDA, a cellular phone, or other mobile terminals.

Hereinbelow, a menu item of a display apparatus 100 according to an exemplary embodiment will be explained.

FIGS. 3A to 3D are views illustrating various menu items of a display apparatus 100 according to an exemplary embodiment.

Figure 3A:
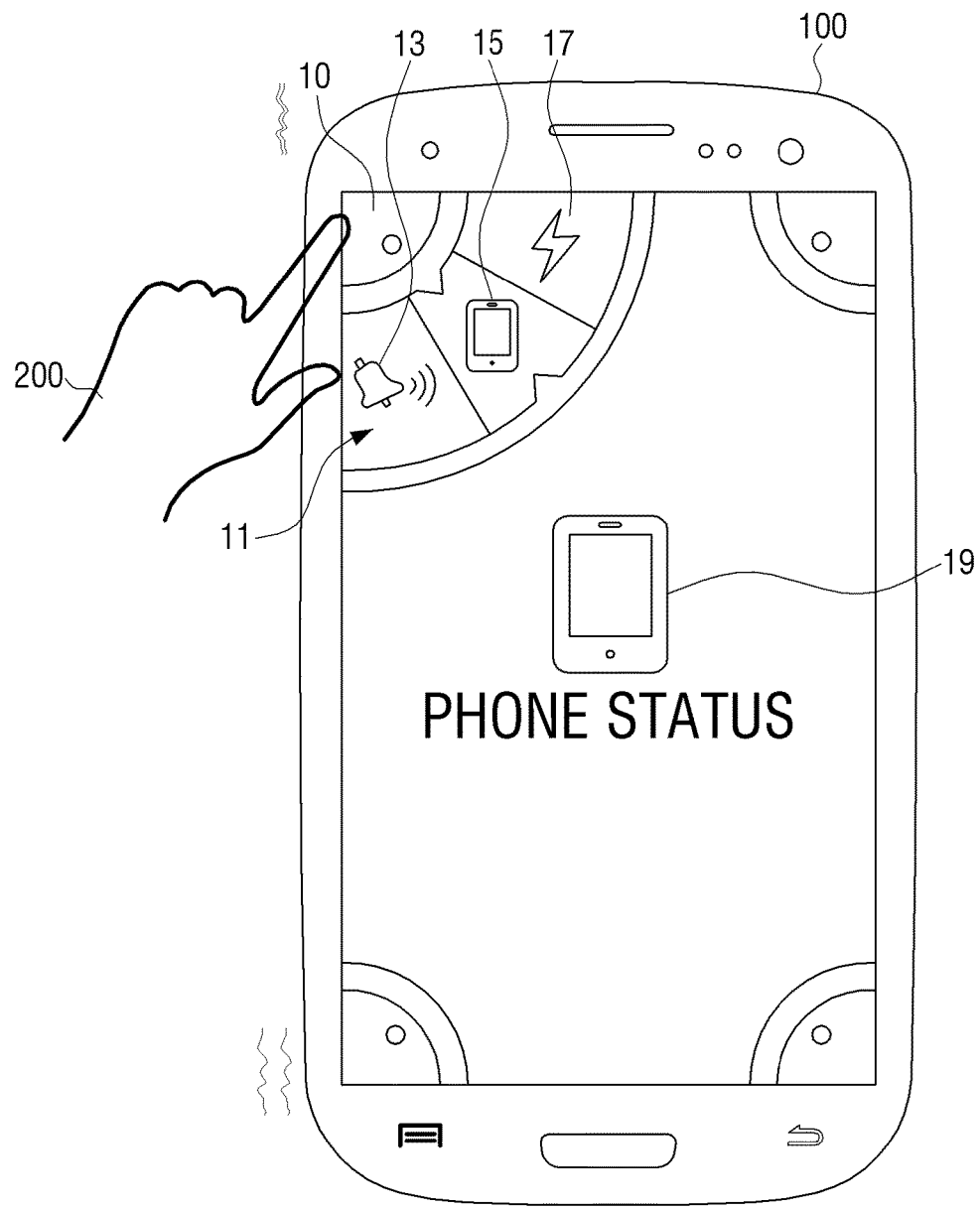
FIGS. 3A to 3D are views illustrating various menu items of a display apparatus according to an exemplary embodiment.

Referring to FIG. 3A, in response to a user touch inputted by a user object 200 on a first corner area 10, a menu 11 is displayed. The menu 11 relates to phone information. The menu 11 may include a phone status item 15 which shows remaining battery amount, a notification item 17 which shows presence/absence of newly-arrived notification message, or an alert alarm item 13 which notifies a user at a preset time.

Further, referring to FIG. 3A, a selected item 19 or an item 19 to be selected may be displayed at a center of the screen. As this increases visibility, it helps a user to recognize exactly which item is selected or which item is to be selected. The item may be highlighted to further increase visibility.

Figure 3B:
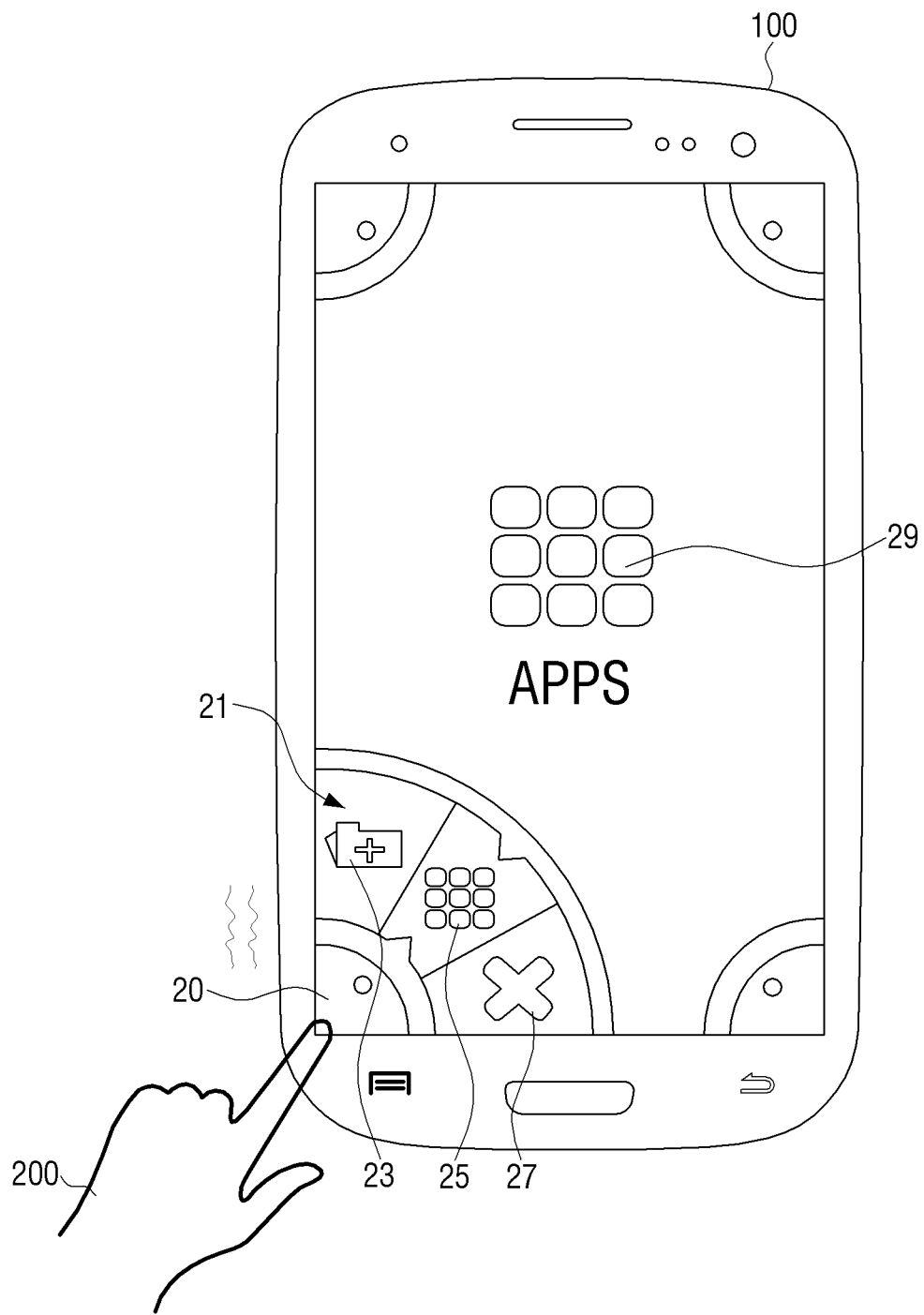

Referring to FIG. 3B, in response to a user touch inputted by the user object 200 on the second corner area 20, menu 21 is displayed. The menu 21 relates to customization information. The menu 21 may include an app item 25 representing a list of applications of the display apparatus 100, a create folder item 23 to add folders, or a delete item 27 to delete applications. Although not illustrated in FIG. 3B, an item to add an application may additionally be included.

Further, referring to FIG. 3B, a selected item 29 or an item 29 to be selected may be displayed at a center of the screen. As this increases visibility, it helps a user to recognize exactly which item is selected or which item is to be selected. The item may be highlighted to further increase visibility.

Figure 3C:
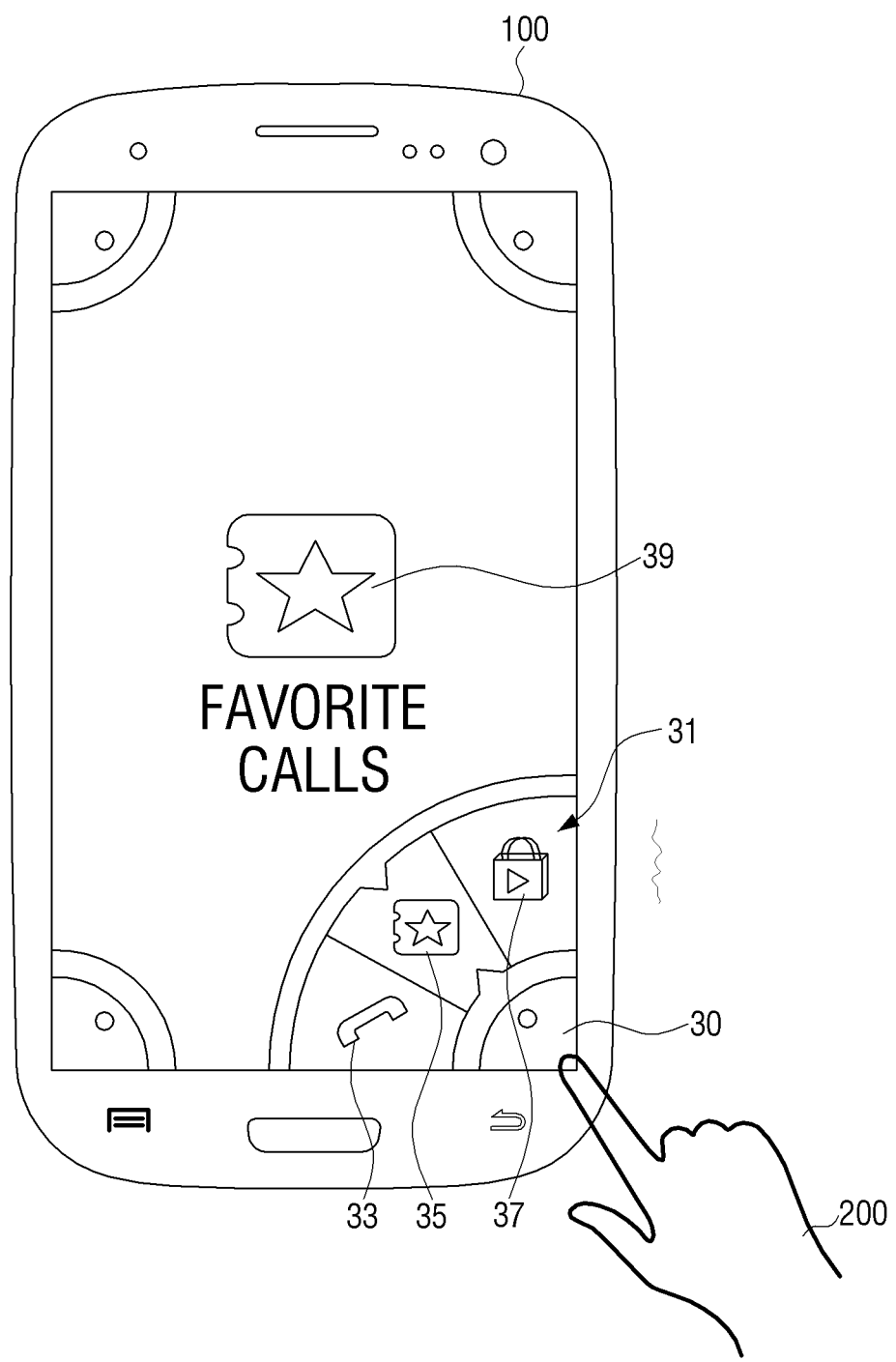

Referring to FIG. 3C, in response to a user touch inputted by the user object 200 on the third corner area 30, menu 31 is displayed. The menu 31 relates to main information. The menu 31 may include a call item 33 to make a call, a favorite call item 35 to find favorite calls, or a play store item 31 to execute an application to download applications. Although not illustrated in FIG. 3C, the menu 31 may additionally include an item to execute a text messaging function, an item to set an alarm, an item to set up a phone, an item to perform voice recording, an item to access the internet, an item to transmit or receive e-mails, an item to start a camera, an item to use a planner function, or an item to start a music player.

Referring to FIG. 3C, a selected item 39 or an item 39 to be selected may be displayed at a center of the screen. As this increases visibility, it helps a user to recognize exactly which item is selected or which item is to be selected. The item may be highlighted to further increase visibility.

Figure 3D:
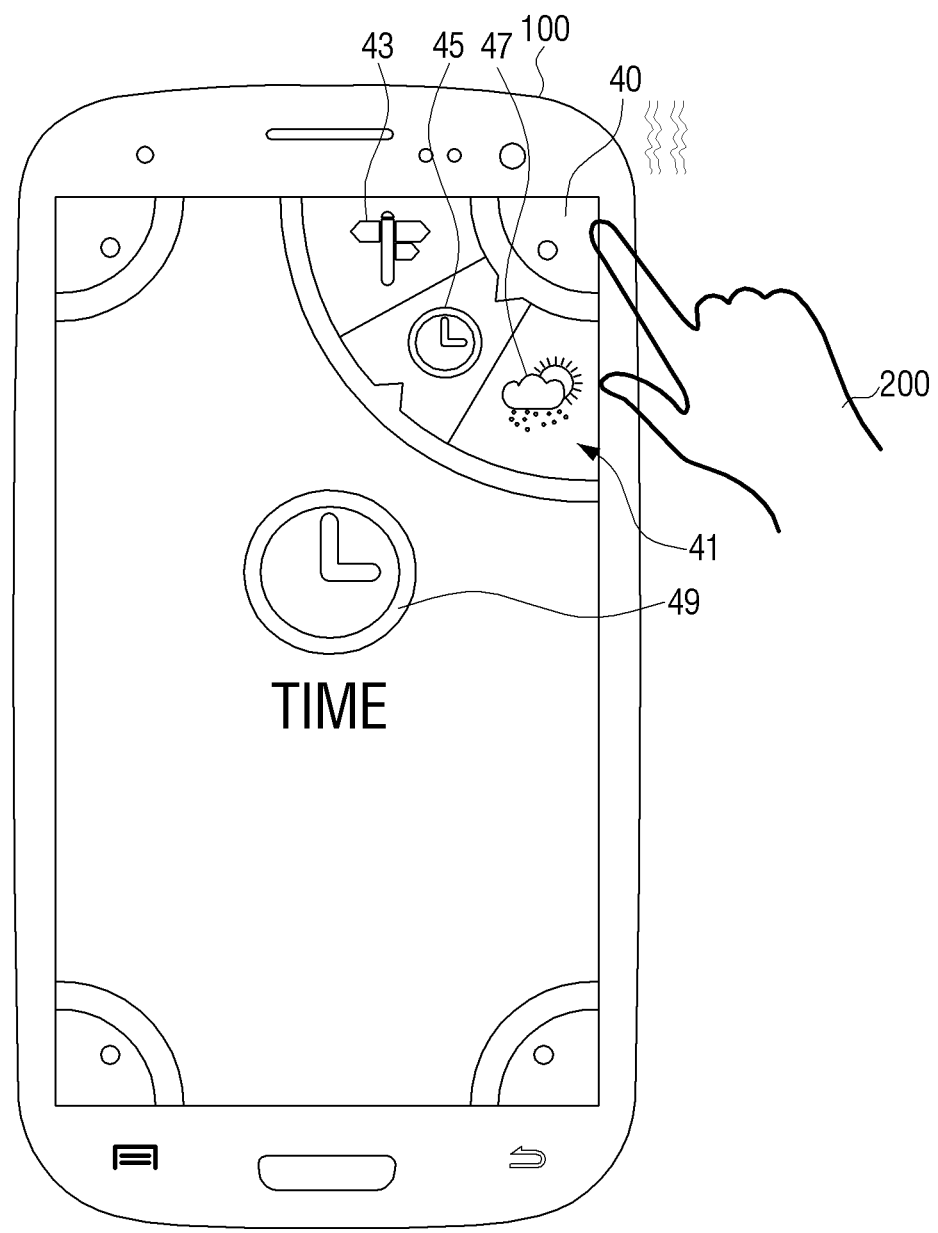

Referring to FIG. 3D, in response to a user touch inputted by the user object 200 on the fourth corner area 40, menu 41 is displayed. The menu 41 relates to ME information which is about user. The menu 41 may include a TIME item 45 to display current time, a NEARBY item 43 to display information about adjacent surrounding, or a WEATHER item 47 to display weather information.

Referring to FIG. 3D, a selected item 49 or an item 49 to be selected may be displayed at a center of the screen. As this increases visibility, it helps a user to recognize exactly which item is selected or which item is to be selected. The item may be highlighted to further increase visibility.

The operation of the controller 120 for selecting a menu item according to various exemplary embodiments will be explained below.

As explained above, the controller 120 controls the display 130 to display a menu in response to a user input being received through a corner area. In one exemplary embodiment, the controller 120 may control the display 130 to display a plurality of items constituting a menu, while varying these at preset time intervals. For example, for the duration of a user input of a long press touch through the fourth corner area 40 of the screen, the display 130 may display a plurality of items of menu while varying these at 1 sec time interval. This will be explained in more detail below with reference to FIGS. 4A to 4D.

FIGS. 4A to 4D are views illustrating a graphic user interface (GUI) for selecting an item of a menu according to an exemplary embodiment.

In response to a touch input being received through a corner area of the screen, the controller 120 controls the display 130 to display the menu that includes a plurality of items. The controller 120 then activates an item at a preset location. In response to activation of the item, the activated item is placed in condition for selection. In response to selection of an item, an application or a function of the display apparatus 100 that corresponds to the selected item is performed. For the duration the touch input lasts on the corner area of the screen, the controller 120 may control the display 130 to display, sequentially, a plurality of items at preset time intervals.

Various ways of selecting items may be implemented. In one exemplary embodiment, in response to the ending of a touch input to the corner area of the screen, the controller 120 may control the display apparatus 100 to perform a corresponding function of an item that was in activated state when touch input was ended.

Figure 4A:
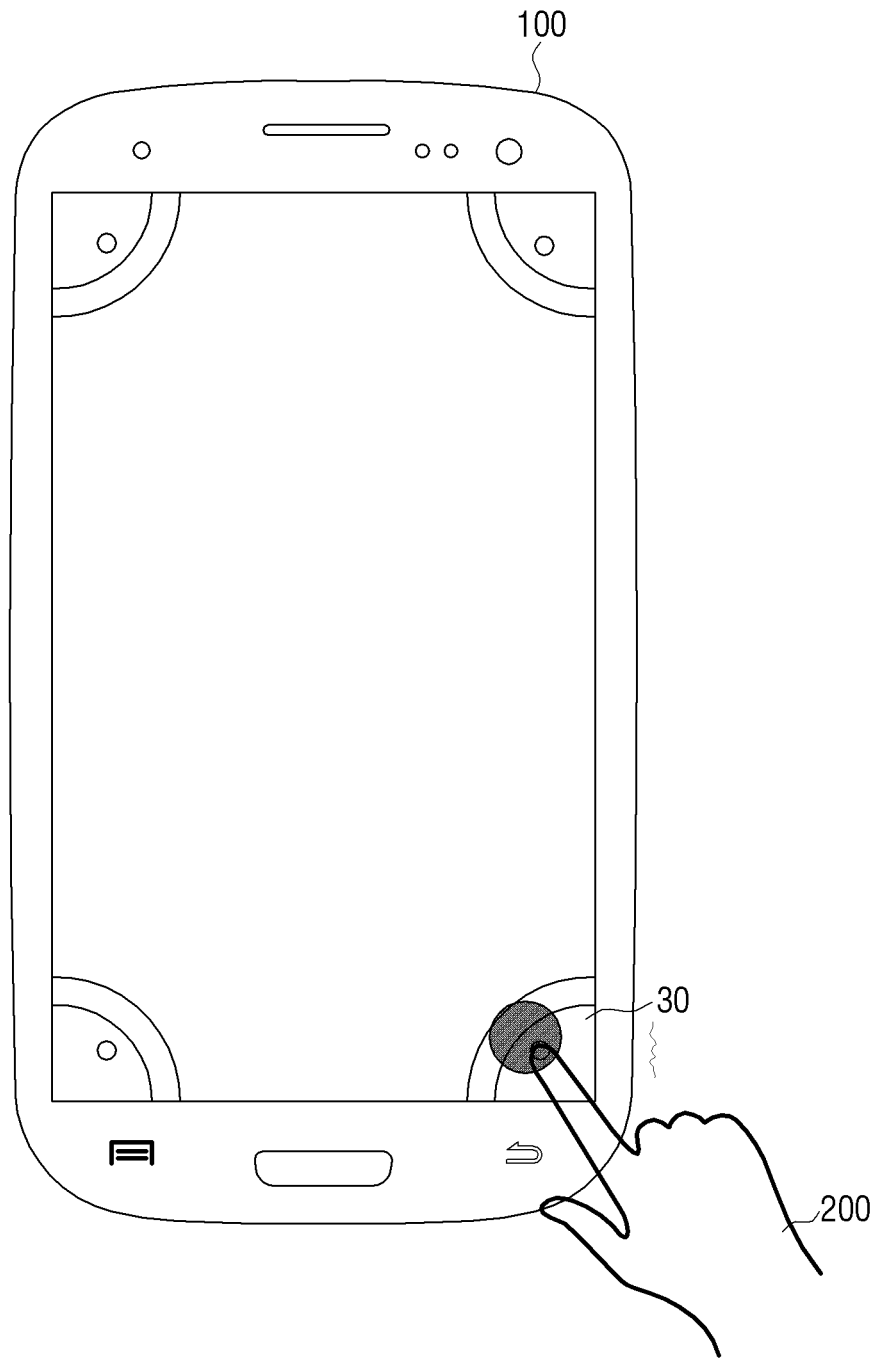
Figure 4B:
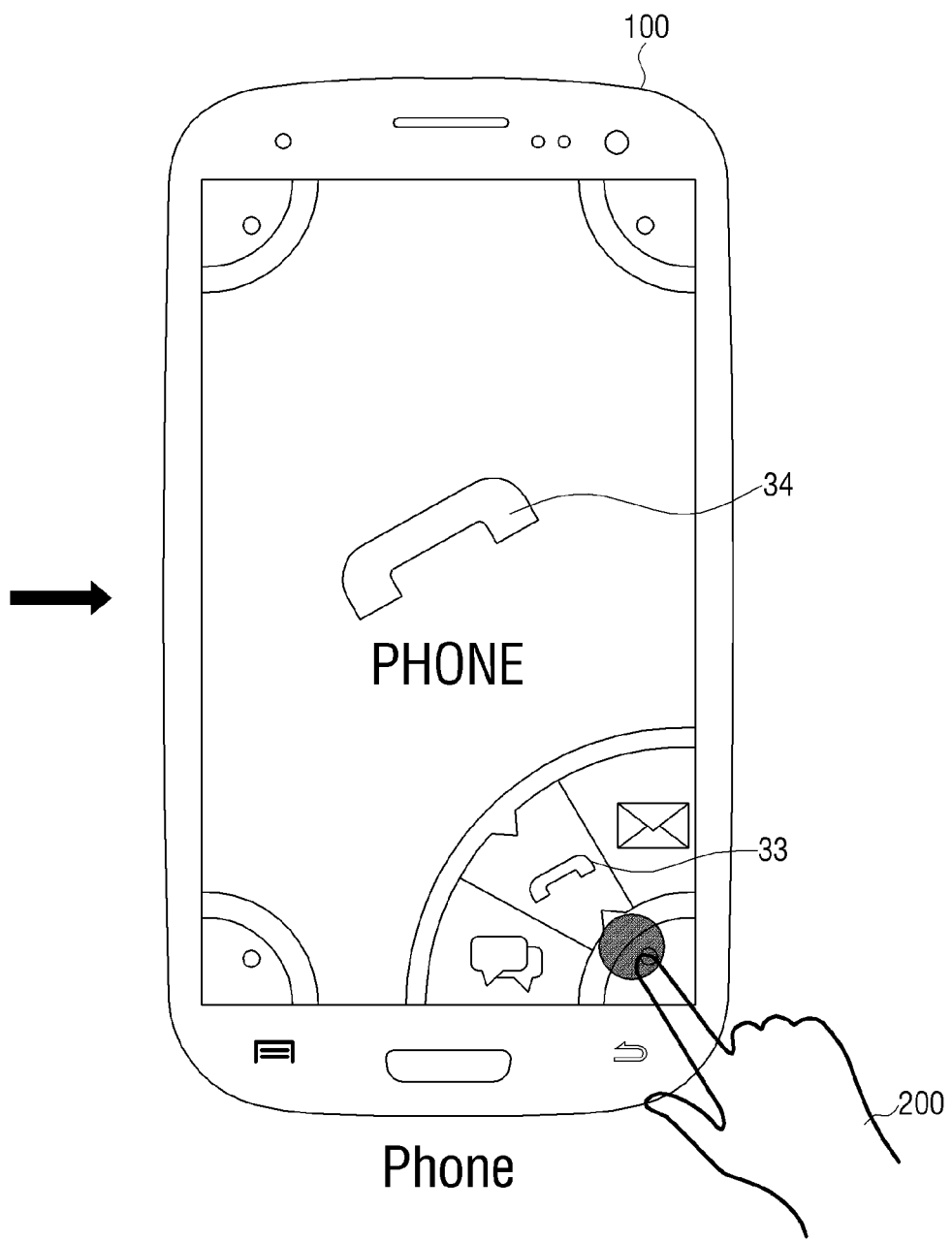

FIG. 4A illustrates a situation in which a user touch input is received at the third corner area 30 by the user object 200. In response to the user touch input to the third corner area 30, the controller 120 controls the display 130 to display the main menu. Accordingly, referring to FIG. 4B, among a plurality of items of the menu, a currently-activated item is displayed on the center of the menu. Currently, phone item 33 is activated and thus displayed, at the center of the screen (34).

While the user keeps touching, the plurality of items are sequentially activated at preset time intervals, thus causing the menu structure to change. That is, referring to FIG. 4C, the text message item 36 is activated, while phone item is deactivated. The text message item is also displayed at the center of the screen (38).

When the touch is stopped while the text message item is activated, the text message function, which corresponds to the text message item 36, is executed. Accordingly, the text message window is displayed (FIG. 4D).

FIGS. 5A to 5D are views illustrating a GUI for selecting an item of a menu according to another exemplary embodiment.

In response to a touch input being received on a corner area of the screen, the controller 120 controls the display 130 to display a menu that includes a plurality of items. An item at a preset location of the menu is then activated. When the item is activated, the activated item is in a condition for selection. As explained above, in response to selection of an item, an application or a function of the display apparatus 100 that corresponds to the selected item, is performed. The difference from the above-mentioned embodiment is that the touch does not continue, but is ended. This is tap touch, rather than long press touch. When the tap ends, the activated item may change in response to swipe (or slide) touch. That is, a user may activate an intended item for selection by inputting swipe touch. Because the touch is ended, a user may input a double tap on an arbitrary area of the screen in order to select an item for the last time. The controller 120 may control the display apparatus 100 to perform a function that corresponds to the activated item among the plurality of items.

Figure 5A:
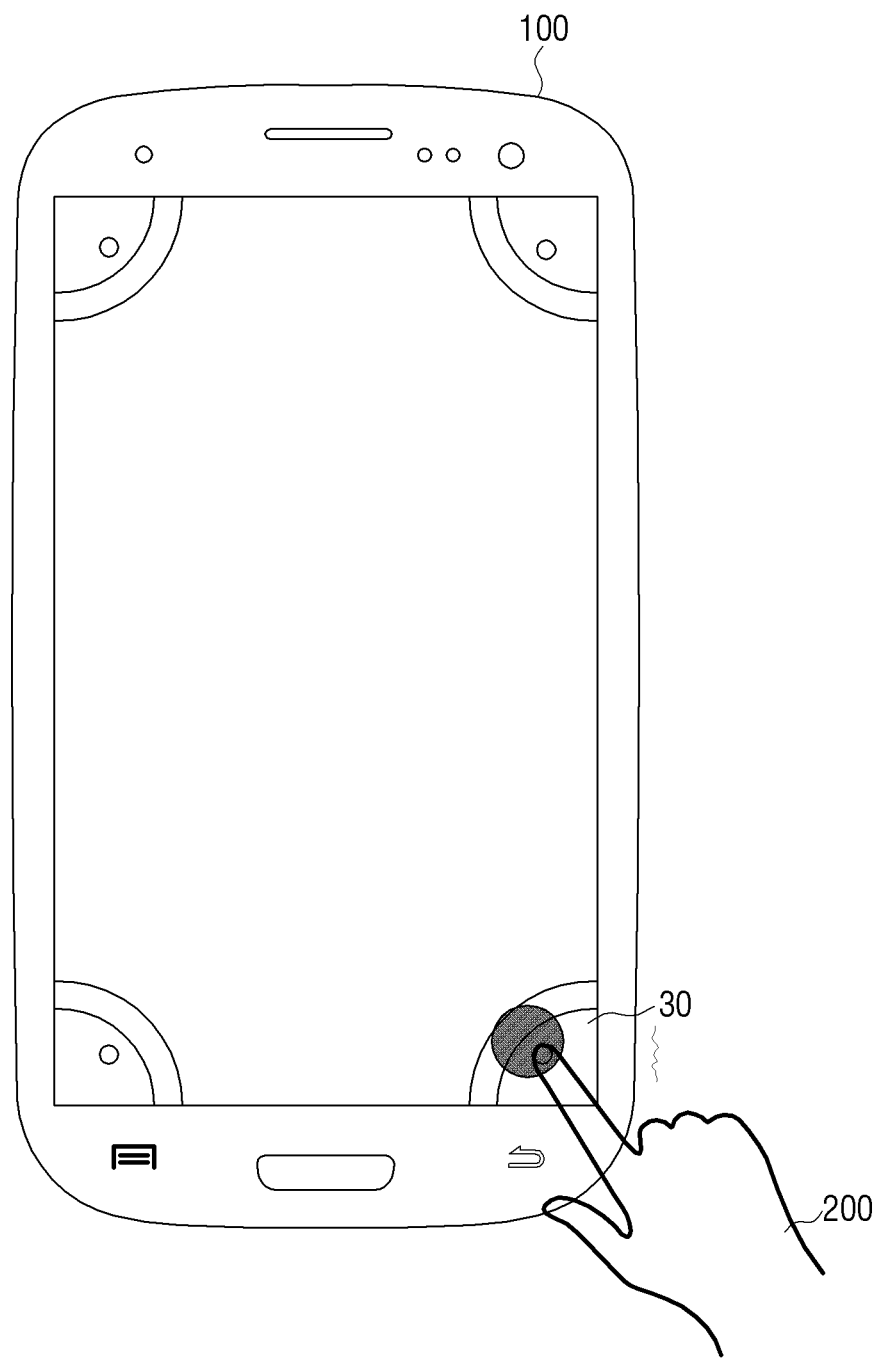
FIGS. 5A to 5D are views illustrating a GUI for selecting an item of a menu according to another exemplary embodiment.
Figure 5B:
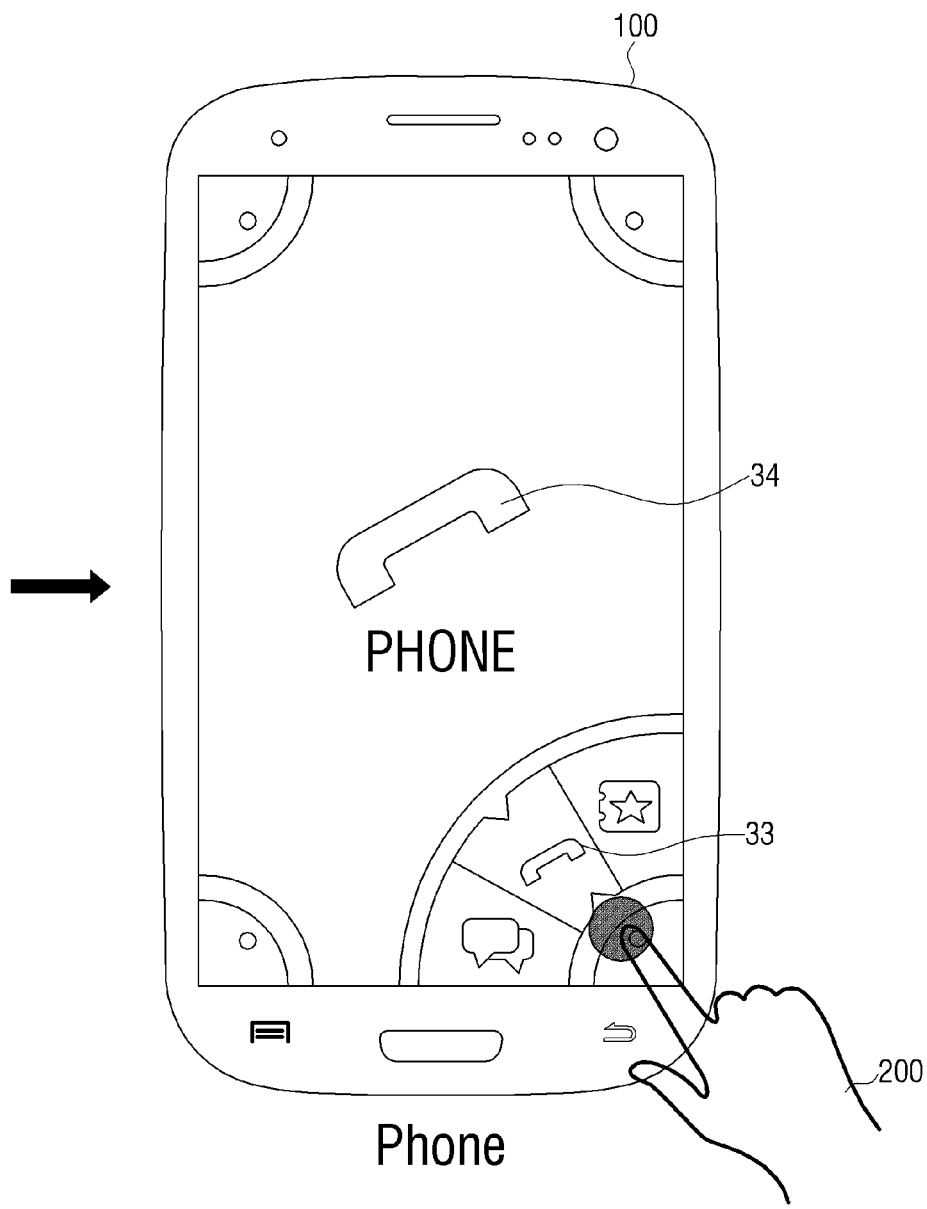

Referring to FIG. 5A, a user touch input is received on the third corner area 30 by the user object 200. In response to a user touch input being received on the third corner area 30, the controller 120 controls the display 130 to display the main menu. Among the plurality of items of the menu, referring to FIG. 5B, a currently-activated item is displayed at a center of the menu. When the phone item 33 is activated and displayed currently, then this is also displayed at the center of the screen (34), although it is optional to display the item at the center of the screen.

In this case, the user may end the touch input. That is, the user may stop making contact with the touch screen. The user may change an item structure by swipe- (or slide-) touching the menu that includes a plurality of items. For example, referring to FIG. 5B, in response to a short swipe touch in counter-clockwise direction, the phone item 33 is deactivated, while a favorite item is activated. New item(s) may be placed at the location of the favorite item. The activated favorite item may be displayed at the center of the screen.

Figure 5C:
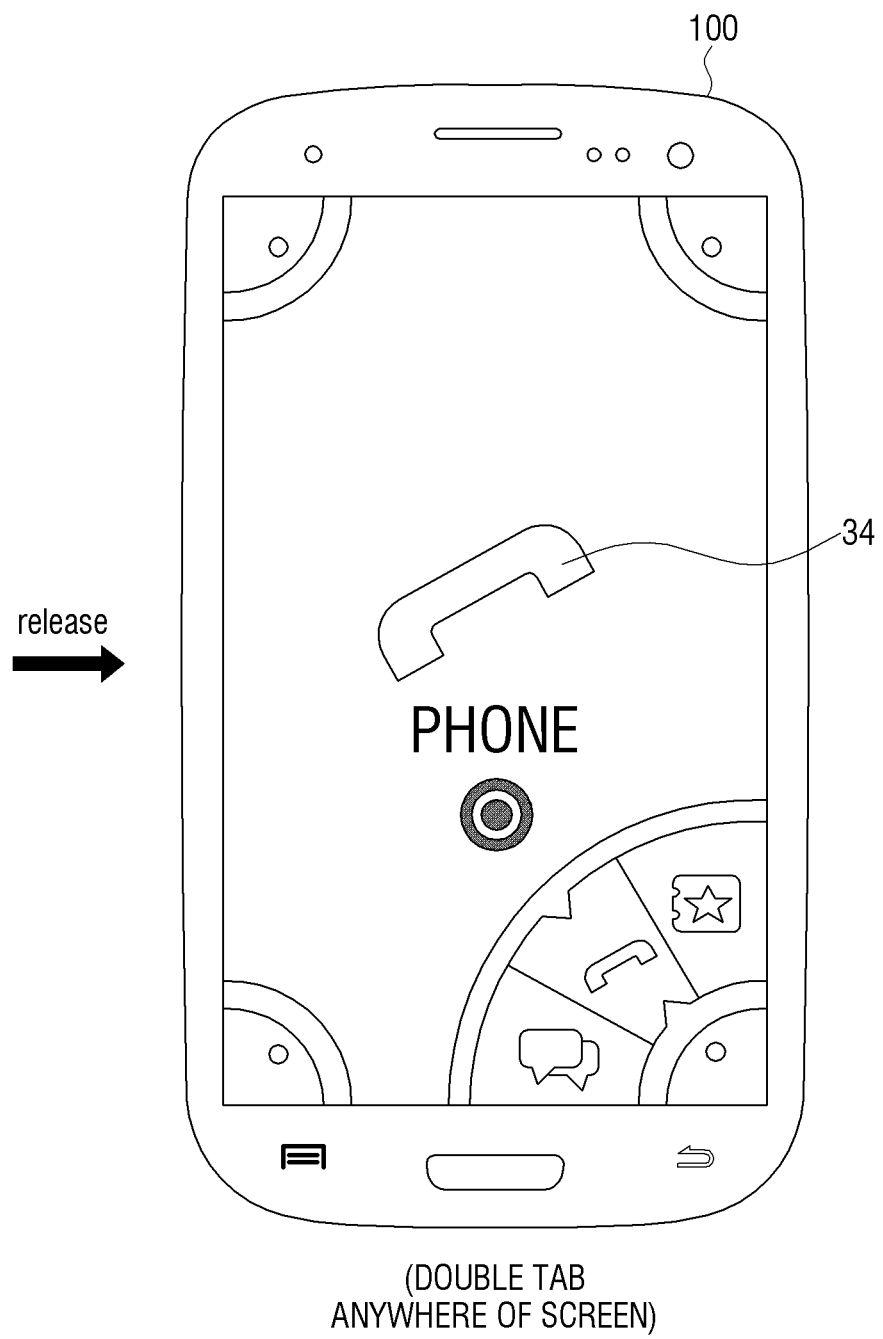
Figure 5D:
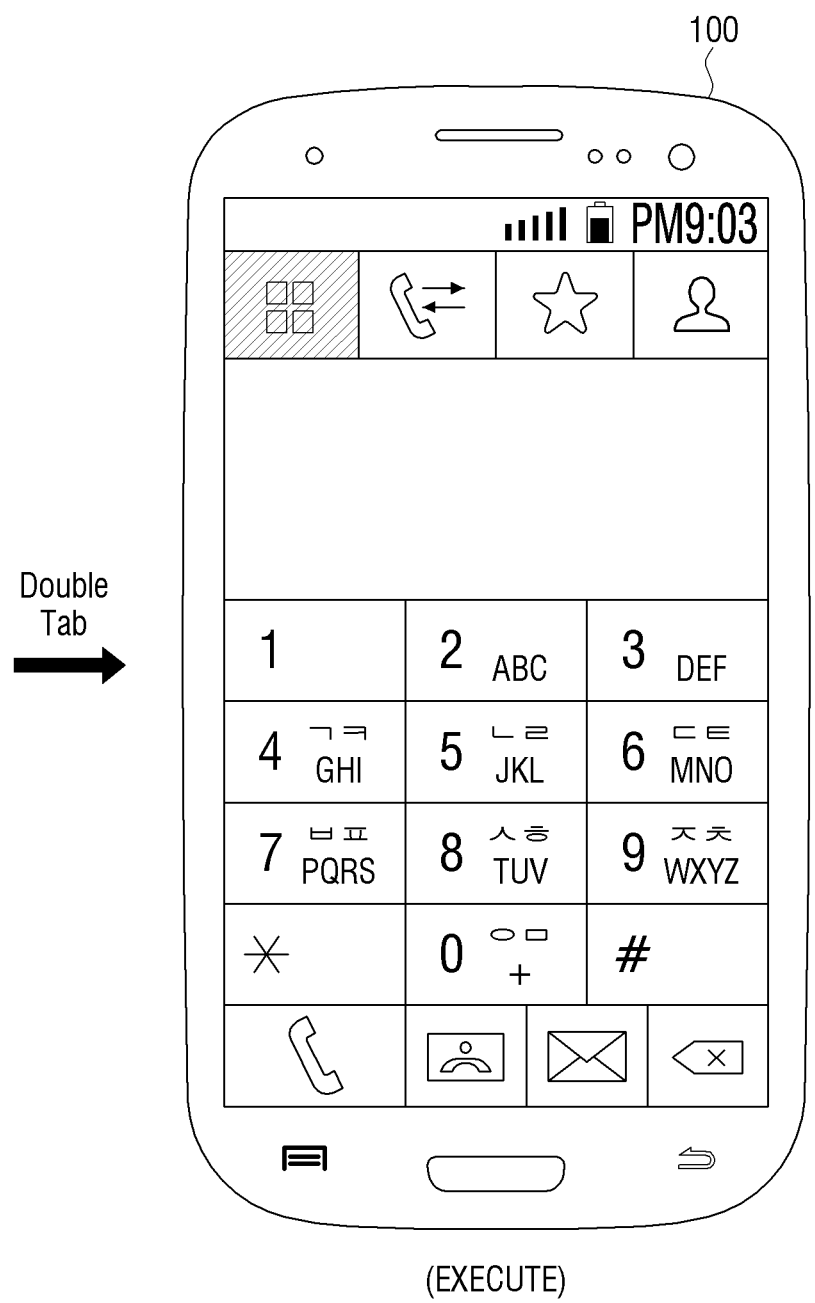

In an embodiment illustrated in FIG. 5C, the user does not make additional swipe touch input. A double tap was received at an arbitrary area on the screen, and the phone screen, corresponding to the activated item, is illustrated (FIG. 5D).

The menu does not necessarily have to be displayed on the corner area, as illustrated in FIGS. 4A to 5D. That is, the menu may be displayed on any area on the screen, as is illustrated in FIGS. 6A to 6D.

FIGS. 6A to 6D are views illustrating a GUI for selecting an item of a menu according to another exemplary embodiment.

Figure 6A:
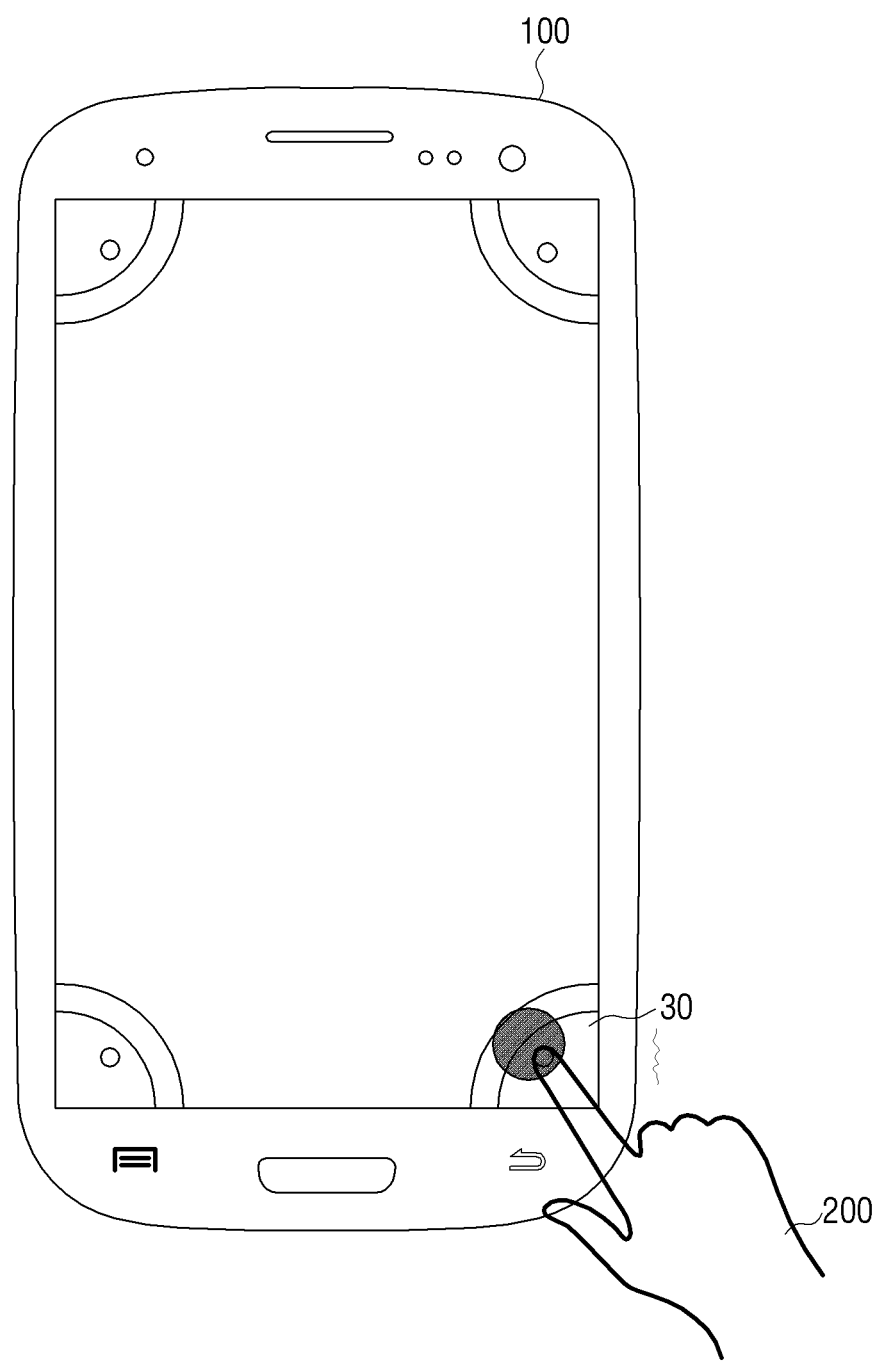
Figure 6B:
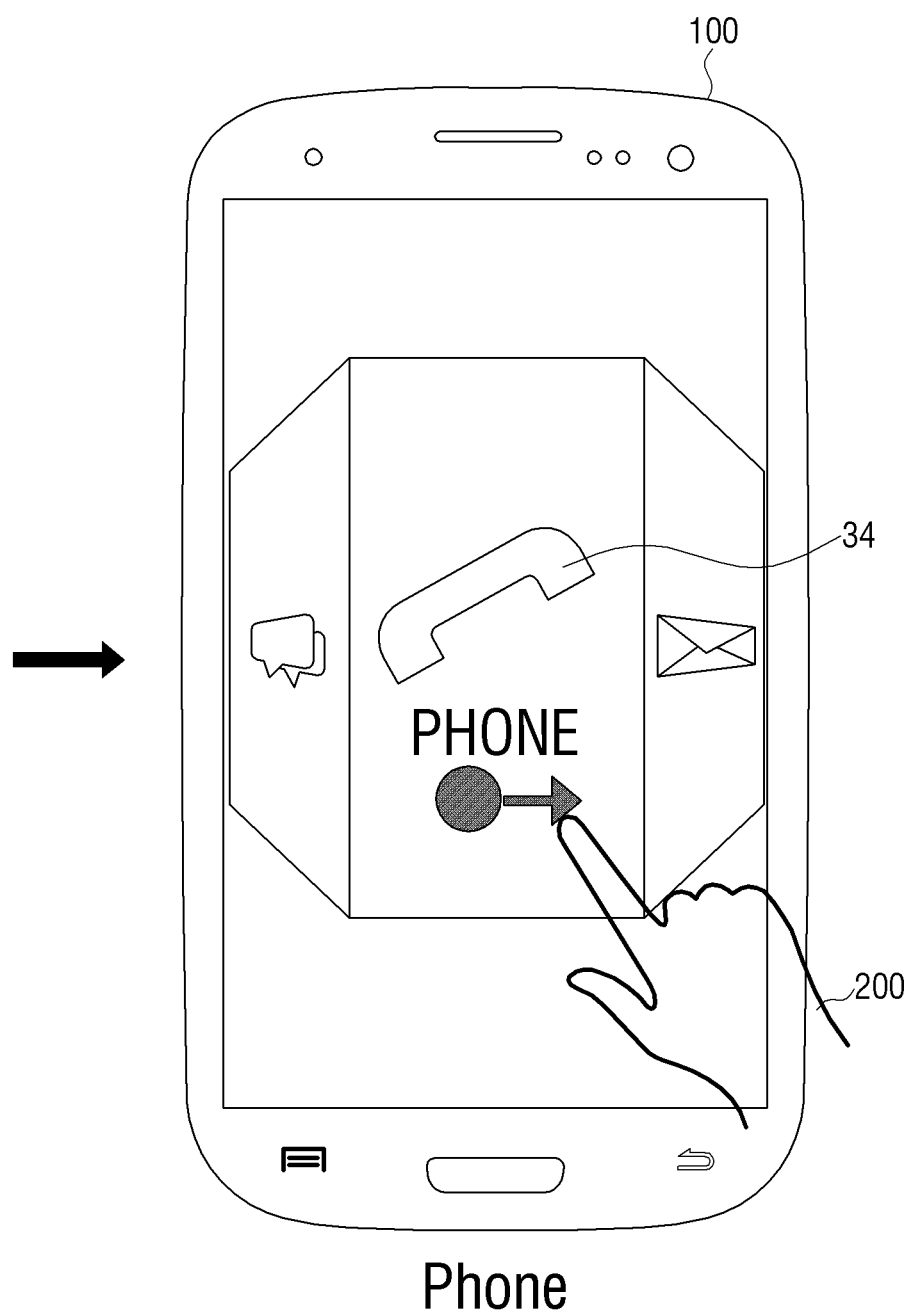

Referring to FIG. 6A, a user touch input is received on the third corner area 30 by the user object 200. In response to the user touch being input on the third corner area 30, the controller 120 controls the display 130 to display the main menu. Among a plurality of items that constitute the menu, a currently-activated item is expressed at a center of the menu. Referring to FIG. 6B, the phone item 34 is activated and displayed at a center of the screen.

Figure 6D:
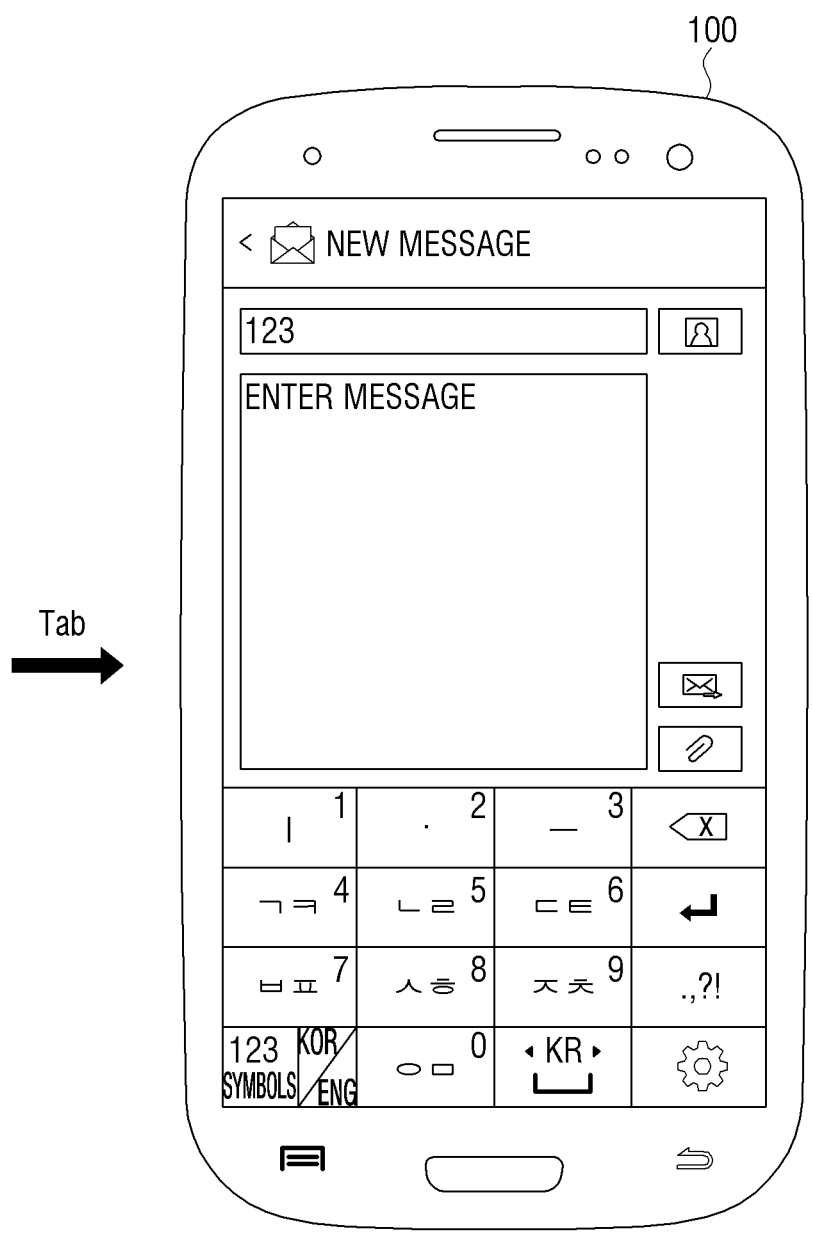

The user may manipulate with swipe touch so that an item on one side of a cube is faced forward. The forward-looking item is the activated item and thus can be selected. The user can select the item by simple touch input. Referring to FIG. 6C, the user has the text message item face forward on the cube. In response to touching on the item, the text message function, which is the function that corresponds to the text message item, is executed (FIG. 6D). Because the subject of viewing and subject of touching match, more intuitive use may be provided with greater visibility.

Meanwhile, the auditory sense can be an effective auxiliary tool for those with impaired vision to perceive objects more accurately. Accordingly, the controller 120 according to an embodiment may additionally include a function of controlling a voice message corresponding to user input to be outputted.

FIGS. 7A to 7D are views illustrating an operation of a display apparatus outputting voice messages according to an exemplary embodiment.

Figure 7A:
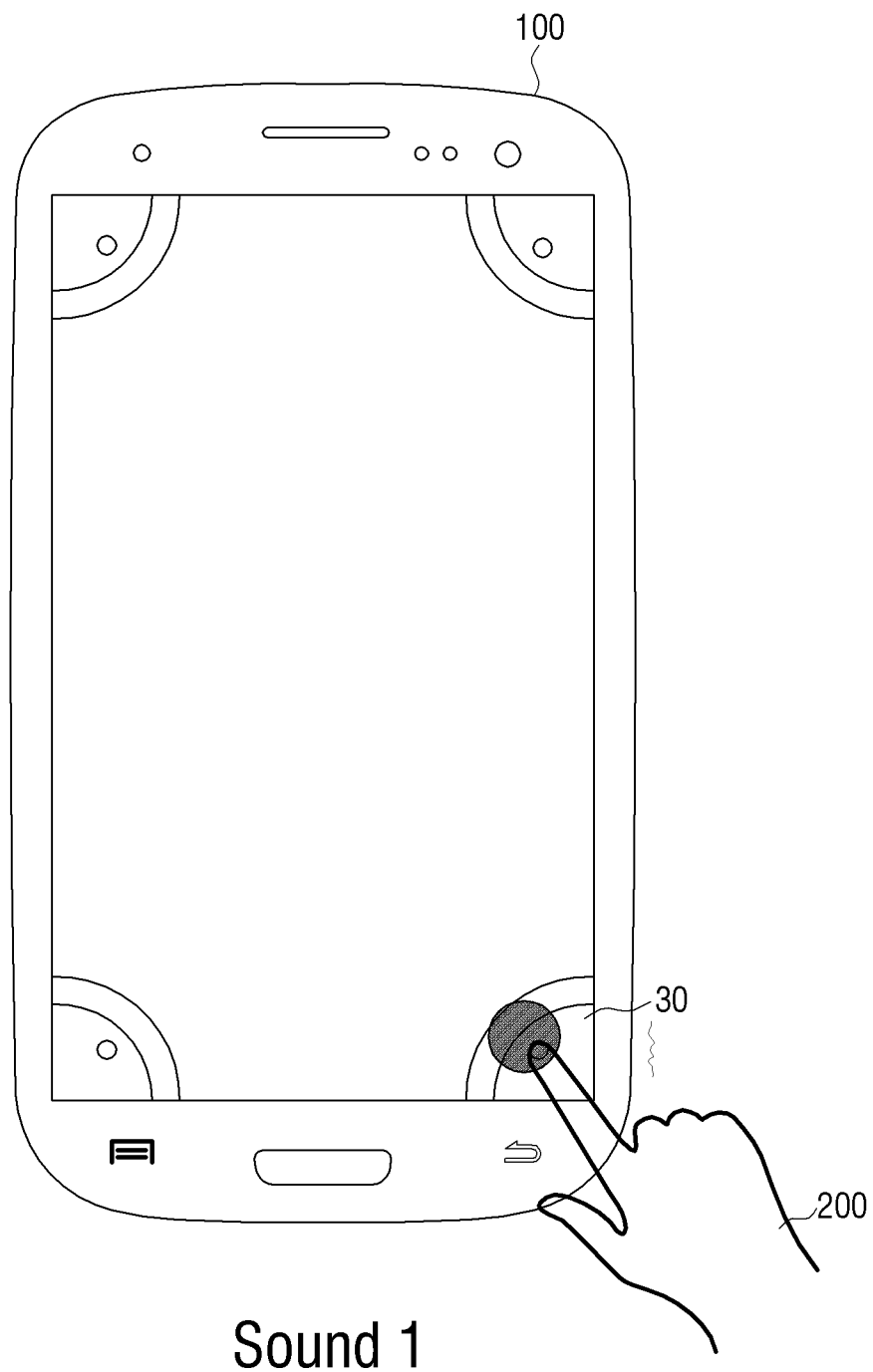
Figure 7A:

Referring to FIG. 7A, a user touch input is received on the third corner area 30 by the user object 200. In response to the user's touch input being received on the third corner area 30, the controller 120 controls the display 130 to display main menu. A voice message (sound 1) that corresponds to the user's touch input, such as, for example, "main menu" may be outputted through the speaker.

Figure 7B:
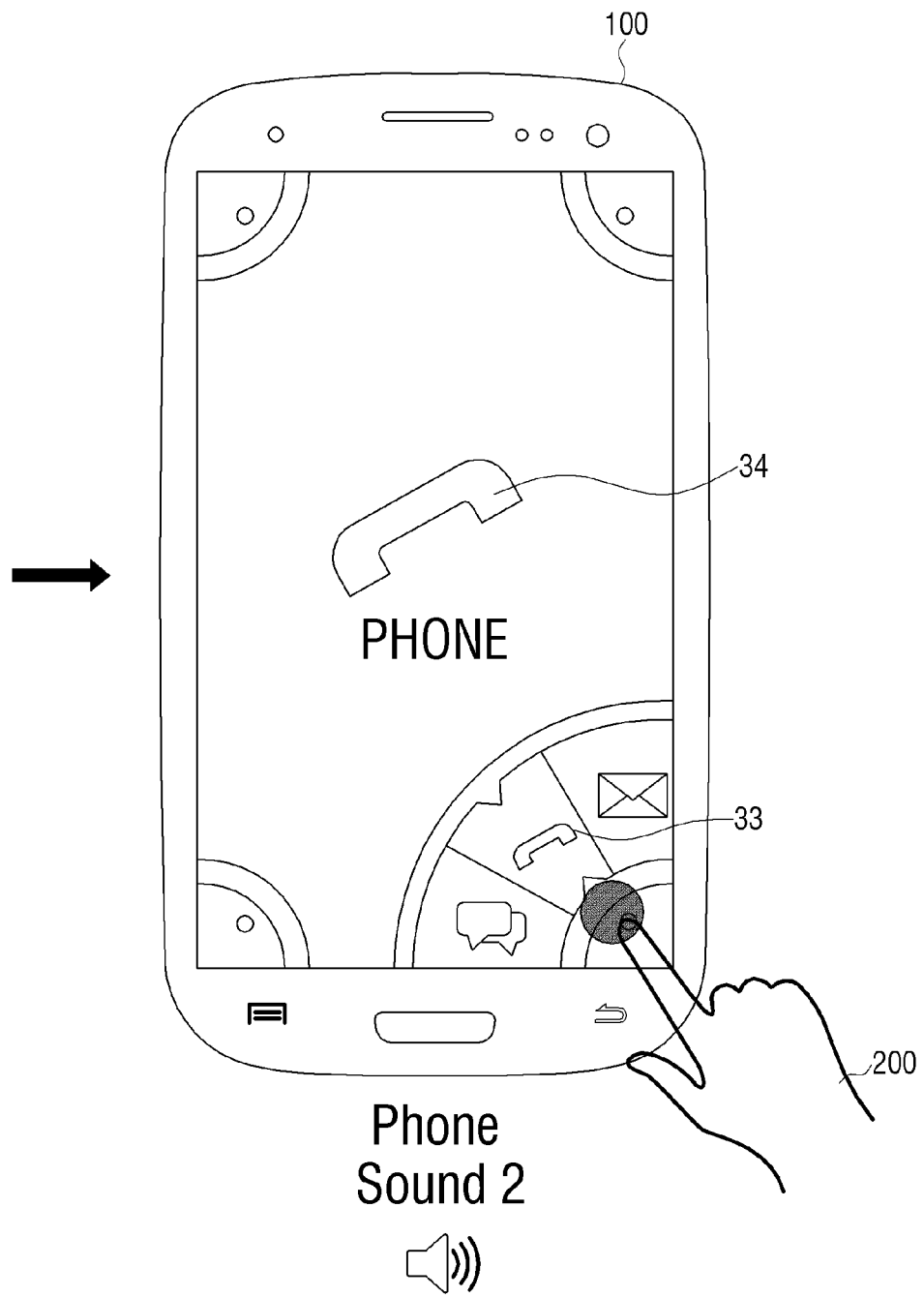
Figure 7D:
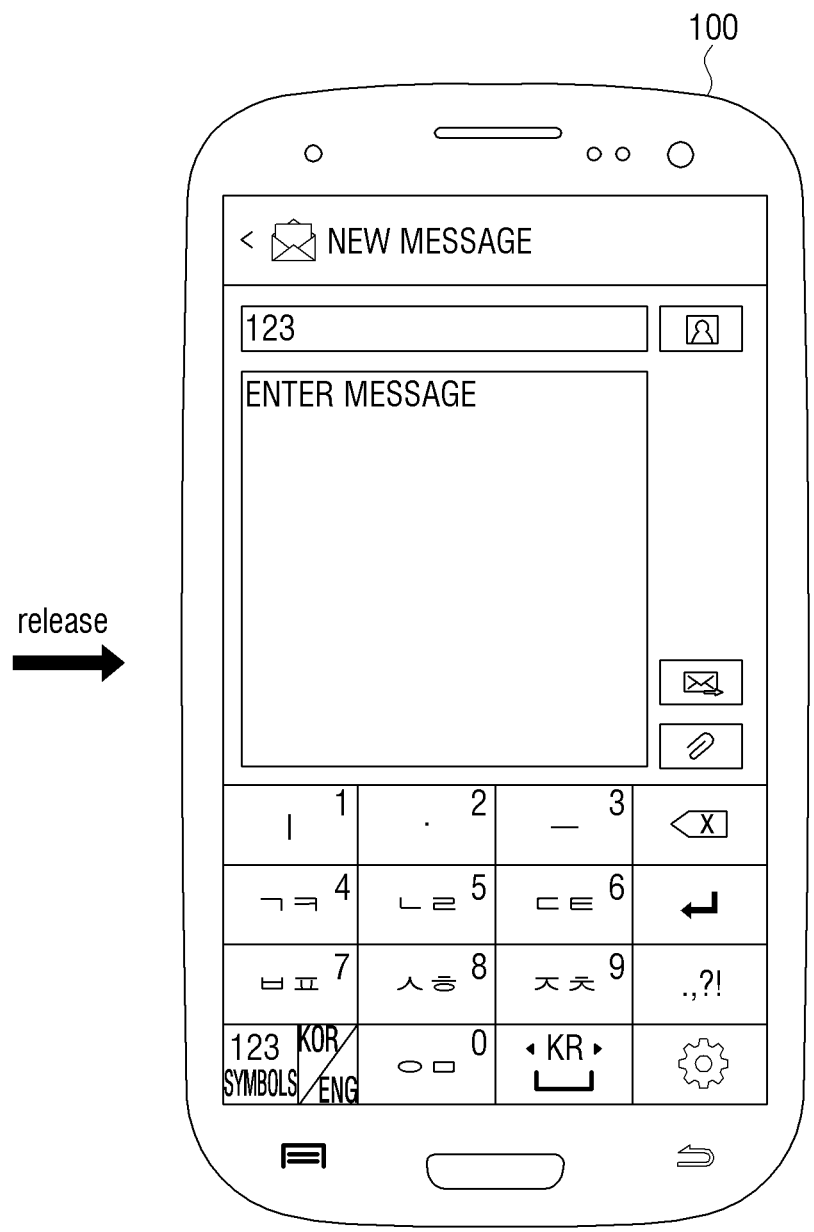
Figure 7D:

Among a plurality of items of the menu, referring to FIG. 7B, a currently-activated item is expressed on the center of the menu. Currently, the phone item 33 is activated and displayed, and also expressed on the center of the screen 34. A voice message that corresponds to the activated item is outputted through the speaker. That is, a voice message (sound 2) such as "phone" may be outputted.

When the user continues to hold the touch, a plurality of items are sequentially activated at preset time intervals, thus changing menu structure. That is, referring to FIG. 7C, the text message item 36 is activated and displayed at the center of the screen 38, while the phone item is deactivated. At this time, voice message (sound 3) that corresponds to the newly-activated item, such as "text message" is outputted.

When the user ends touching, the text message function that corresponds to the text message item 36, which was in the activated state at the time of ending the touch, is executed (see FIG. 7D), and voice message (sound 4) such as "texting messages is executed" is outputted.

FIGS. 8A to 8D are views illustrating an operation of a display apparatus outputting voice messages according to another exemplary embodiments.

Figure 8A:
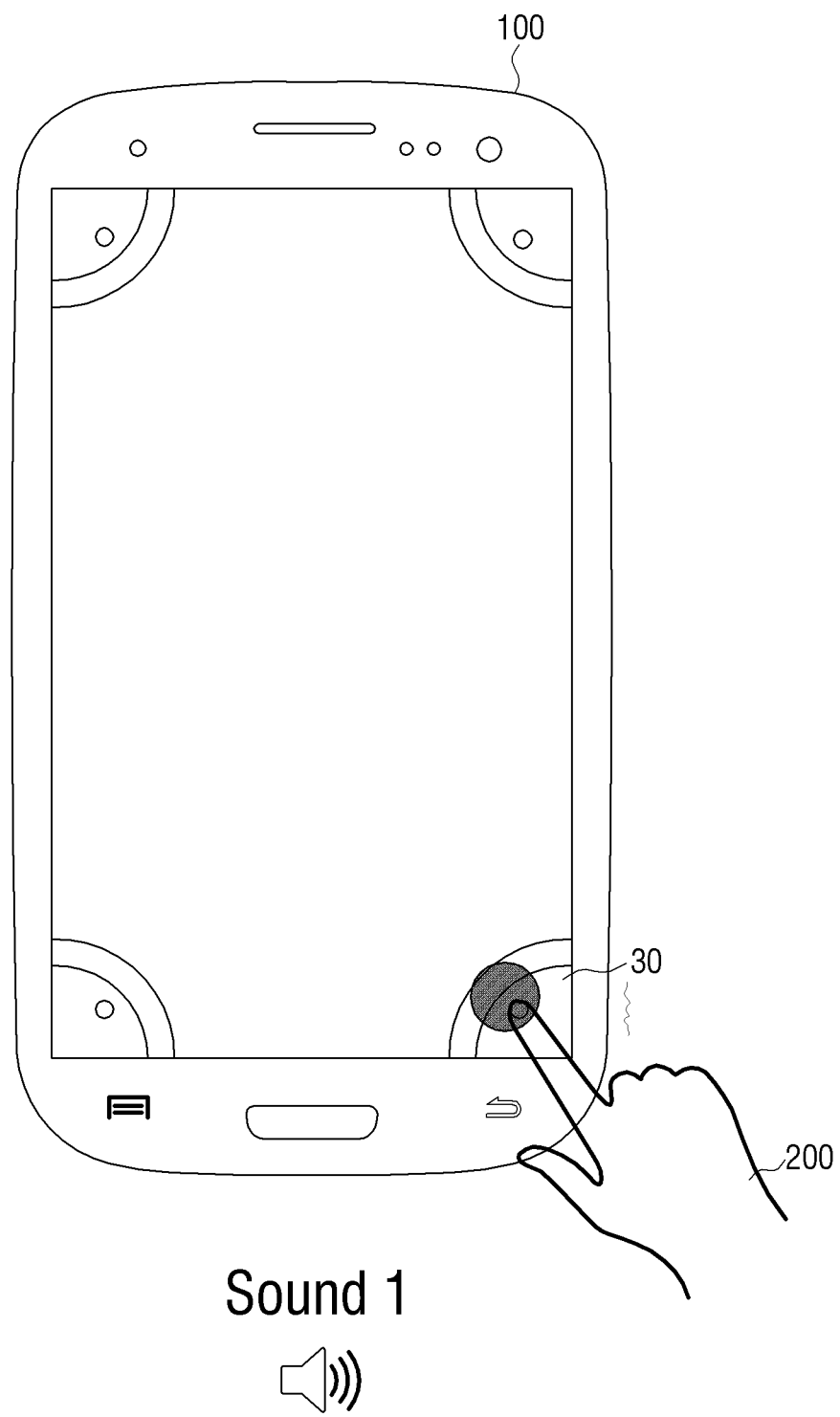
FIGS. 8A to 8D are views illustrating an operation of a display apparatus outputting voice message according to another exemplary embodiment.

Referring to FIG. 8A, a user touch input is received on the third corner area 30 by the user object 200. In response to the user's touch input being received on the third corner area 30, the controller 120 controls the display 130 to display main menu. A voice message (sound 1) that corresponds to the user's touch input, such as, for example, "main menu" may be outputted through the speaker.

Figure 8B:
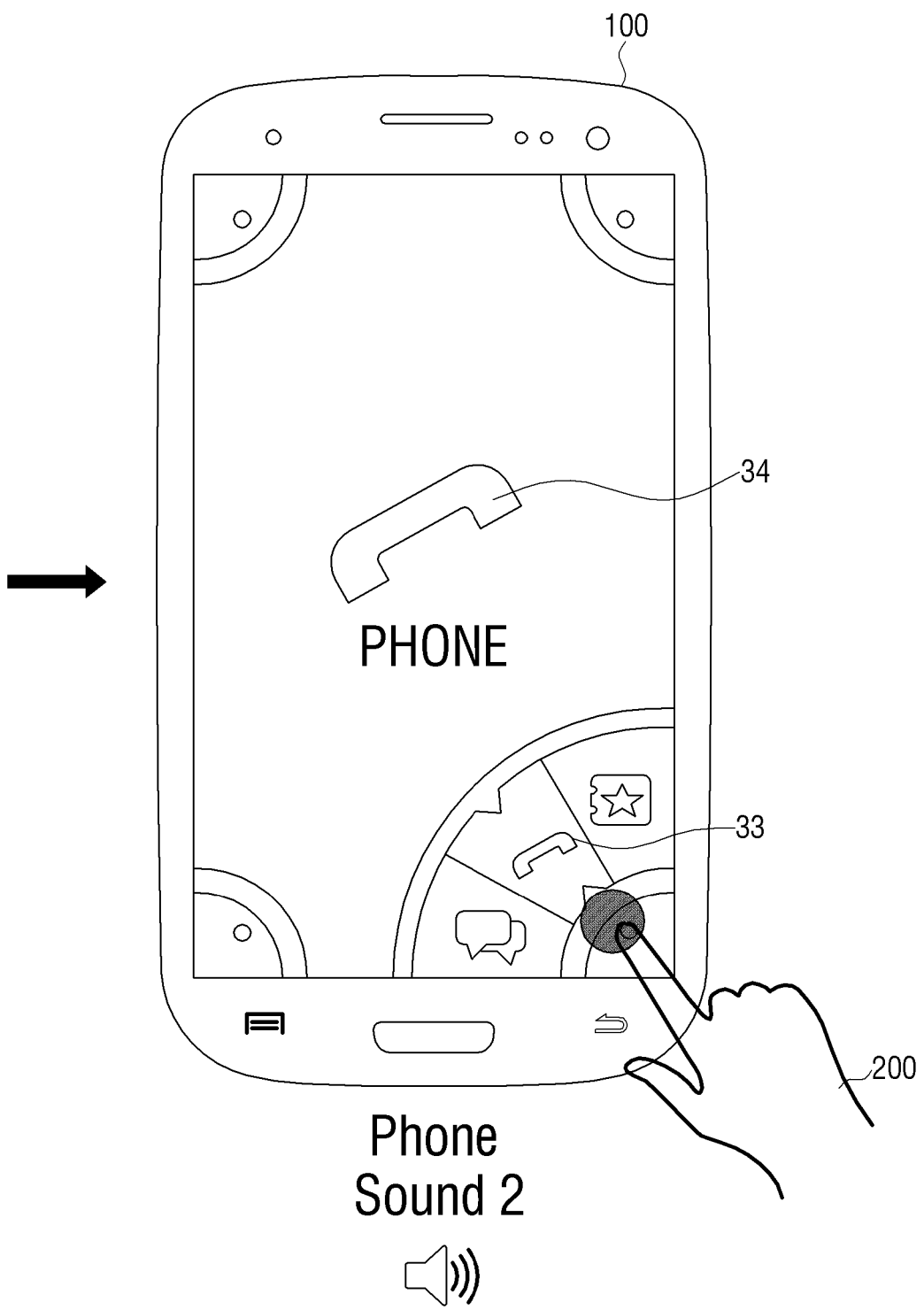

Among a plurality of items of the menu, referring to FIG. 8B, a currently-activated item is displayed on the center of the menu. Currently, the phone item 33 is activated and displayed, and also expressed on the center of the screen (34). However, displaying the activated item on the center of the screen is optional. Voice message corresponding to the activated item may be outputted through the speaker. That is, voice message (sound 2) such as "phone" may be outputted.

The user may perform a tap input on the touch screen. The user may change the menu structure by swipe- (or slide-) touching the menu that includes a plurality of items. For example, in response to the user's brief swipe-touch in counterclockwise direction in FIG. 8B, the phone item 33 may be turned from the activated state to an inactivated state, while the favorite item may be turned into the activated state. A new item may be placed at the location of the favorite item. In an optional embodiment, the activated favorite item may be displayed at the center of the screen. When the activated item is changed, voice message corresponding to the new item after change may be outputted.

Figure 8C:
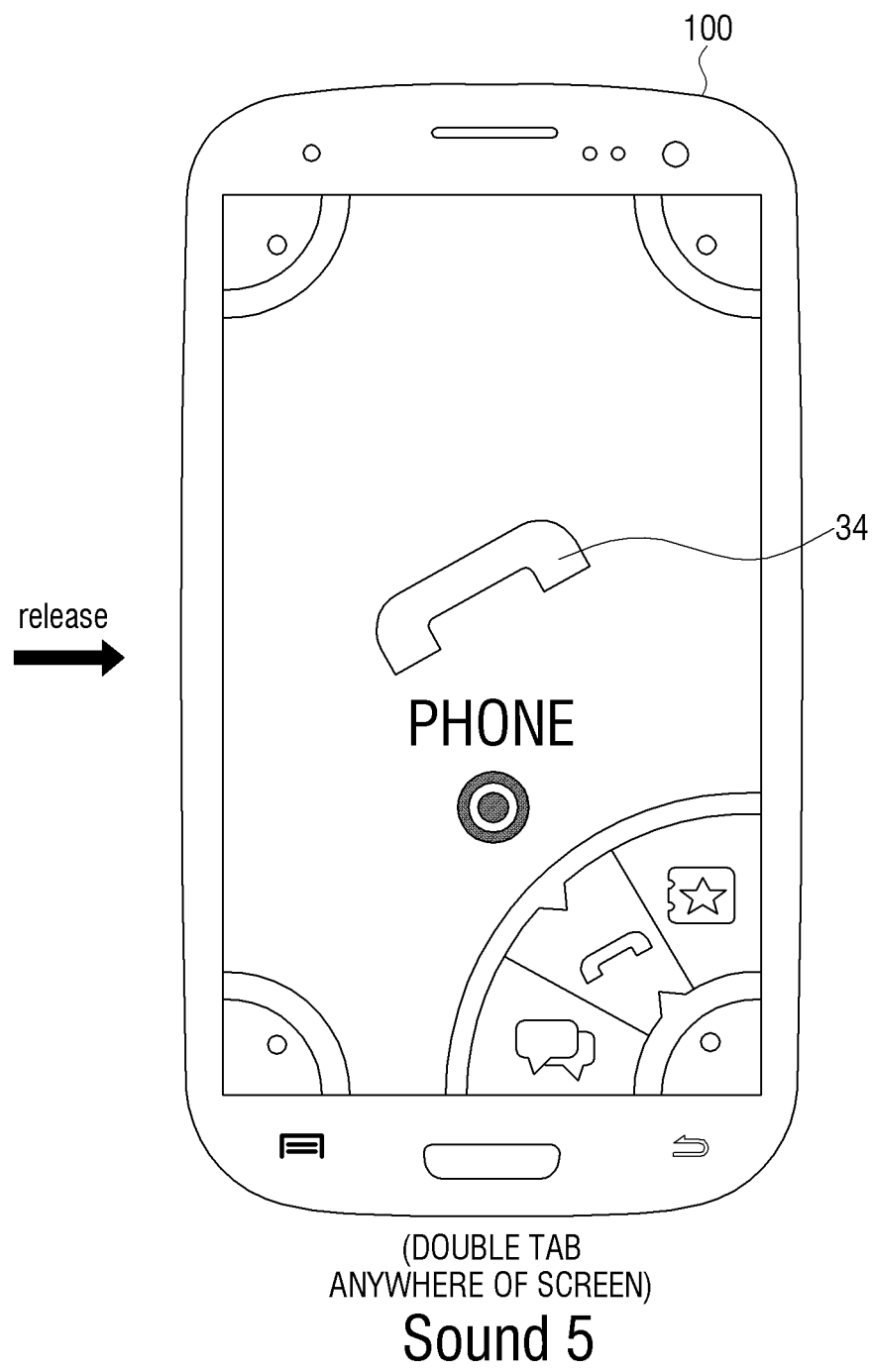
Figure 8D:
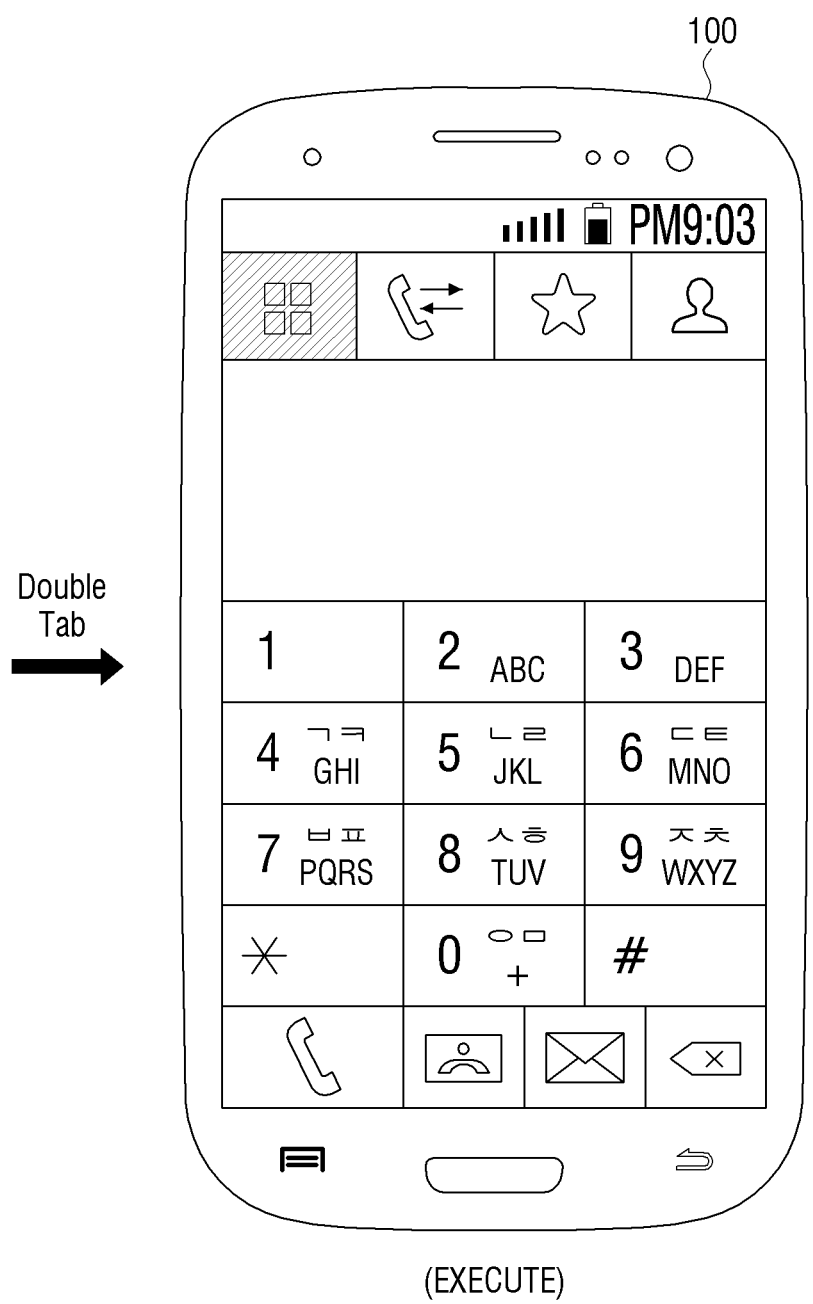

Referring to an embodiment illustrated in FIG. 8C, the user does not make any additional swipe inputs. A double tap is received on an arbitrary area on the screen and voice message (sound 5) such as "Making a phone call is executed" is outputted. The screen of a phone call, which corresponds to the activated item, is illustrated (FIG. 8D).

Different vibration patterns or strengths may correspond to different items that constitute the menu, for the purpose of keeping etiquettes in public places or for other reasons.

FIGS. 9A to 9D are views illustrating a display apparatus outputting a variety of vibrations according to one or more exemplary embodiments.

Figure 9A:
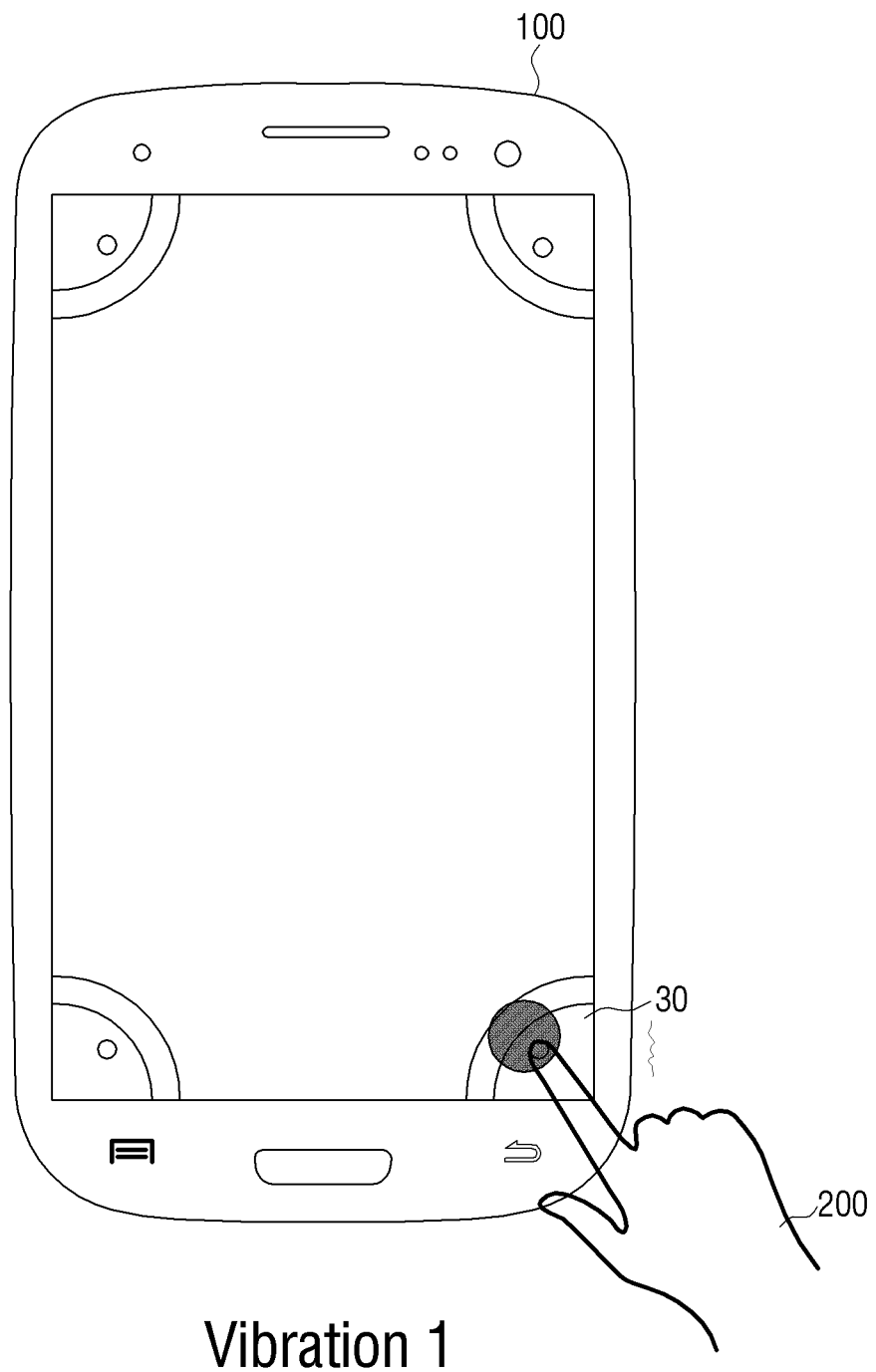
Figure 9C:
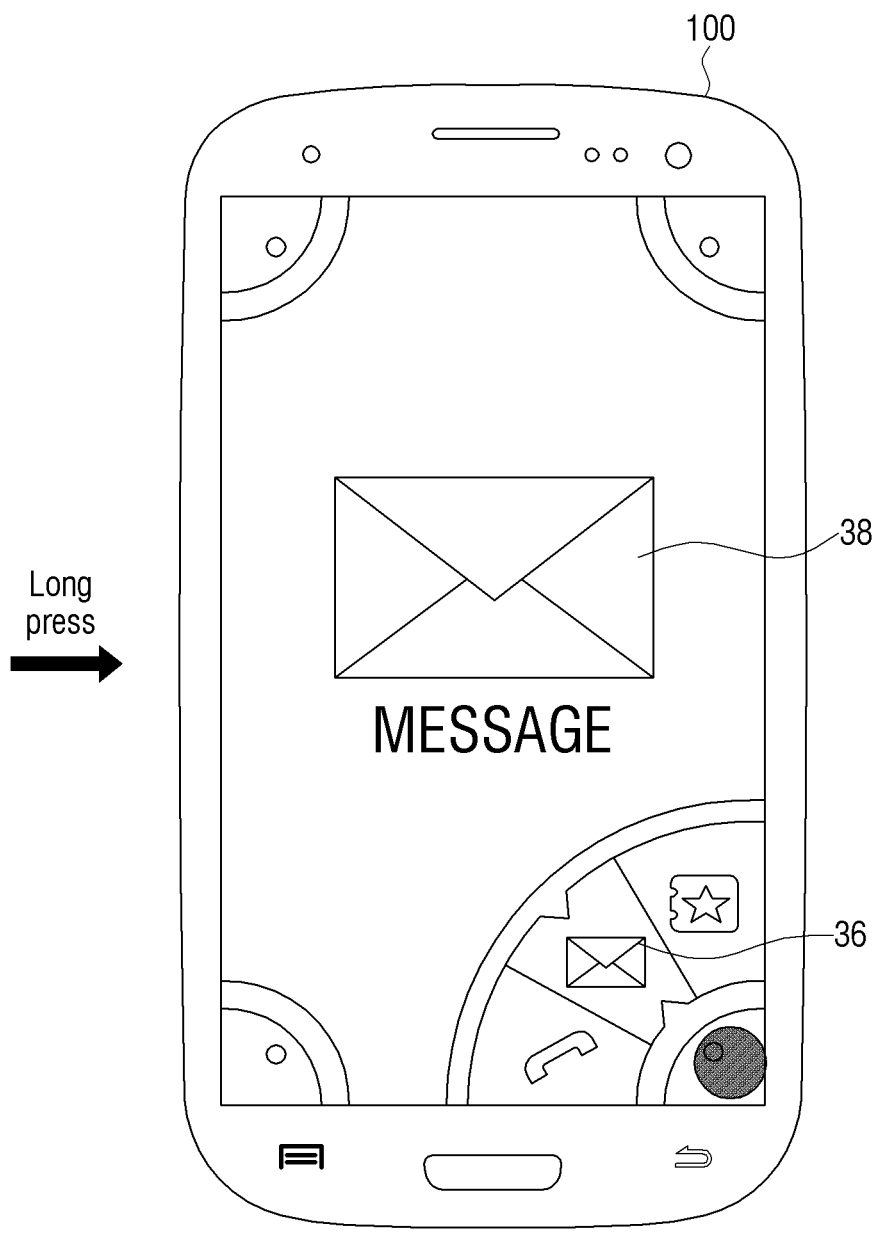
Figure 9C:

Referring to FIG. 9A, a user touch input is received on the third corner area 30 by the user object 200. In response to the user's touch input being received on the third corner area 30, the controller 120 controls the display 130 to display main menu. The display apparatus 100 may output a vibration that corresponds to the user's touch input. For example, the display apparatus 100 may output one short vibration pattern.

Among a plurality of items of the menu, referring to FIG. 9B, a currently-activated item is expressed on the center of the menu. Currently, the phone item 33 is activated and displayed, and also expressed on the center of the screen (34). A vibration pattern that corresponds to the activated item is outputted. For example, a vibration, in such a vibration pattern that includes two short vibrations, may be outputted.

When the user holds the touch input, a plurality of items are sequentially activated at preset time intervals, thus changing the menu structure. That is, referring to FIG. 9C, the text message item 36 is activated, while phone item is deactivated. The vibration pattern of the newly-activated item, i.e., text message item may include three short successive vibrations, may be outputted.

Figure 9D:
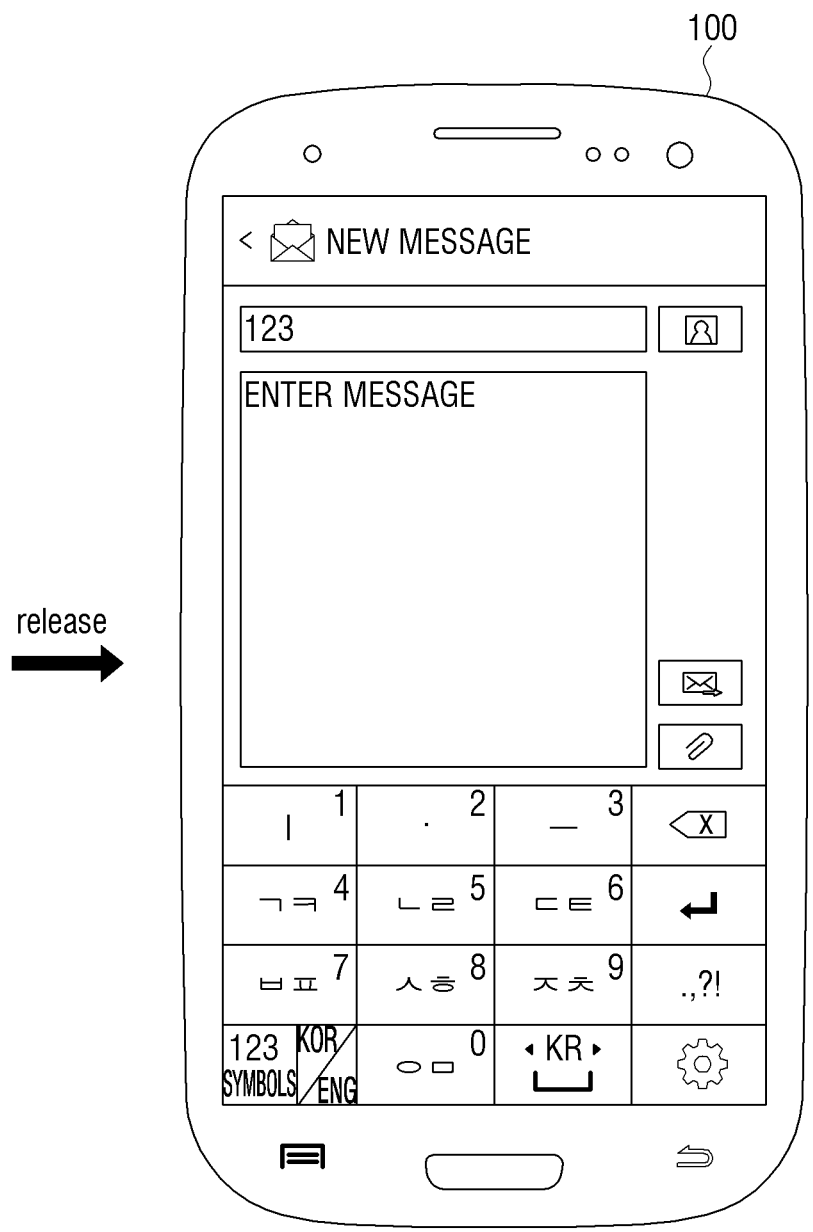

When the user ceases the touch input, the text message function, which corresponds to the text message item 36 that was in the activated state at that time, is executed (FIG. 9D). Accordingly, the user knows each item based on the vibration pattern thereof.

In various exemplary embodiments, the user can execute functions or applications corresponding to the respective items of the display apparatus more intuitively. Meanwhile, those applications or functions provided by the display apparatus 100 also provide various and complex interfaces and keys. For example, FIG. 4D shows how many keys are there in the interface to send out text message and how these can be challenging to seniors or those who have impaired vision. A method is thus necessary, which can increase visibility of an application or an interface provided by the display apparatus.

One suggestion is to set a focus on more frequently-used applications, keys, objects, buttons or icons, depending on individuals. The 'focus' as used herein refers to a certain expression of a portion desired by a user so that the desired portion can be distinguished from the rest. The focus may include highlighting or coloring with a specific color, as non-limiting examples.

FIGS. 10A to 10D are views illustrating setting of a focus according to an exemplary embodiment.

Figure 10A:
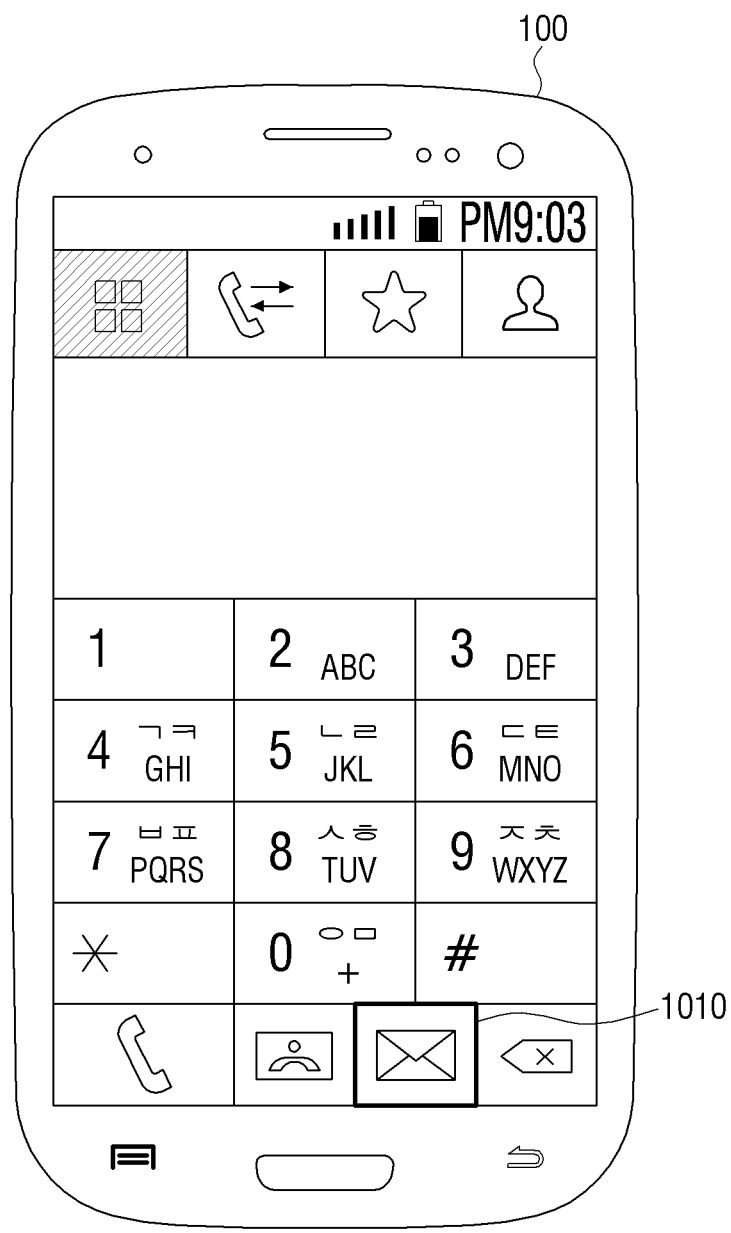
FIGS. 10A to 10D are views illustrating setting of a focus according to an exemplary embodiment.

FIG. 10A illustrates a text message key 1010 in a focus setting, when the text message key 1010 is frequently used on the interface of the phone application. As illustrated, the text message key 1010 is highlighted. That is, the text message key 1010 which is more frequently used than others, is highlighted to increase visibility thereof.

Figure 10B:
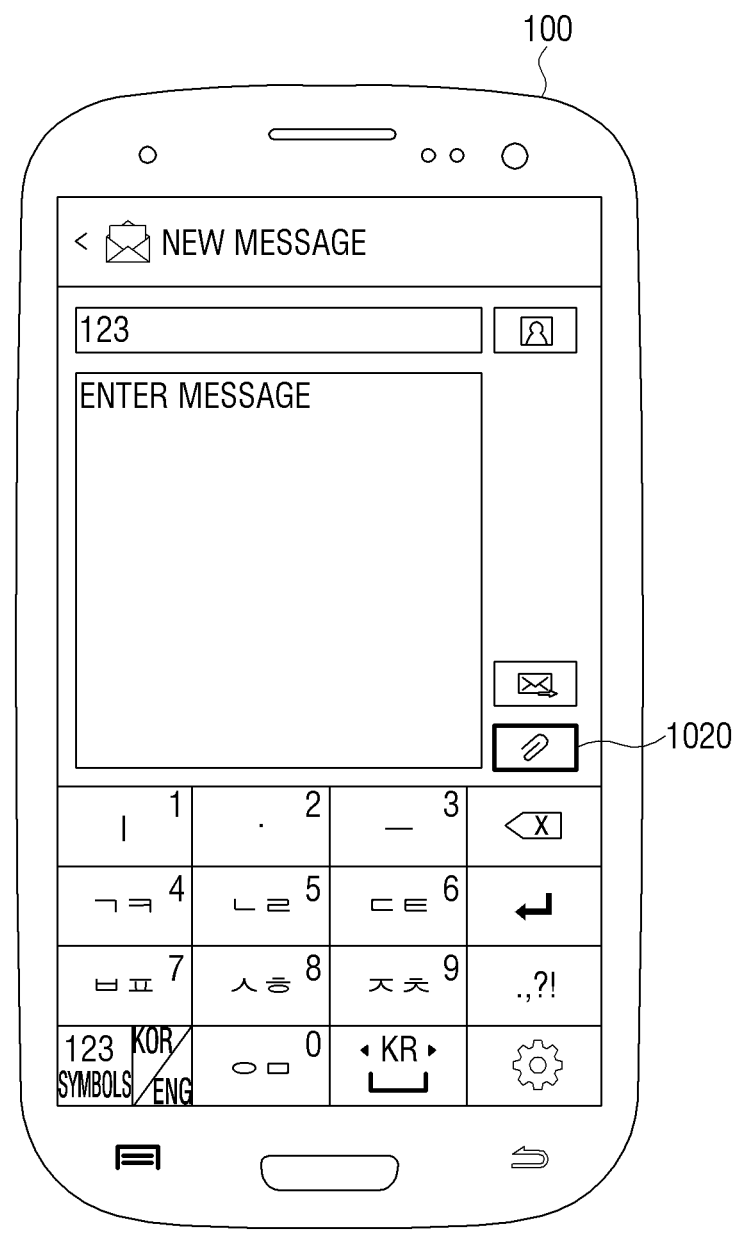

FIG. 10B illustrates a file attachment key 1020 in a focus setting on the text message interface. That is, the file attachment key 1020 is highlighted. In this way, the file attachment key 1020 may be emphasized because it was not previously easily locatable.

Figure 10C:
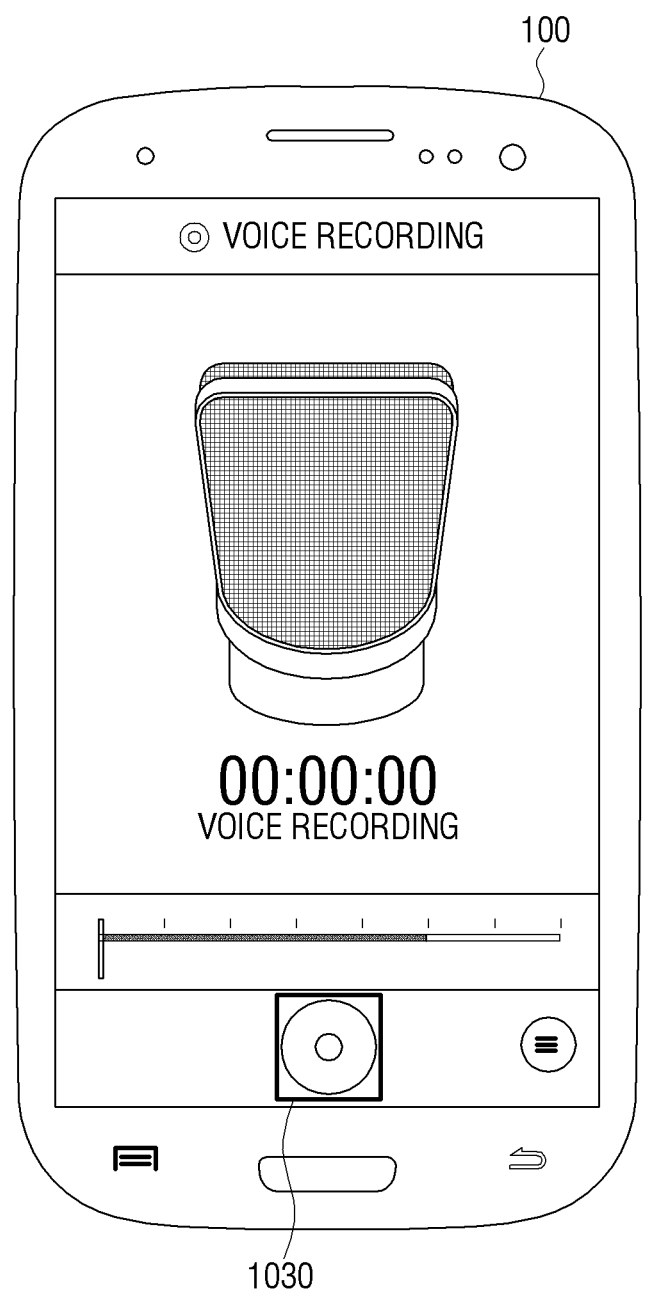
Figure 10D:
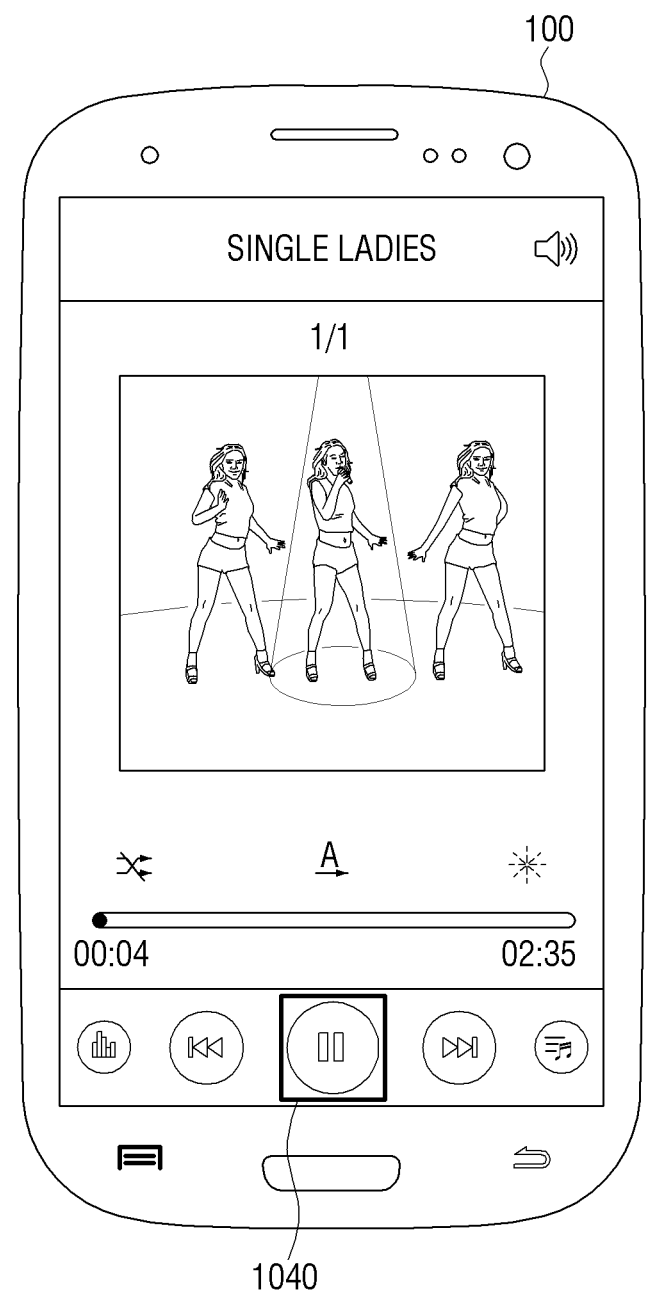

Similarly, FIG. 10C illustrates recording start button 1030 of a voice recording application in a focus setting. FIG. 10D illustrates a pause button 1040 of a video playback application in a focus setting.

Considering that the focus setting is used to increase visibility of an object whose use is relatively higher than others, haptic response or sound feedback may meet the similar purpose. This will be explained in detail below.

Figure 11A:
FIGS. 11A to 11D are views illustrating a use of a haptic response according to an exemplary embodiment.
Figure 11B:
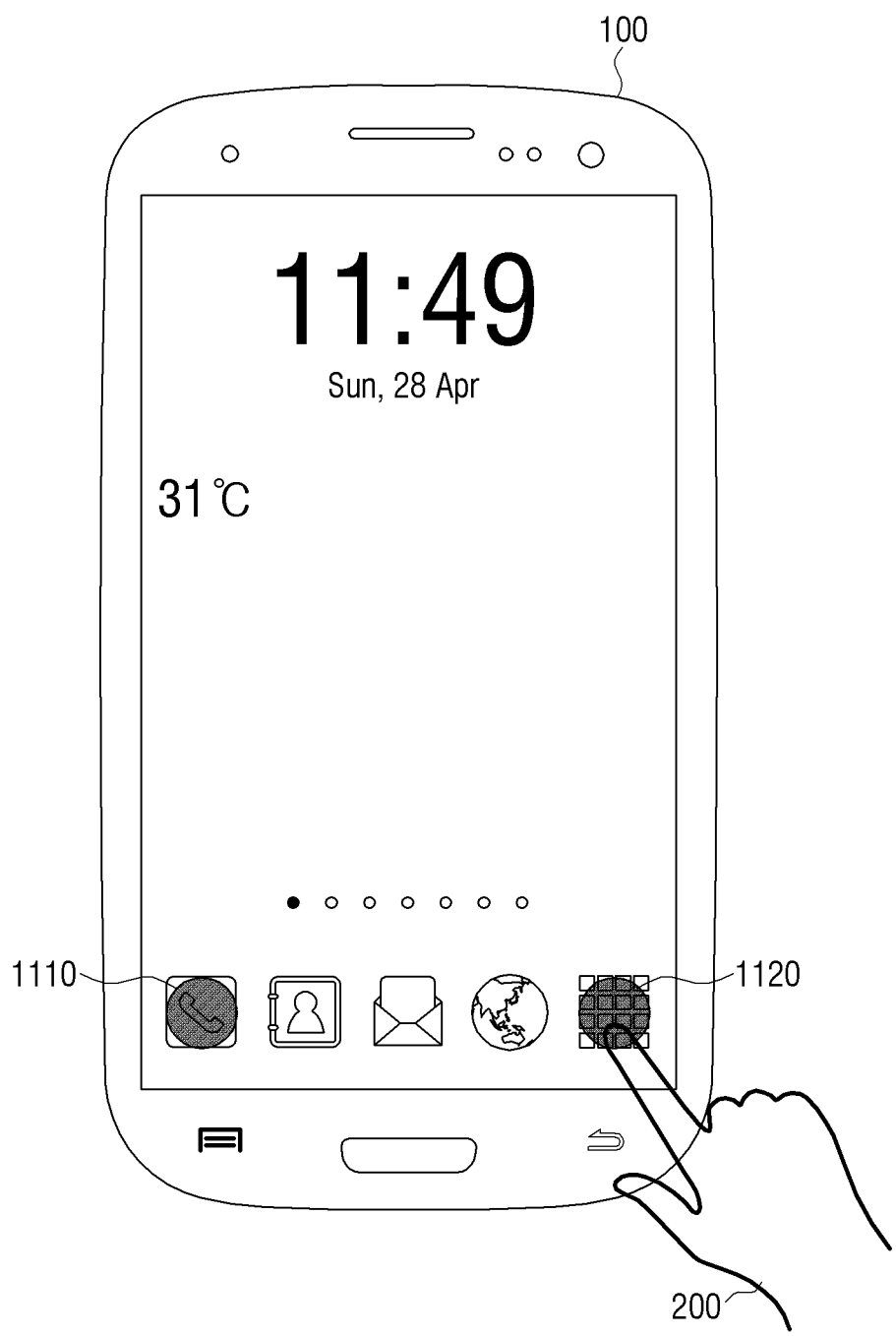

FIGS. 11A and 11B are views illustrating a use of haptic vibrations, according to an exemplary embodiment.

Similarly to focus setting, the haptic object may be set for more frequently-used applications, keys, objects, buttons or icons. In response to user input to the object, the controller 120 sets the object as a haptic object. In response to sensing approaching input toward the set haptic object as set, the controller 120 controls a vibration module (not illustrated) to output a haptic vibration.

FIG. 11A illustrates a phone call icon 1110 set as haptic object by the user object 200. Considering that the haptic function is stuck to the object, the above can be defined as 'haptic sticker'. FIG. 11B illustrates a haptic sticker set for the list of applications object 1120.

Figure 11C:
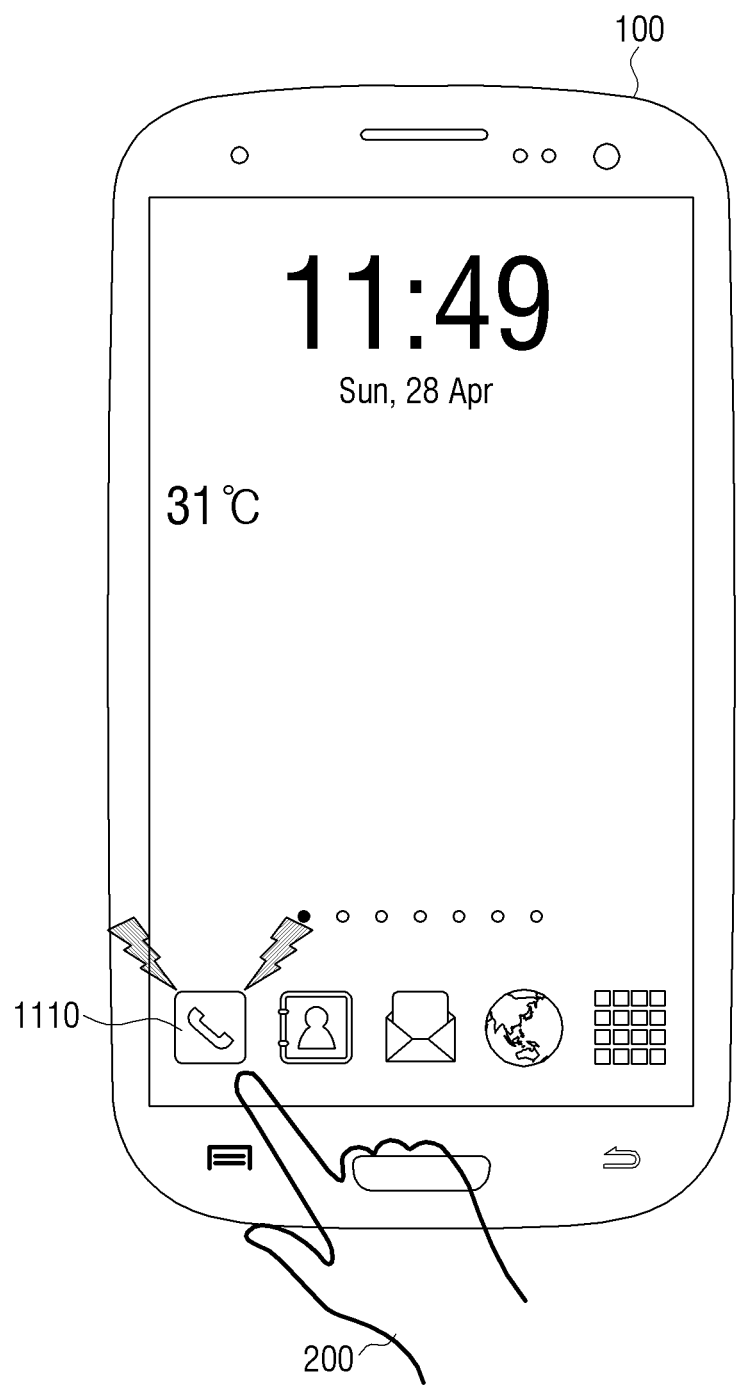
Figure 11D:

In response to approaching of the user object 200 toward the phone call object 1110, referring to FIG. 11C, a proximity sensor senses such approach of the user object 200 and haptic response occurs. Likewise, when the user object 200 is near to the list of applications object 1120, referring to FIG. 11D, the haptic output is performed. Accordingly, the user knows that the corresponding object is more frequently used than others. There may be a plurality of haptic responses, in which case different haptic responses may be set. That is, the haptic responses may be categorized into haptic 1, haptic 2, haptic 3, and so on, depending on importance, order of setting, or type of objects.

In response to sensing approach toward the haptic object as set, the controller 120 may control a speaker to output a voice message corresponding to the sensed approach input.

FIGS. 12A to 13B are views illustrating haptic and voice responses according to another exemplary embodiments.

Figure 12A:
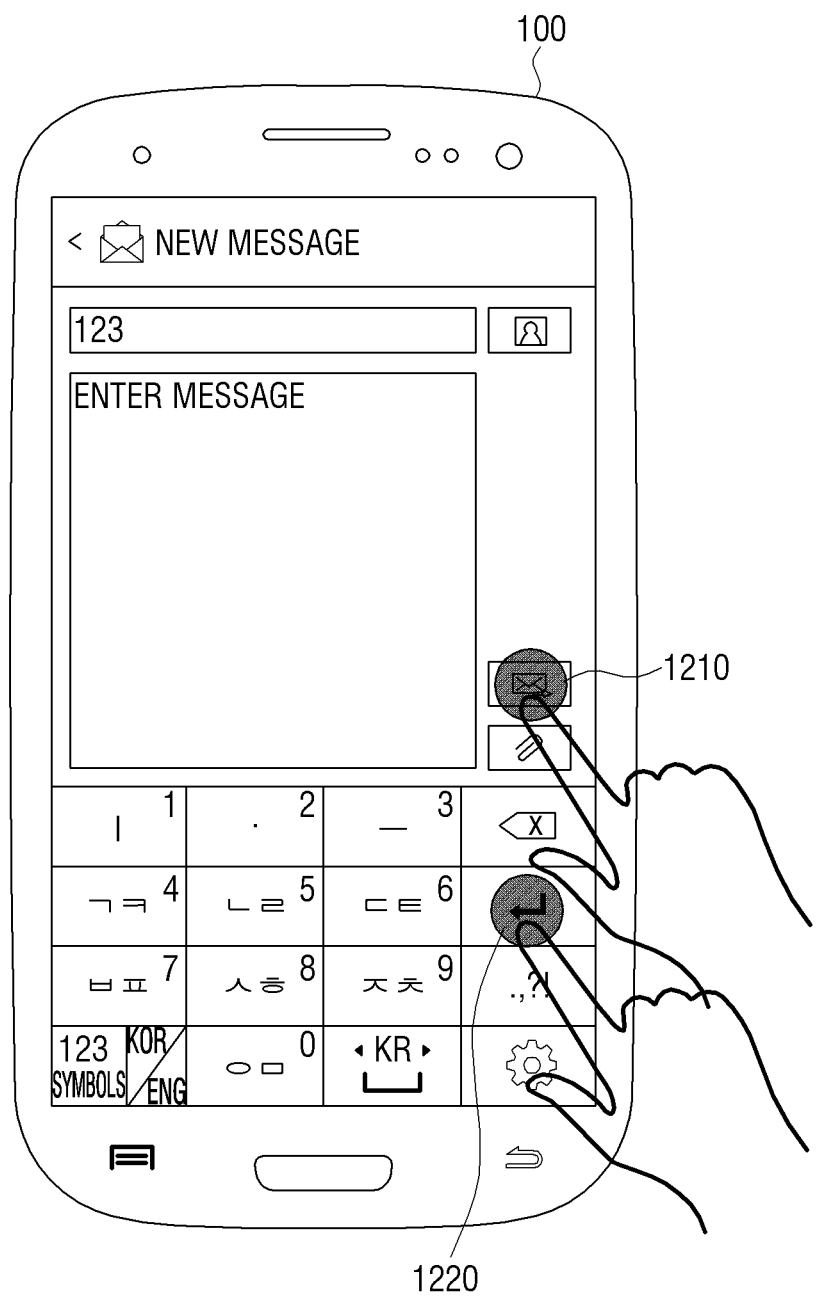
FIGS. 12A to 13B are views illustrating haptic and voice responses according to another exemplary embodiment.

FIG. 12A illustrates a send key 1210 set as a haptic object and a line-break key 1220 of the text message window set as voice object by the user with the user object 200.

Figure 12B:
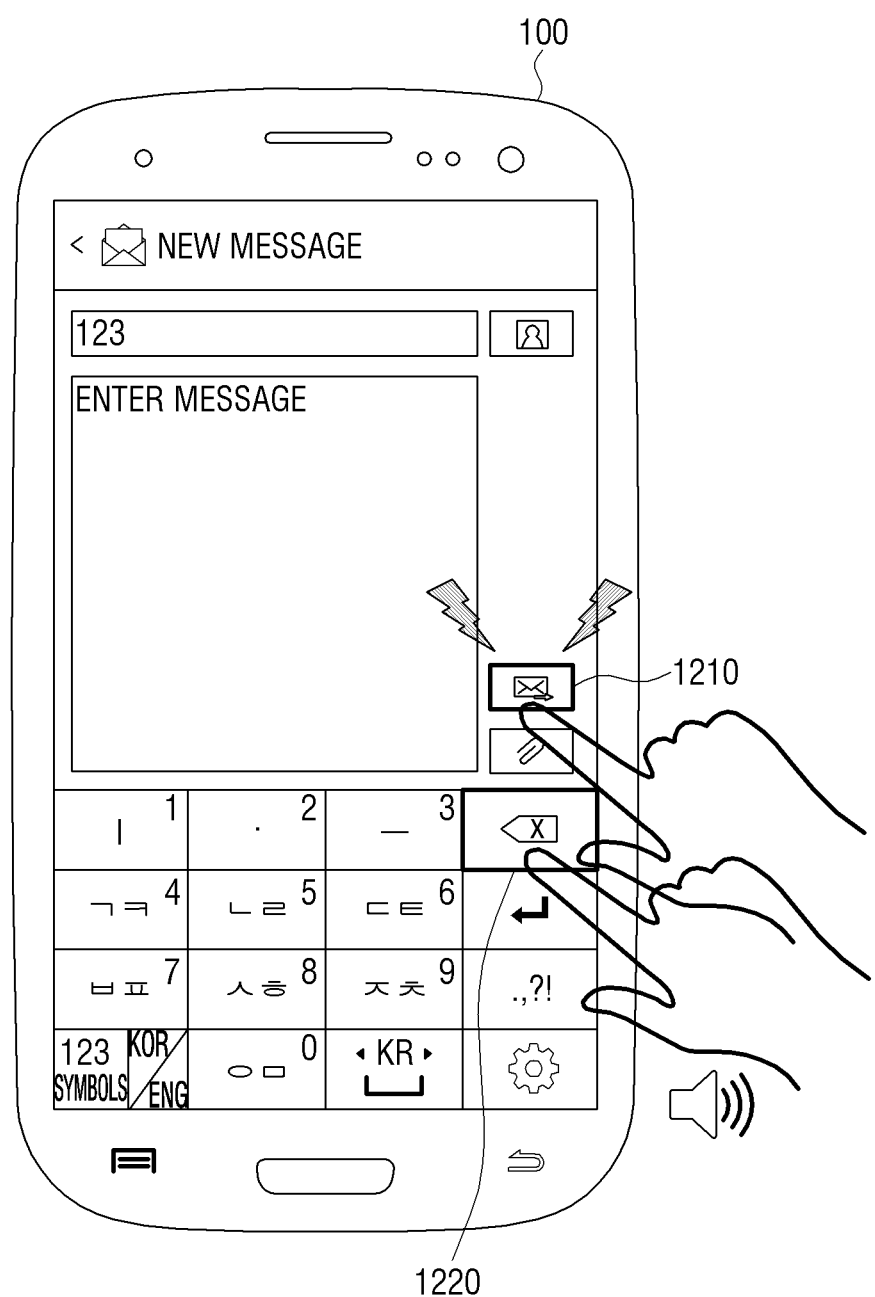

The haptic response thus occurs in response to the user object 200 which opens the text message window and approaches the send key 1210. However, a voice message is outputted when the user object 200 approaches the line-break key 1220. The voice message may sound like "backspace". A haptic response may accompany the voice message (FIG. 12B). Accordingly, the user knows that the corresponding object is more frequently used than others.

Figure 13A:
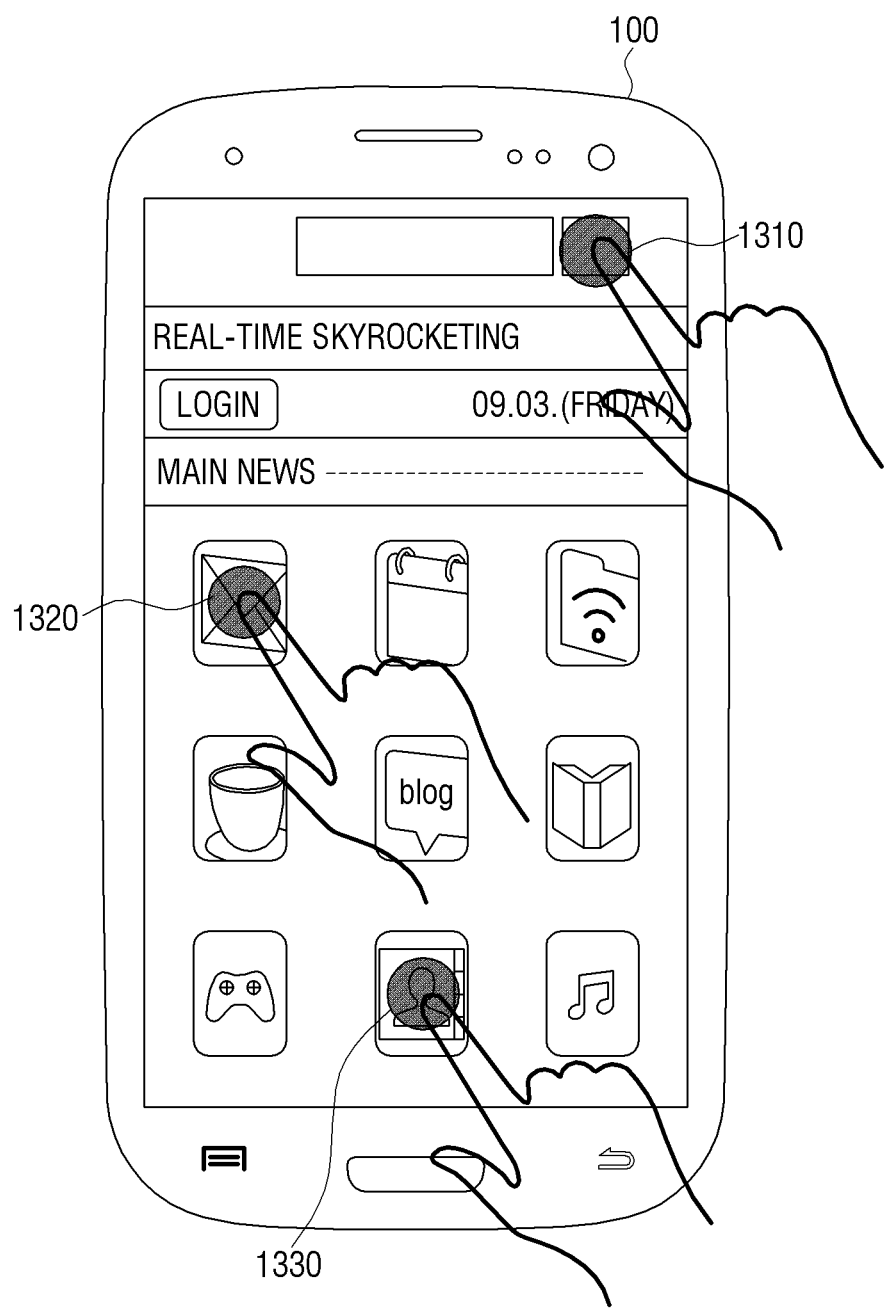
Figure 13B:
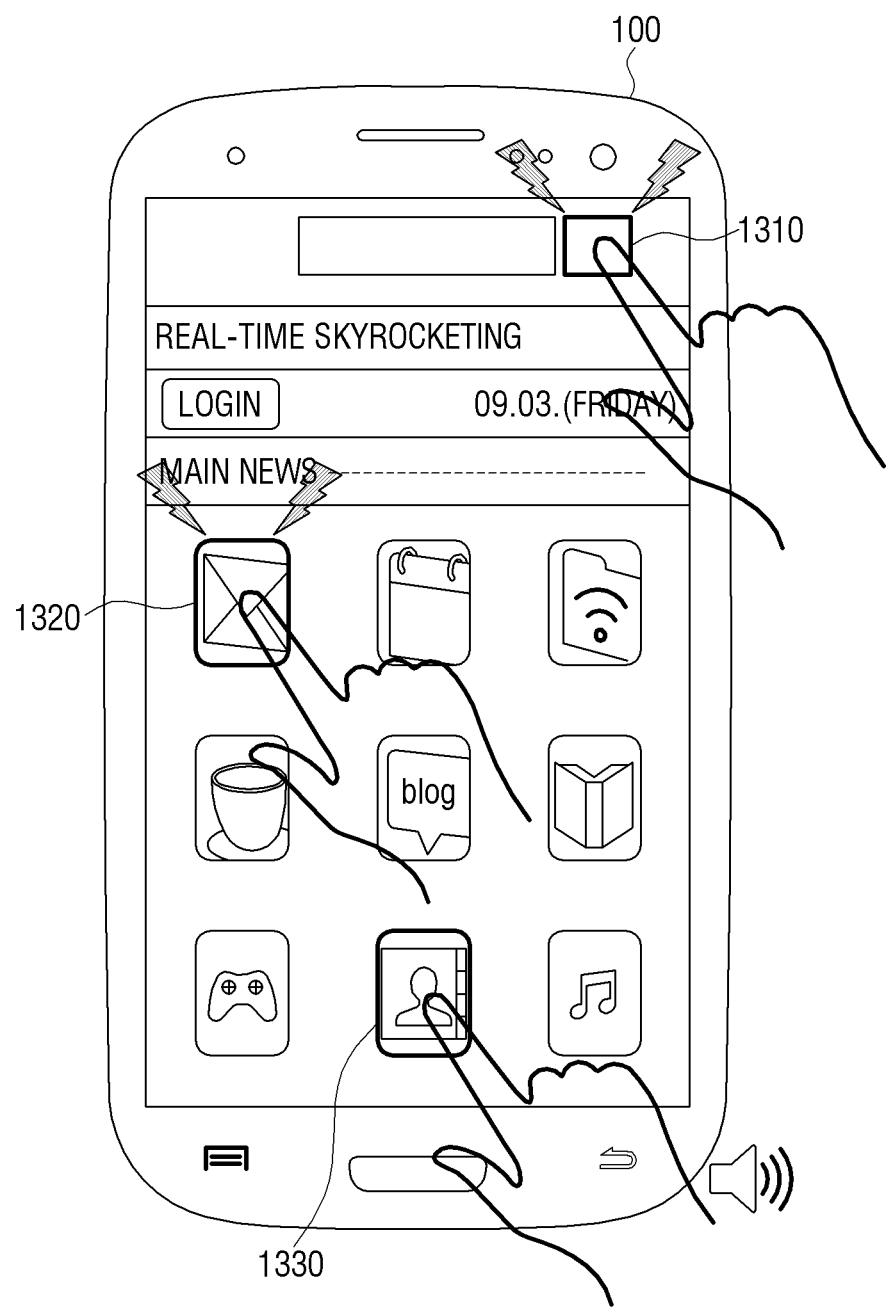

FIGS. 13A and 13B illustrate similar embodiments. Referring to FIGS. 13A and 13B, haptic sticker may be set even for the web icons 1310 and 1320 that are supported by the web. Web icon 1330 may be set as a voice object.

Hereinbelow, interface of the display apparatus 100 according to another exemplary embodiment, and executing functions of the display apparatus 100 through such interface according to one or more exemplary embodiments, will be explained.

Figure 14A:
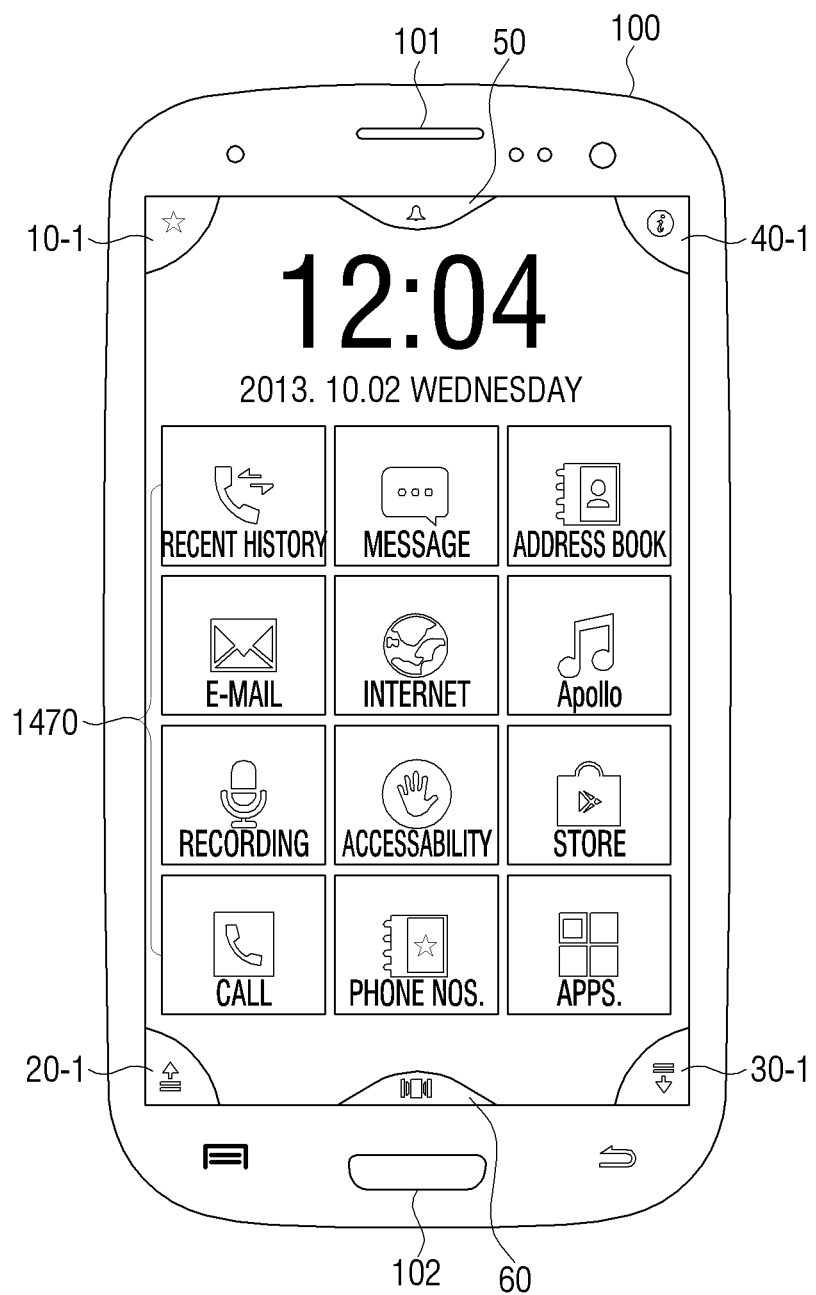
FIGS. 14A to 14C are reference views illustrating an interface of a display apparatus according to an exemplary embodiment.
Figure 14B:
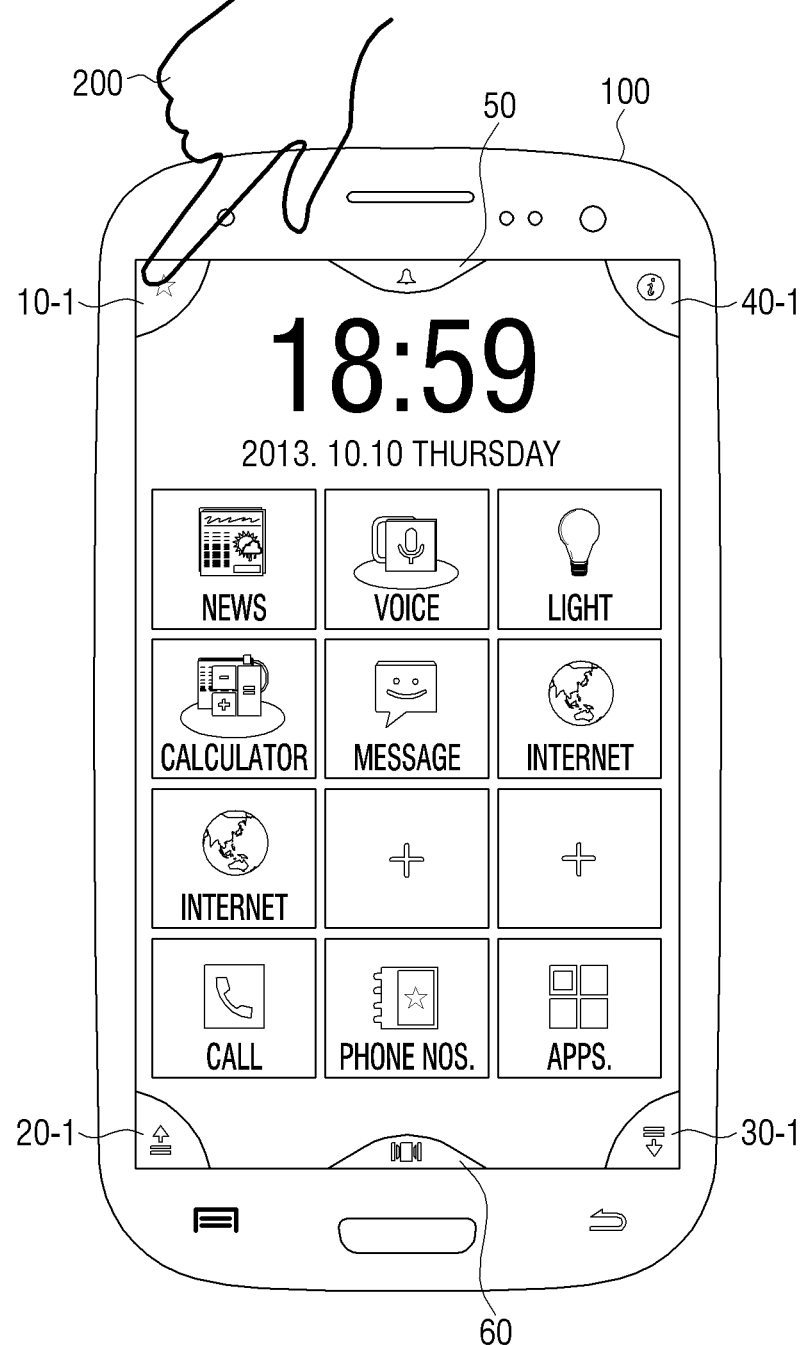
Figure 14C:
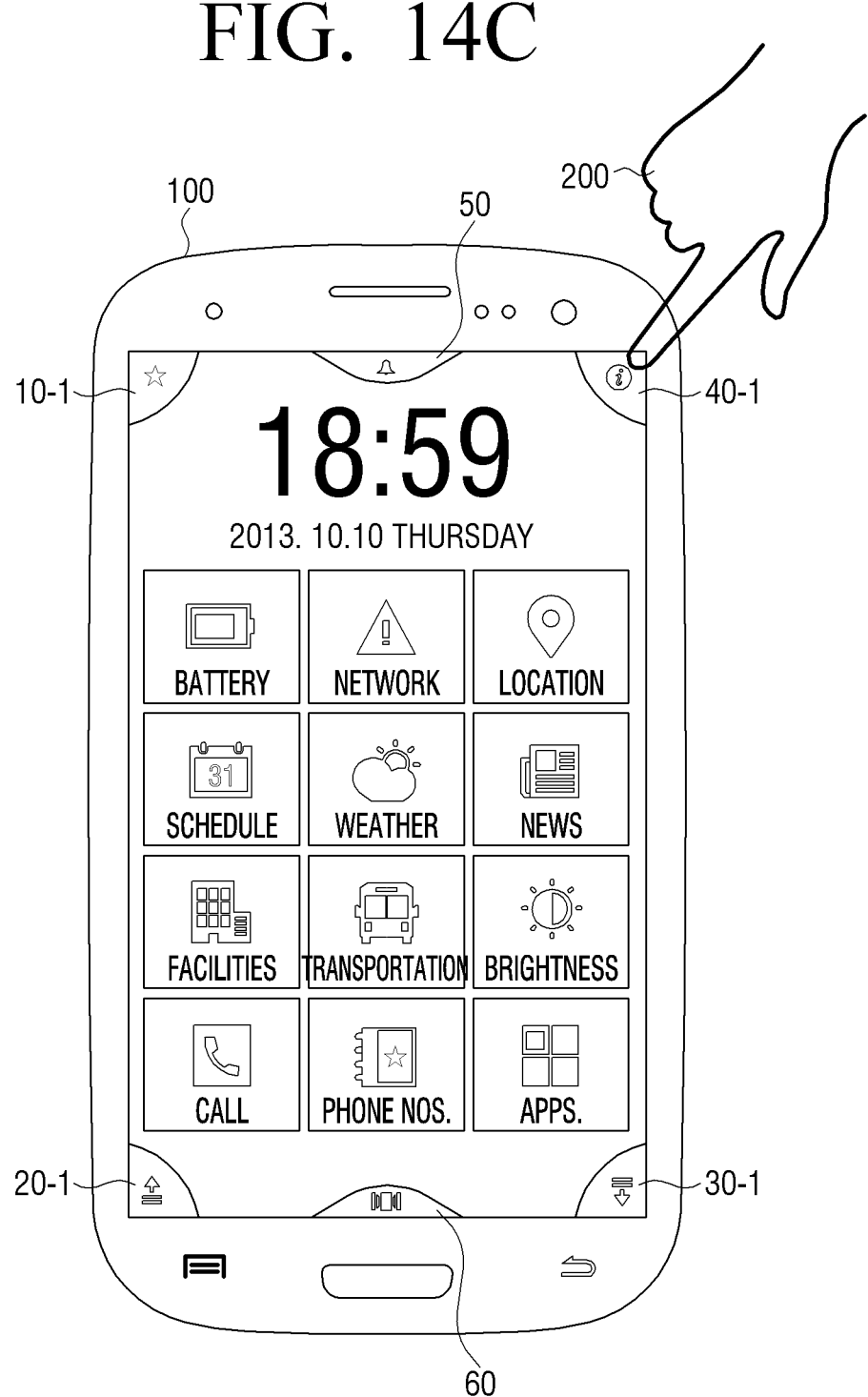

FIGS. 14A to 14C are reference views illustrating an interface of the display apparatus 100 according to another exemplary embodiments.

Referring to FIG. 14A, the interface of the display apparatus 100 according to another exemplary embodiment displays a plurality of objects 10-1, 20-1, 30-1, 40-1, 50, and 60 for menu selection, on an edge area of the screen. The edge area on the screen may include corner areas 10-1, 20-1, 30-1, and 40-1 or center areas 50 and 60 of one of sides of the screen. The center areas 50 and 60 of one of sides of the screen may include a center area 50 of an upper side of a display screen and a center area 60 of a lower side, and may additionally include centers of both left and right sides (not illustrated).

Because the center 50 of the upper side of the screen is in a linear relationship in a downward direction from an upper speaker 101 of the display apparatus 100, the center 50 of the upper side of the screen is located where the user object and the screen meets, a user may locate the center area 50 by touching the upper speaker 101 and moving downward in a direction toward the lower screen. Also, because the center 60 of the lower side of the screen is in a linear relationship in a upward direction from a lower button 102 of the display apparatus 100, the center 60 of the lower side of the screen is located where the user object and the screen meets, and a user may locate the center area 60 by touching the lower button 102 keeps moving upward. Accordingly, even those with impaired vision can easily find the center 50 of the upper side and the center 60 of the lower side of the screen.

The edge area of the display apparatus 100 is one of the most accurate places of the display apparatus 100 that a user can detect with tactile sense. This equally applies to visually-impaired user. Accordingly, the edge areas 10-1, 20-1, 30-1, 40-1, 50, and 60 may be the reference locations that can receive user commands. As explained above, the respective edge areas 10-1, 20-1, 30-1, 40-1, 50, and 60 display objects for menu selection. In one embodiment, the objects for menu selection are defined as 'guide objects'. The user touch input may be received on the guide objects.

The respective edge areas 10-1, 20-1, 30-1, 40-1, 50, and 60 may be distinguished from each other so that user inputs received thereto are considered to be different user inputs, respectively. That is, the first, second, third, fourth, fifth, and sixth edge areas, 10-1, 20-1, 30-1, 40-1, 50, and 60, respectively, may receive respective user inputs distinct from each other.

The controller 120 of the display apparatus 100 may control objects corresponding to the menu to be displayed on the screen, in response to a user input such as a touch input being received at the guide objects in the edge area. Depending on the location where the user input is received, the menu displayed on the screen may vary. Further, when an item is selected from the menu, a function that corresponds to the selected item may be executed.

Referring to FIG. 14A, the menu 1470 includes a plurality of menu items and in response to user input being received at a menu item, the controller 120 may execute a corresponding function. The plurality of menu items may be displayed in a tile pattern, or in different colors from each other (FIG. 14A).

FIG. 14B illustrates a user object 200 making a touch input to the first edge area 10-1 (or guide object displayed on the first edge area). In response to the user input being received at the first edge area 10-1, the controller 120 of the display apparatus 100 may control so that favorite menu appears. In an embodiment illustrated in FIG. 14B, menu items including news, voice, lighting, calculator, or message may be registered as favorites. In response to user input being received at respective menu items, the controller 120 of the display apparatus 100 may perform a corresponding function. For example, in response to a user input being received at a calculator item, the controller 120 of the display apparatus 100 executes a calculator application.

FIG. 14C illustrates a user object 200 making touch input to the fourth edge area 40-1 (or guide object displayed on the fourth edge area). In response to the user input being received at the fourth edge area 40-1, the controller 120 of the display apparatus 100 may control so that an application menu appears, showing various information. In the exemplary embodiment illustrated in FIG. 14C, the application menu includes menu items such as battery, network or location. In response to user input being received at respective menu items, the controller 120 of the display apparatus 100 may perform a corresponding function. For example, in response to a user input being received at a weather item, the controller 120 of the display apparatus 100 executes an application that shows weather information.

Accordingly, in response to user inputs received at different edge areas, the controller 120 controls the vibration module (not illustrated) to generate different haptic vibrations and output the same. Accordingly, user can identify the edge areas more accurately.

As explained, the respective edge areas display guide objects. The guide objects represent characteristics of the displayed menu in response to user touch. For example, the favorite may have a star (★) guide object, suggesting the user that the corresponding object is related to favorites. While the guide objects provide convenient interface environment, these can also cause inconvenience. That is, the guide objects can hide screen which is displayed in response to executing an application. Accordingly, a solution is needed.

Figure 15A:
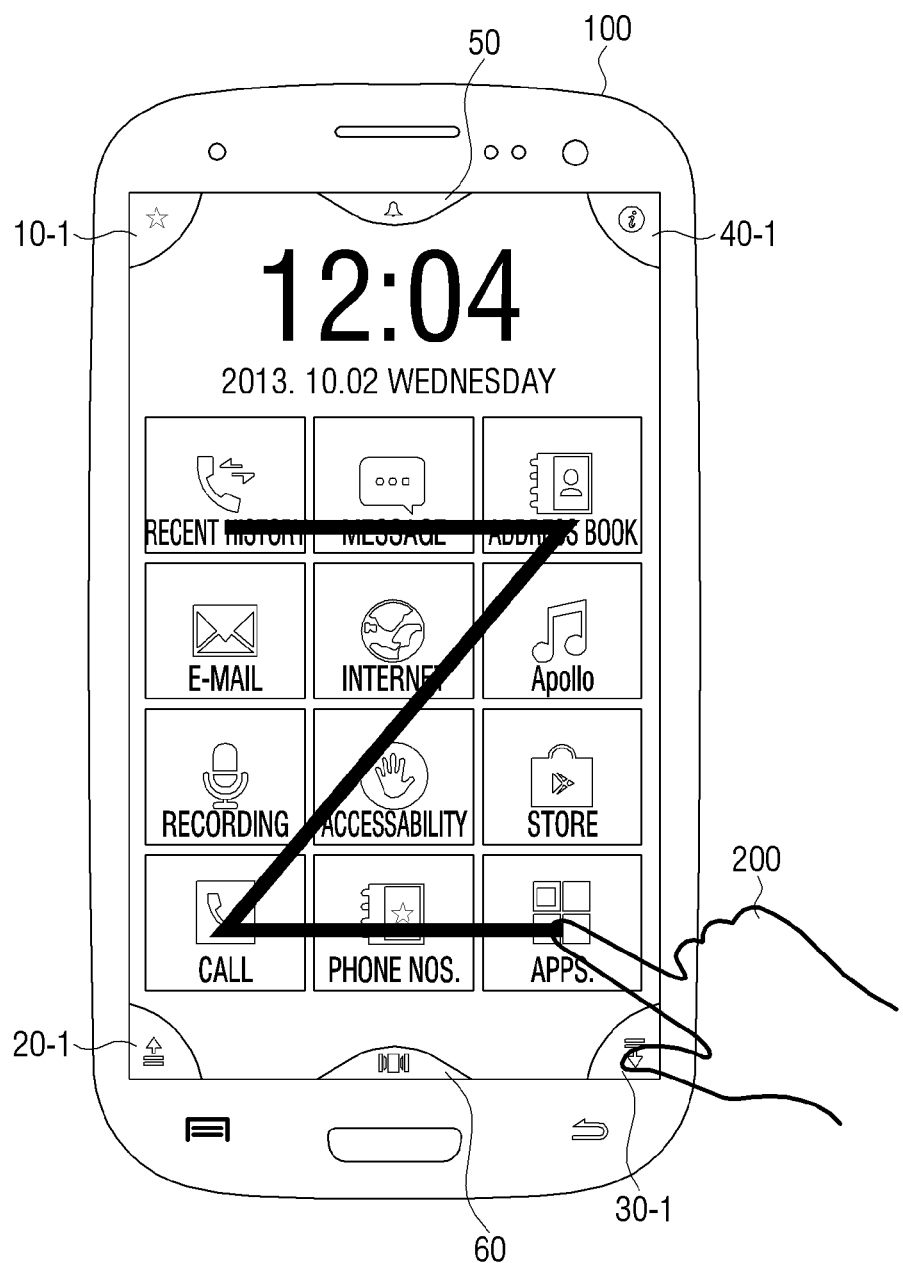
FIGS. 15A and 15B are views illustrating a removal of guide objects according to an exemplary embodiment.
Figure 15B:
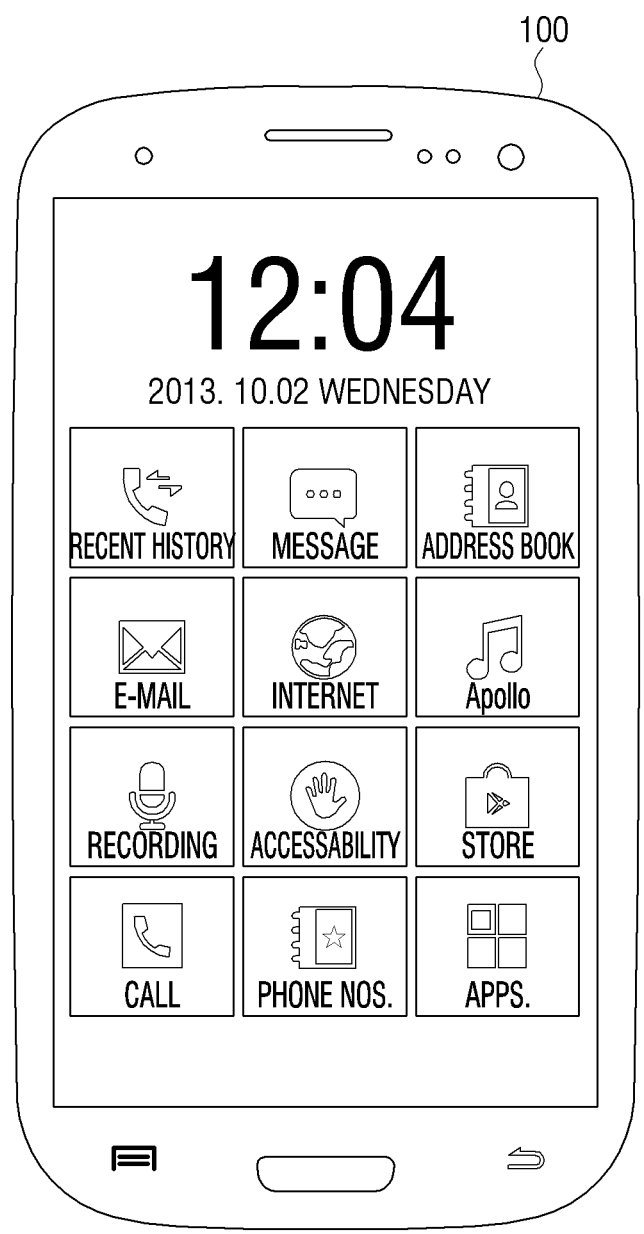

FIGS. 15A and 15B illustrating a removal of a guide object according to an exemplary embodiment.

In a state that the guide object is displayed, the controller 120 of the display apparatus 100 may remove the displayed guide object from the screen in response to a user's input which may be a preset touch gesture. Accordingly, referring to FIG. 15A, in response to user's input to the screen which may be a touch gesture in letter 'z' fashion, the guide object is removed as illustrated in FIG. 15B. The user convenience in using display apparatus 100 thus increase.

Figure 16A:
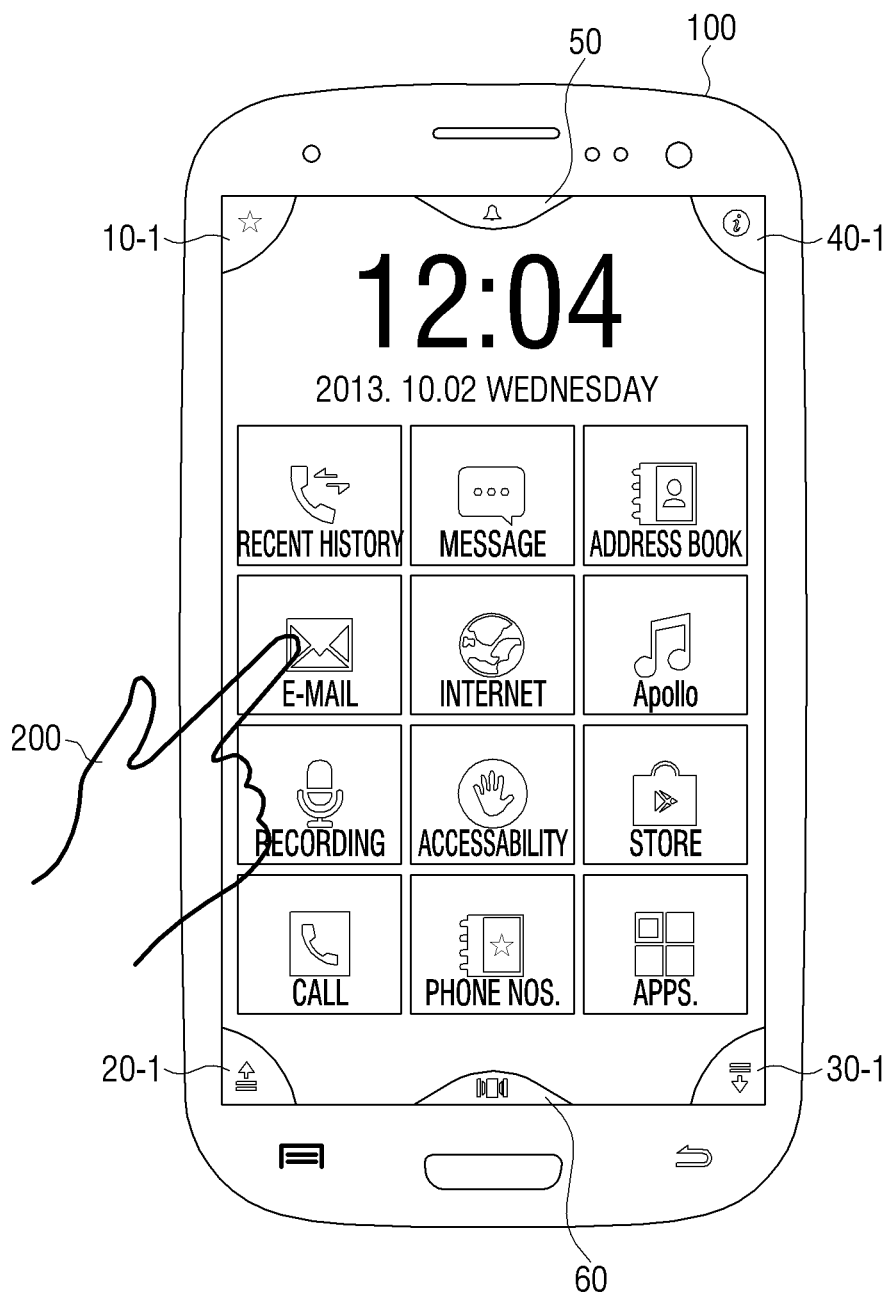
FIG. 16A is a view illustrating a display apparatus outputting a voice message according to an exemplary embodiment.
Figure 16A:

FIG. 16A is a view illustrating the display apparatus outputting a voice message according to an exemplary embodiment.

Referring to FIG. 16A, in response to a user input, the controller 120 may control a voice message corresponding to the received user input to be outputted. For example, in response to a touch input by the user object 200 with respect to the display item, the text included in such item may be converted into voice and outputted. To this end, the display apparatus may additionally include a text to speech (TTS) module. The TTS module converts text of an item into speech, in response to user input to the item.

The controller 120 may convert metadata related with a menu item into a voice message and output the same. Not only the text expressed in the menu item, but also additional information may be converted into a voice signal and outputted. For example, for menu items providing headlines of news, in response to user input being received for one of the menu items, the corresponding news story may be converted into a voice message and outputted. Accordingly, the user is informed of the news story conveniently, without having to read the story himself.

Meanwhile, the voice message may only be outputted with 'talkback' function being executed. The 'talkback' function refers to the function of outputting object information of the display apparatus 100 in the form of a voice message, particularly for those with impaired vision. When the user makes an input corresponding to an object, the controller 120 controls relevant information about the object to be outputted in the form of a voice message.

In response to user input which may be a multi-tap touch toward one of the edge areas, the controller 120 may set a talkback function. As explained, the edge areas of the screen may include the center 60 of the lower side of the display apparatus 100 screen. In response to a user's triple tap touch to the center 60 of the screen, the controller 120 may thus set the talkback function, although not limited thereto. Accordingly, the talkback function may be implemented according to a variety of other exemplary embodiments.

Figure 16B:
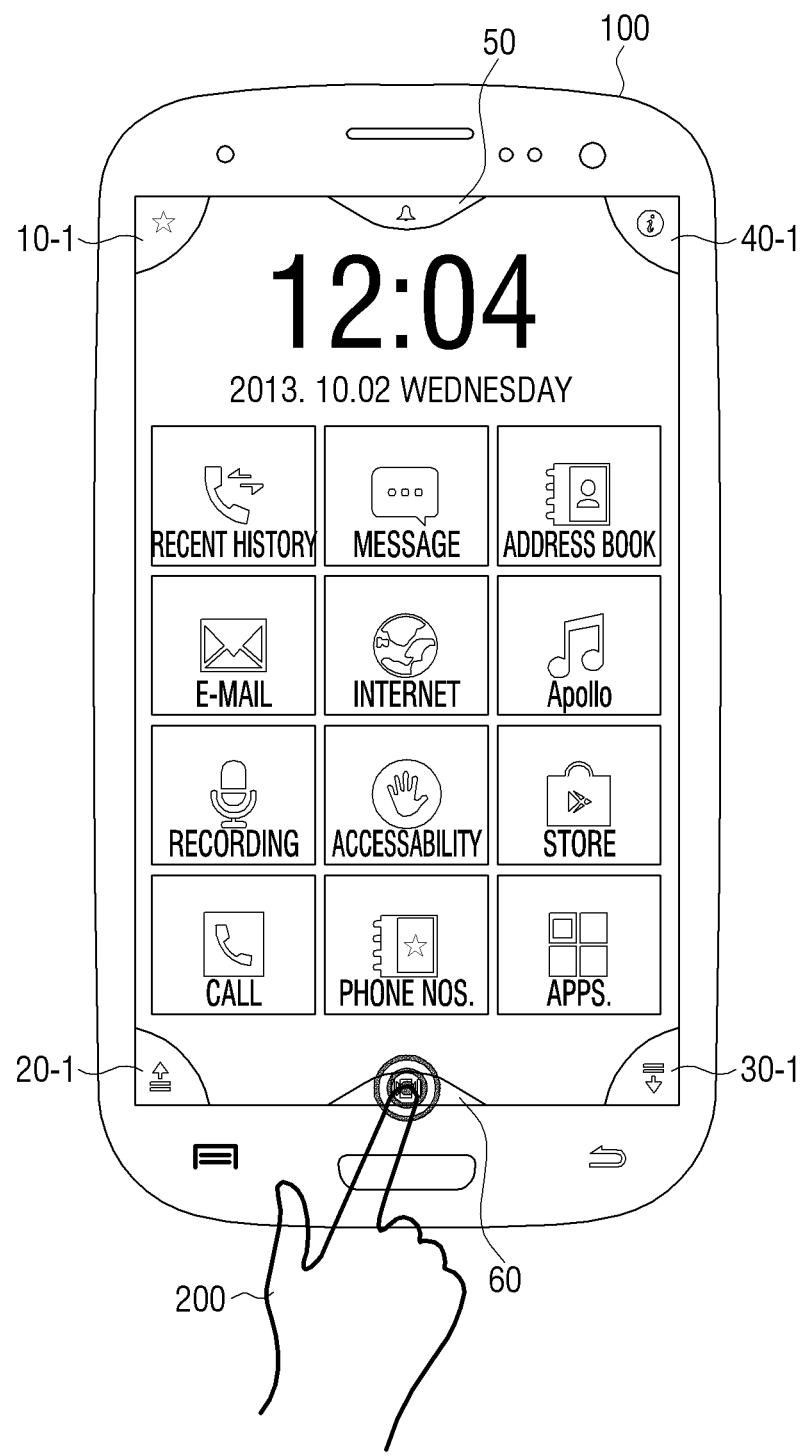
FIG. 16B is a view illustrating setting a talk-back function by a multi-tap touch, according to an exemplary embodiment.

FIG. 16B is a view illustrating setting a talkback function in response to multi-tap touch according to an exemplary embodiment.

Referring to FIG. 16B, when a triple tap is received to the center 60 of the lower side, the talkback function may be set. With the talkback function set, the talkback function may be executed in response to a user input which may be a single tap toward the menu item, and thus the information about the menu item is outputted in the form of a voice message. The controller 120 may output the voice message that corresponds to the received user input.

In an alternative exemplary embodiment, with the talk-back function set, the controller 120 may perform a function corresponding to a menu item or a function corresponding to the received user input, in response to a user input which may be a multi-tap touch with respect to the menu item.

Further, in response to the user input which may be the single tap touch input to an object displayed on the screen, the controller 120 may control the object to be displayed highlighted.

Figure 16C:
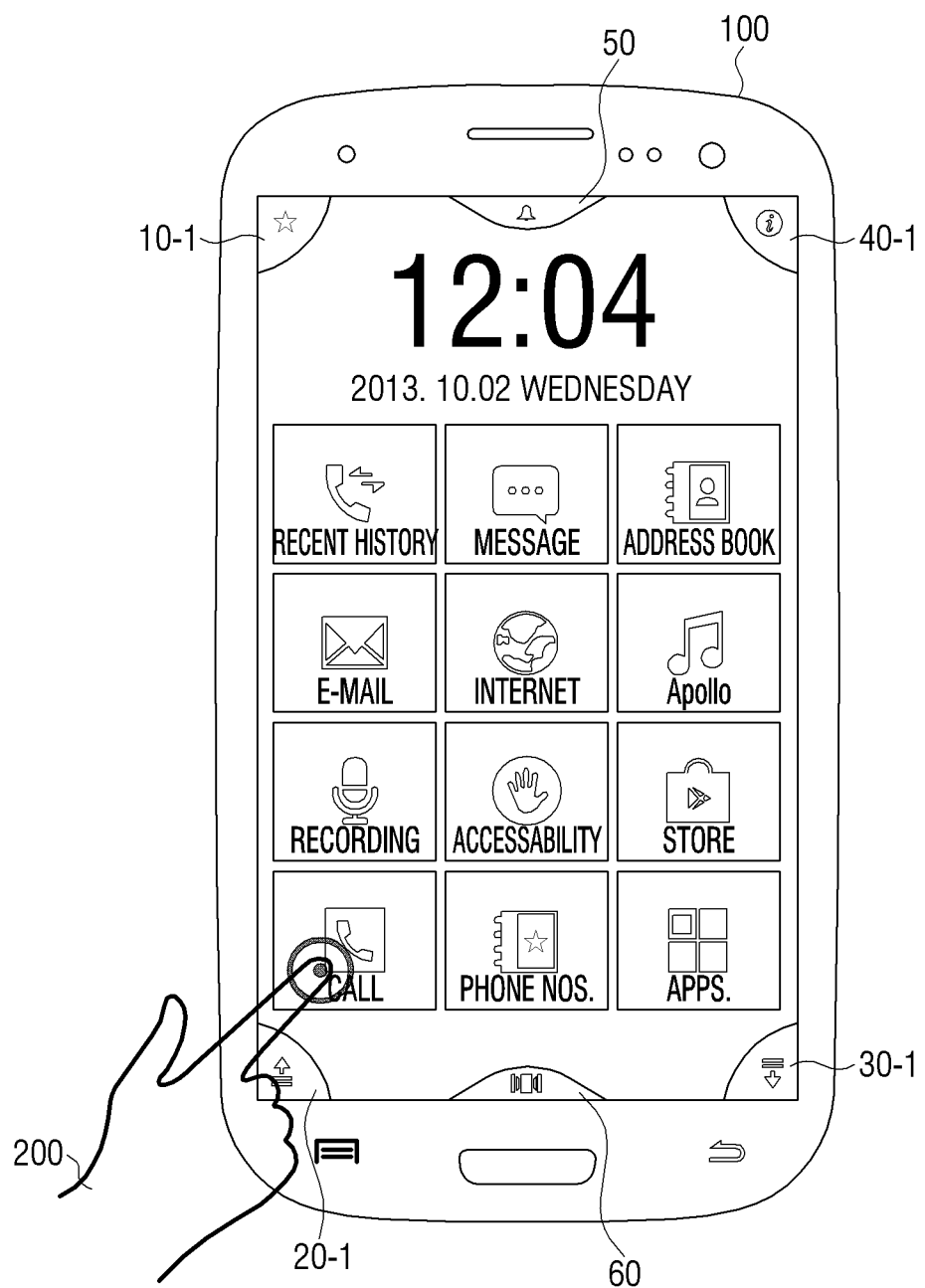
FIG. 16C is a view illustrating implementing a menu item by a multi-tap touch with a talk-back function being set according to an exemplary embodiment.
Figure 16D:
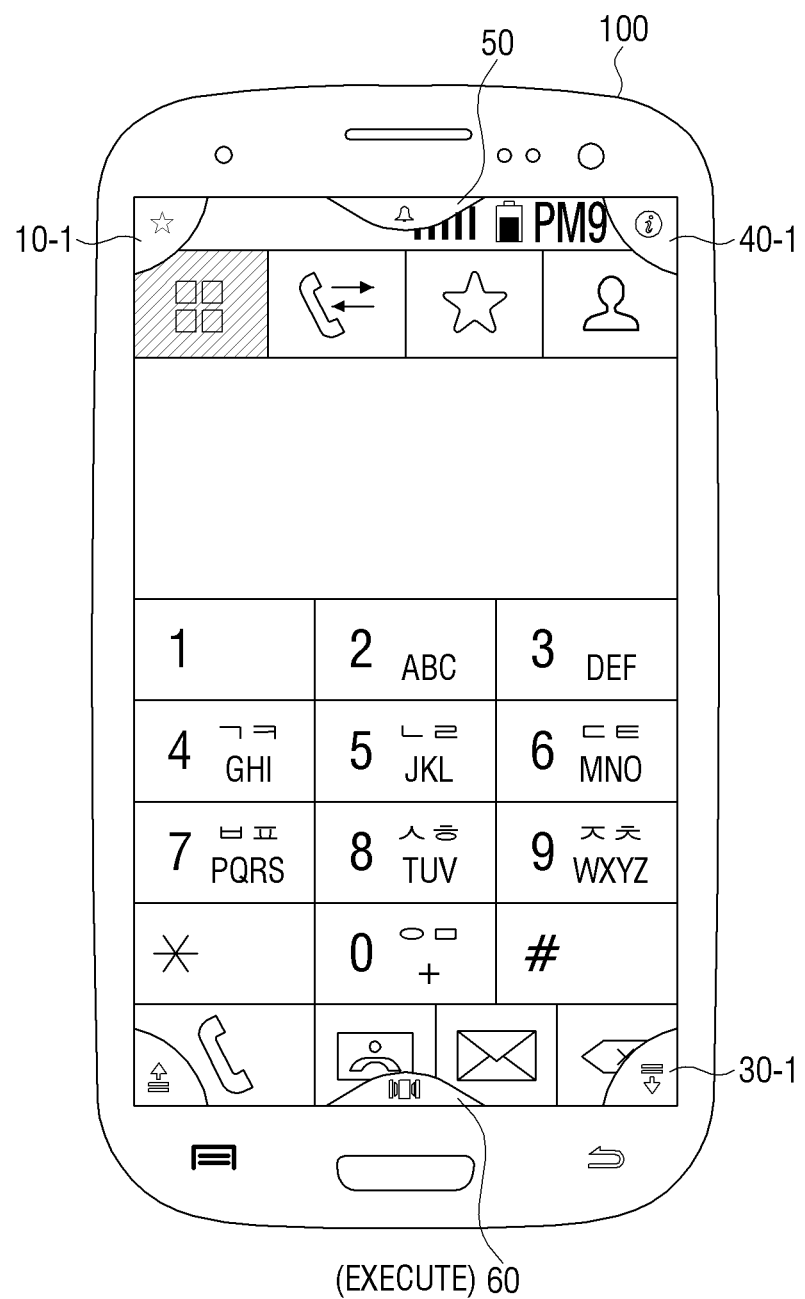
FIG. 16D is a view illustrating a screen on which a function of a menu item is implemented according to an exemplary embodiment.

FIG. 16C is a view illustrating implementing a menu item in response to a multi-tap touch with a talkback function set according to an exemplary embodiment, and FIG. 16D is a view illustrating a screen on which the function of the menu item is executed according to an exemplary embodiment.

Referring to FIG. 16C, with the talkback function set, when a menu item is selected in response to a double tap touch, the controller 120 executes a function corresponding to the menu item or the function corresponding to the received user input. In response to a user input which may be a double tap touch for the phone call menu item (FIG. 16C), the phone call screen appears (FIG. 16D).

However, an exemplary embodiment is not limited to any specific example only. Accordingly, when a function corresponding to received user input is executed in response to the user input which may be a multi-tap toward the edge area of the screen, the function may vary depending on the number of taps of the multi-tap touch.

Meanwhile, referring to FIGS. 14 to 16, when a plurality of items are displayed on screen, it is necessary to help visually-impaired user to find the locations of the menu items with convenience.

Figure 17:
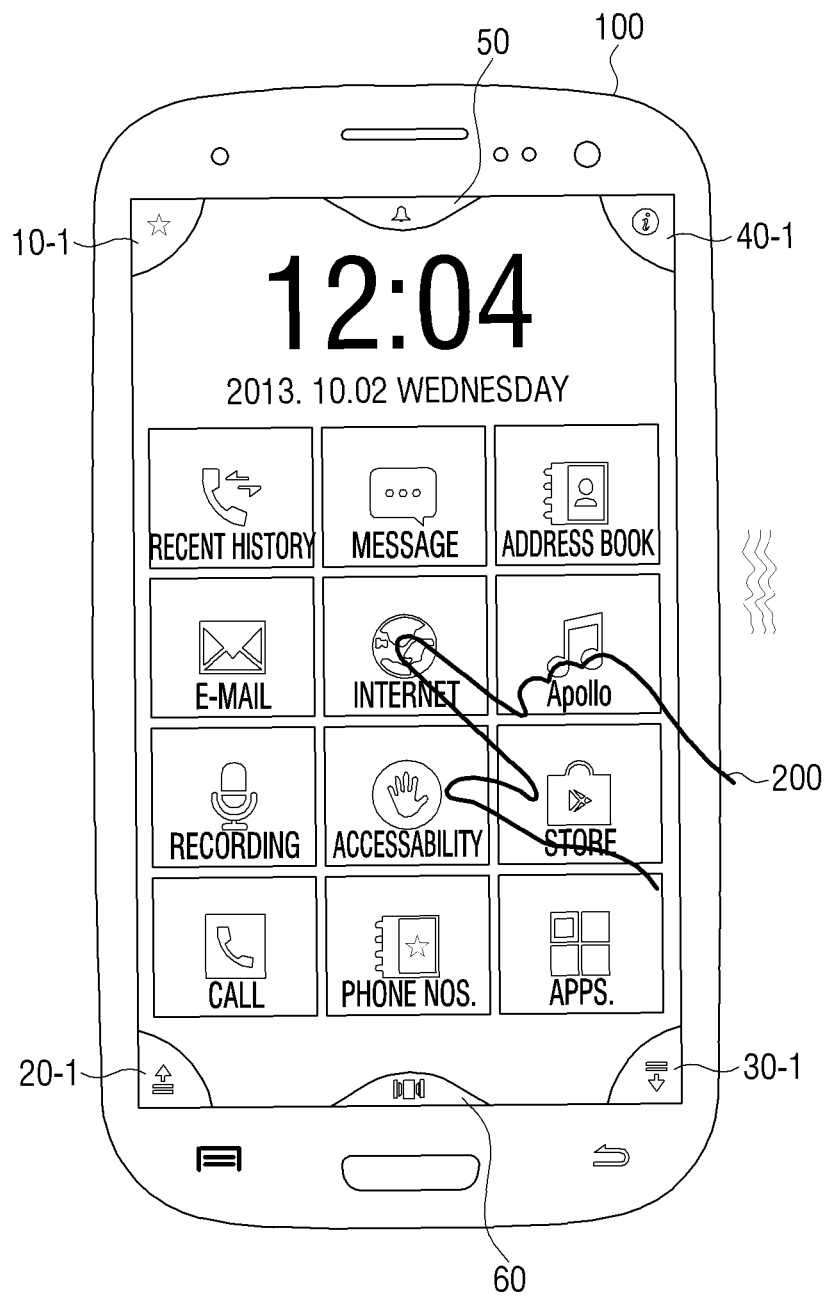
FIG. 17 is a view illustrating the expression of a reference location of an object by vibration, according to an exemplary embodiment.

FIG. 17 is a view illustrating the expression of the reference location of the object by vibration according to an exemplary embodiment.

Among a plurality of items of a menu, in response to a user input being received corresponding to an item at a preset location on the screen, the controller 120 may control a haptic vibration to be outputted. Referring to FIG. 17, when a user makes a touch input to the internet icon located at a center of the screen, the display apparatus 100 outputs haptic vibration. Accordingly, the user readily knows which item is currently at the center of the screen.

The user would need to access a setting screen of the display apparatus 100 with ease. The center 50 of the upper side of the display screen explained above may be utilized for this purpose. Alternatively, the user may execute the function by selecting a guide object displayed on the center 50 of the upper side of the screen.

Figure 18A:
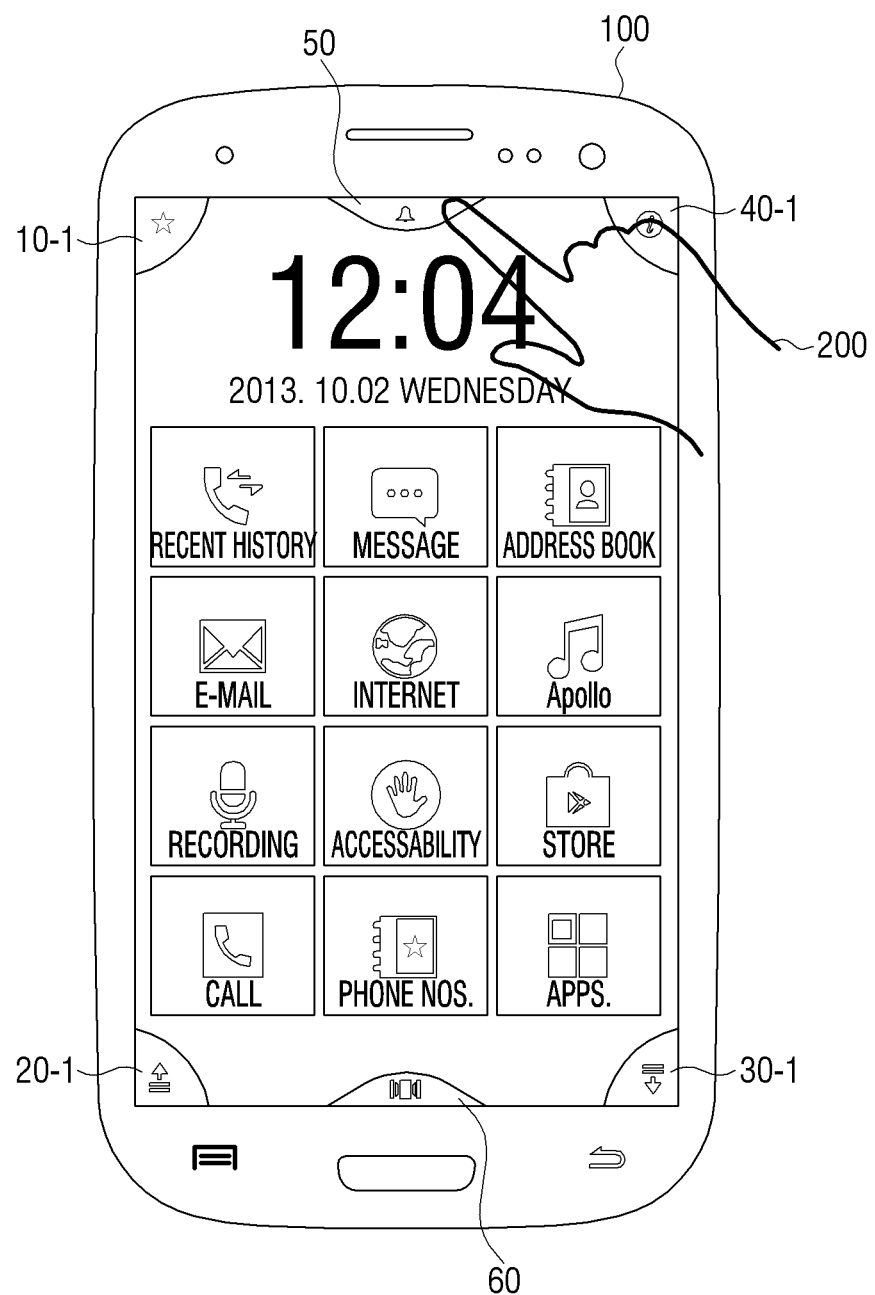
FIGS. 18A to 18C are views illustrating a menu structure utilizing the center of the upper side of a screen of a display apparatus according to an exemplary embodiment.
Figure 18B:
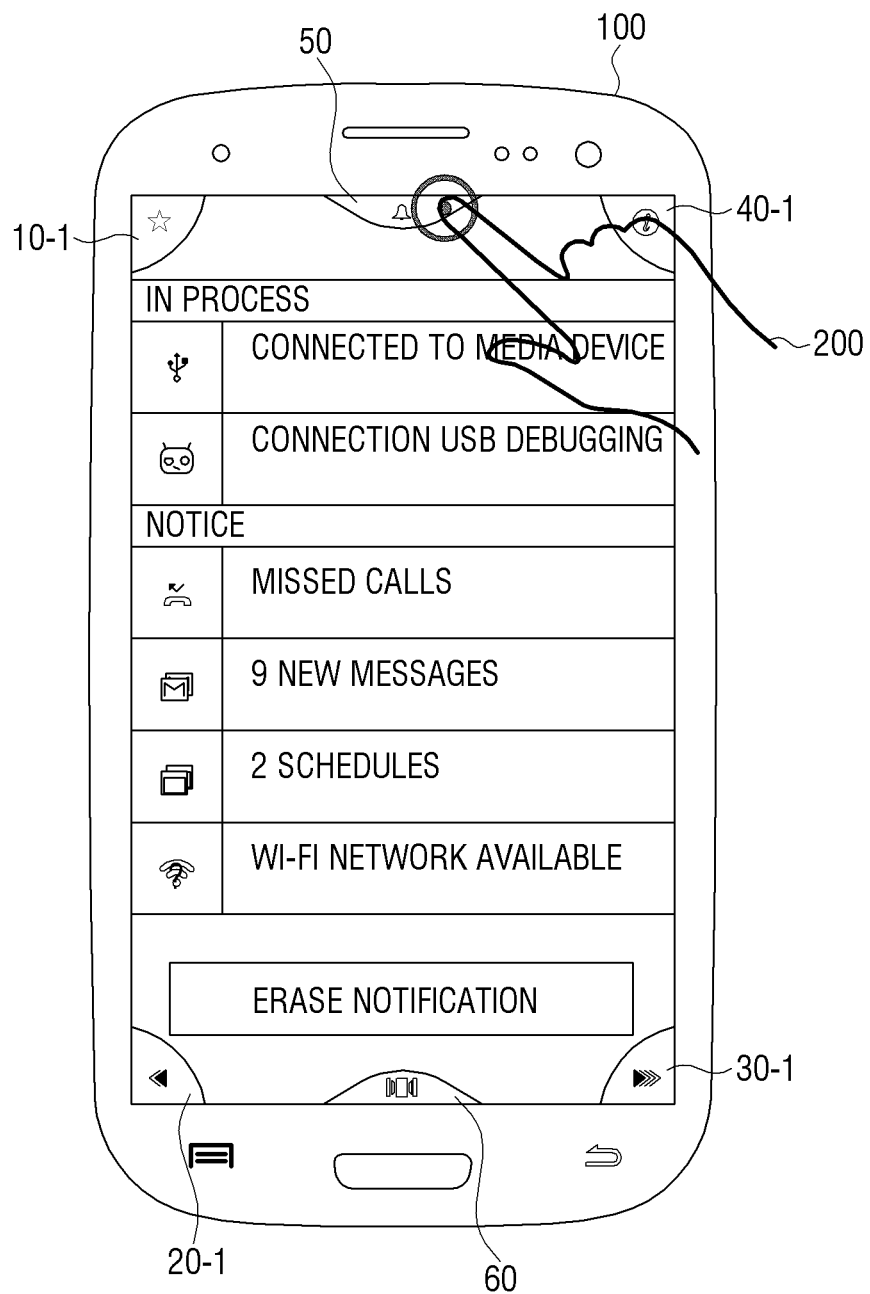
Figure 18C:
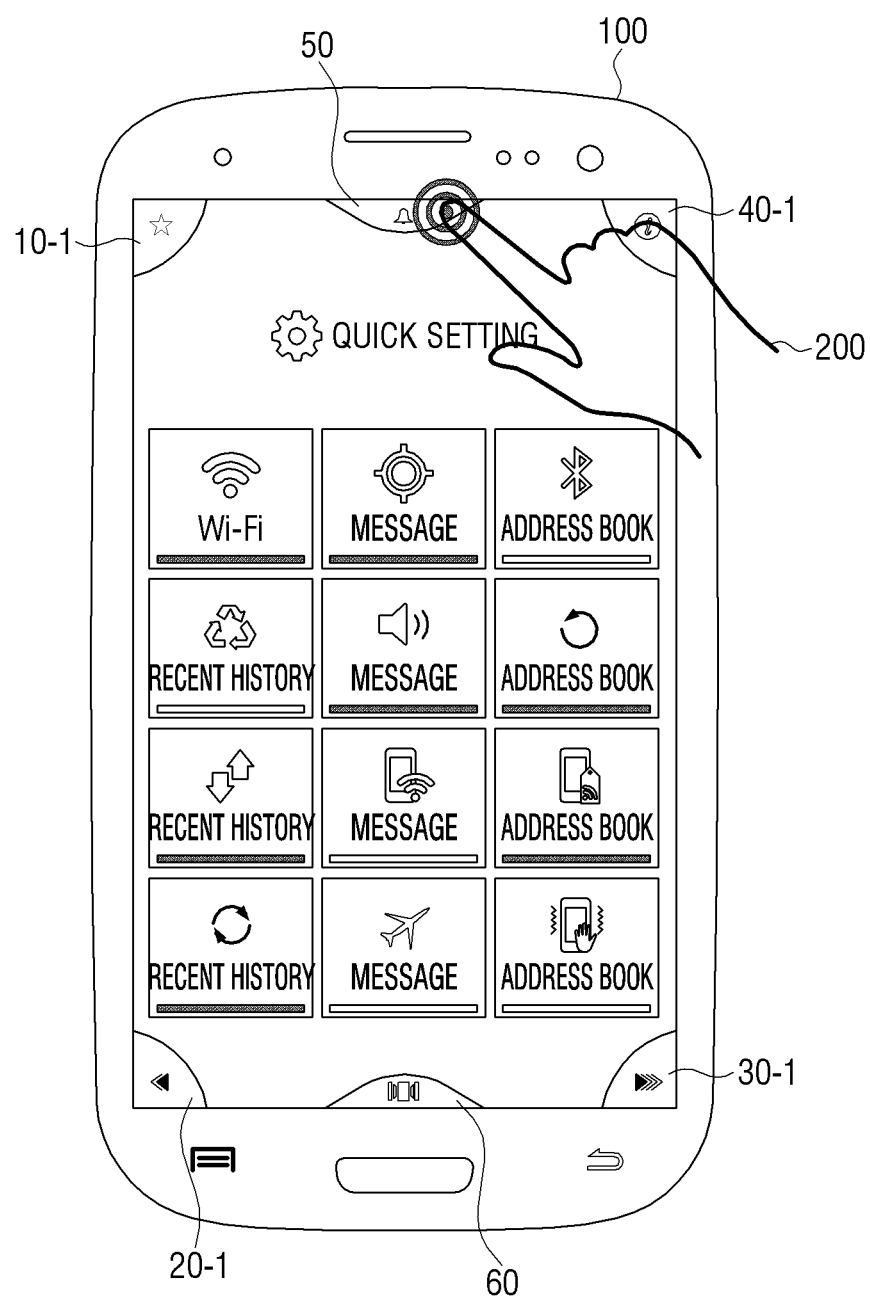

FIGS. 18A to 18C are views illustrating a menu structure that utilizes the center 50 of the upper side of the display apparatus 100 screen according to an exemplary embodiment.

Referring to FIG. 18A, the user may easily have a related menu displayed, by performing a user input to the center 50 of the upper side of the screen (or to a guide object displayed thereon) of the display apparatus 100.

Referring to FIG. 18B, in response to selecting of a menu item by double tap touch, the controller 120 displays recent notification message on screen. The display apparatus 100 may provide connection information to media devices, missed calls, message alarms, or schedules.

Referring to FIG. 18C, in response to selecting of a menu item by a triple tap touch, the controller 120 displays quick setting menus of the display apparatus 100 on screen. The quick setting menus may include a plurality of menu items such as Wi-Fi settings, message settings, voice message alarm settings, or address book settings.

Of course, an exemplary embodiment is not limited any specific example only. Rather, multi-tap touch may be used in a variety of other examples to execute the functions explained above.

Figure 19A:
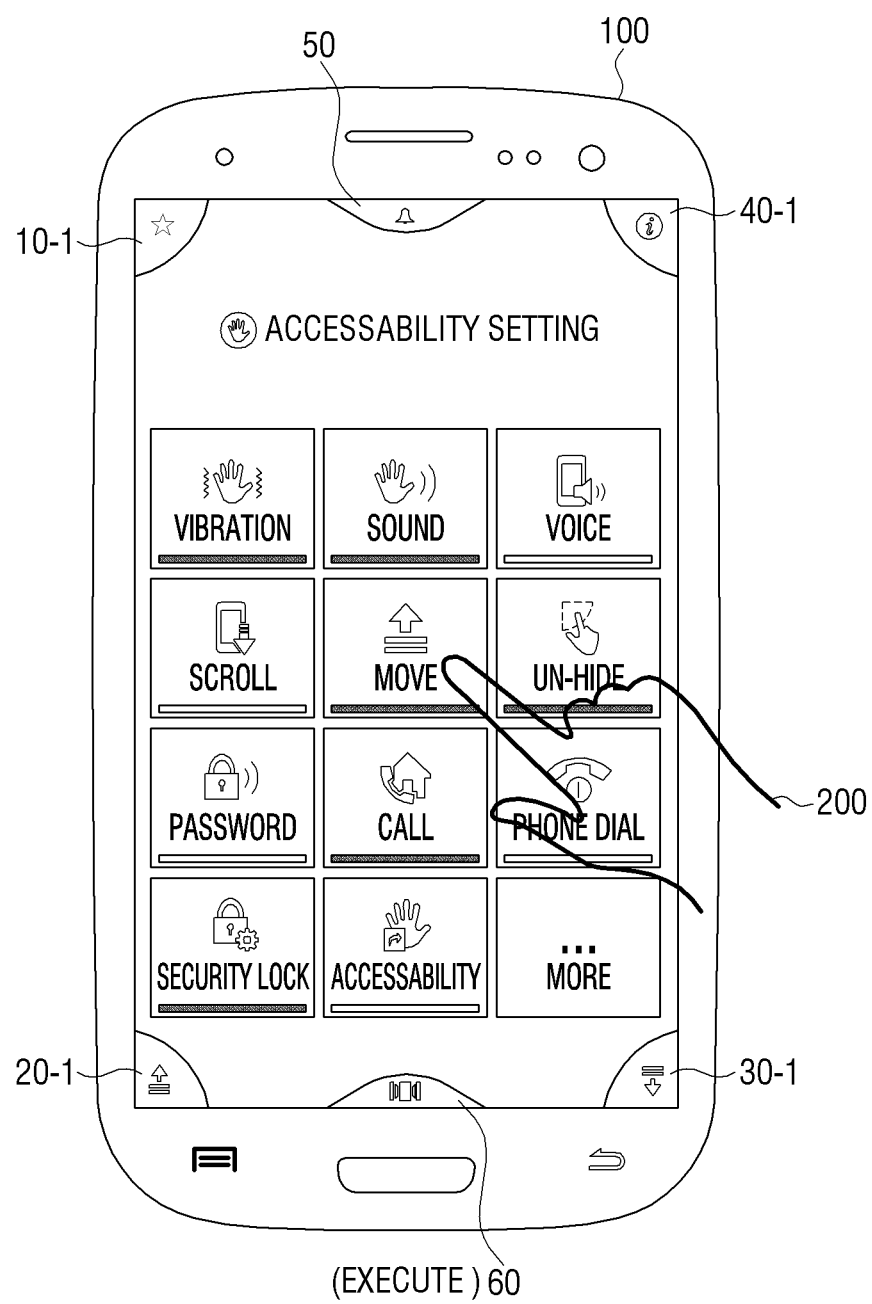
FIG. 19A is a view illustrating a screen on which an accessibility set menu is displayed according to an exemplary embodiment.
Figure 19B:
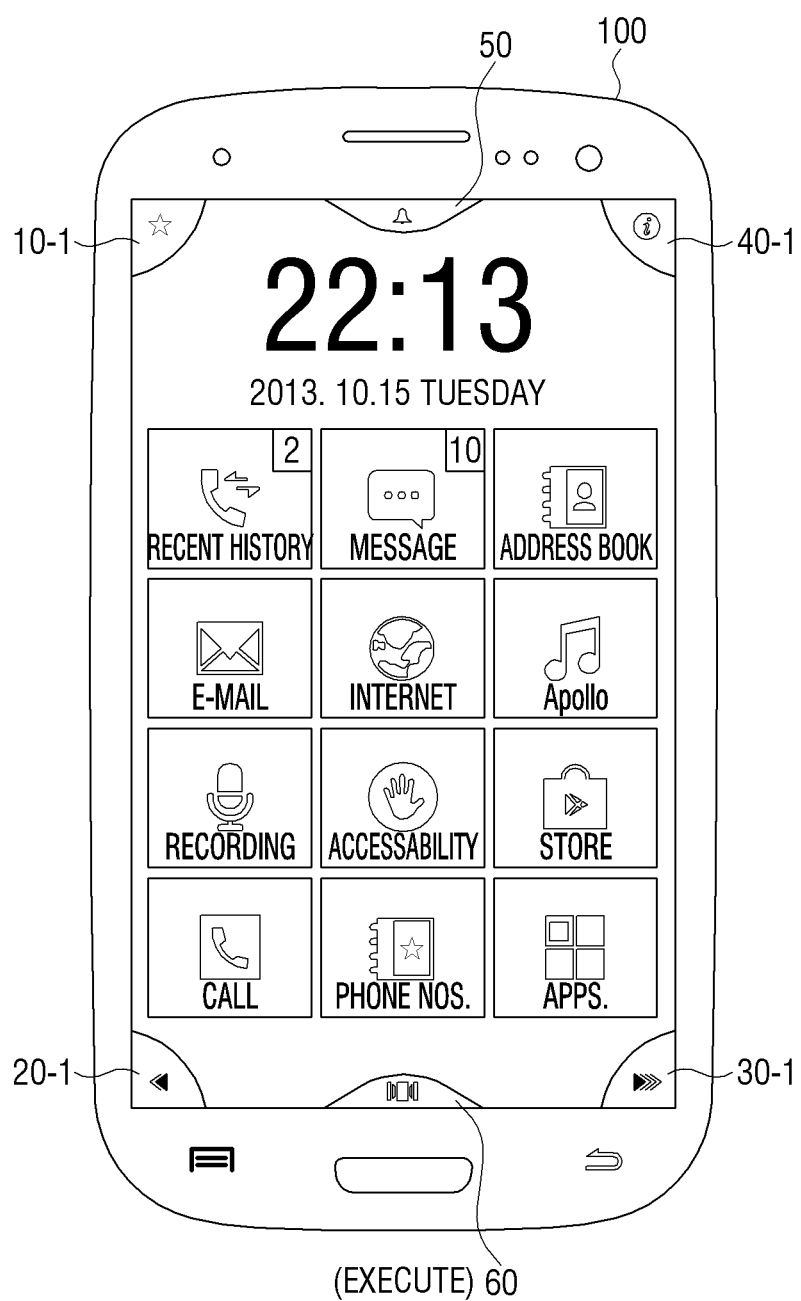
FIG. 19B is a view illustrating a screen on which a guide object to adjust a speed of a talk-back function is displayed according to an exemplary embodiment.

FIG. 19A is a view illustrating a screen on which an accessibility setting menu displayed according to an exemplary embodiment. FIG. 19B is a view illustrating a screen one which a guide object to adjust a talkback speed of a talk-back function is displayed according to an exemplary embodiment.

The user may make touch or drag input with the user object 200 or alternatively, may sequentially activate the menu items using buttons. The second and third edge areas 20-1, 30-1 on the screen respectively show guide objects corresponding to the buttons.

In an exemplary embodiment illustrated in FIG. 19A, the guide object on the second edge area 20-1 has an upward arrow, and in response to the user input on the guide object of the second edge area 20-1, a currently-activated menu item is deactivated, while the menu item located above the menu item is activated. In other words, a function is provided, with which it is possible to select the menu items by dragging upward. If the talkback function is set, voice information may be outputted with respect to the newly-activated menu item.

Further, the guide object on the third edge area 30-1 has a downward arrow, and in response to the user input on the guide object of the third edge area 30-1, currently-activated menu item is deactivated, while the menu item located under the menu item is activated. In other words, a function is provided, with which it is possible to select the menu items by dragging downward. If the talkback function is set, voice information may be outputted with respect to the newly-activated menu item.

However, when the "move" item located at the center of the accessibility setting menu is selected, the guide objects displayed on the second and third edge areas 20-1, 30-1 change. The new, changed guide object performs the function of button to control talkback speed.

Referring to the embodiment illustrated in FIG. 19B, the guide object on the second edge area 20-1 includes a leftward arrow, and in response to a user input to the guide object on the second edge area 20-1, the speed of the voice outputted by talkback function becomes slower.

On the other hand, the guide object on the third edge area 30-1 includes a rightward arrow, and in response to a user input to the guide object on the third edge area 30-1, the speed of the voice outputted by talkback function becomes faster.

Figure 20A:
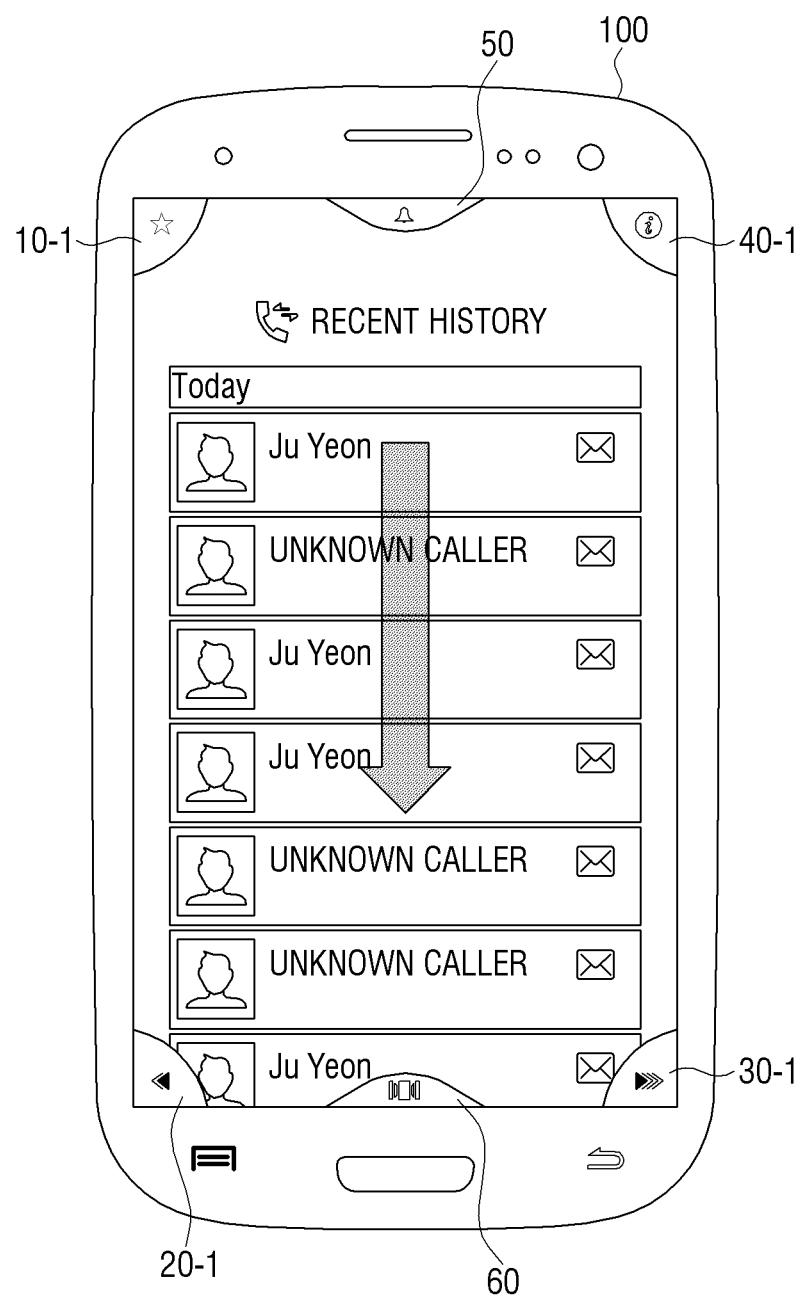
FIGS. 20A and 20B are views illustrating a recent call history menu according to an exemplary embodiment.
Figure 20B:
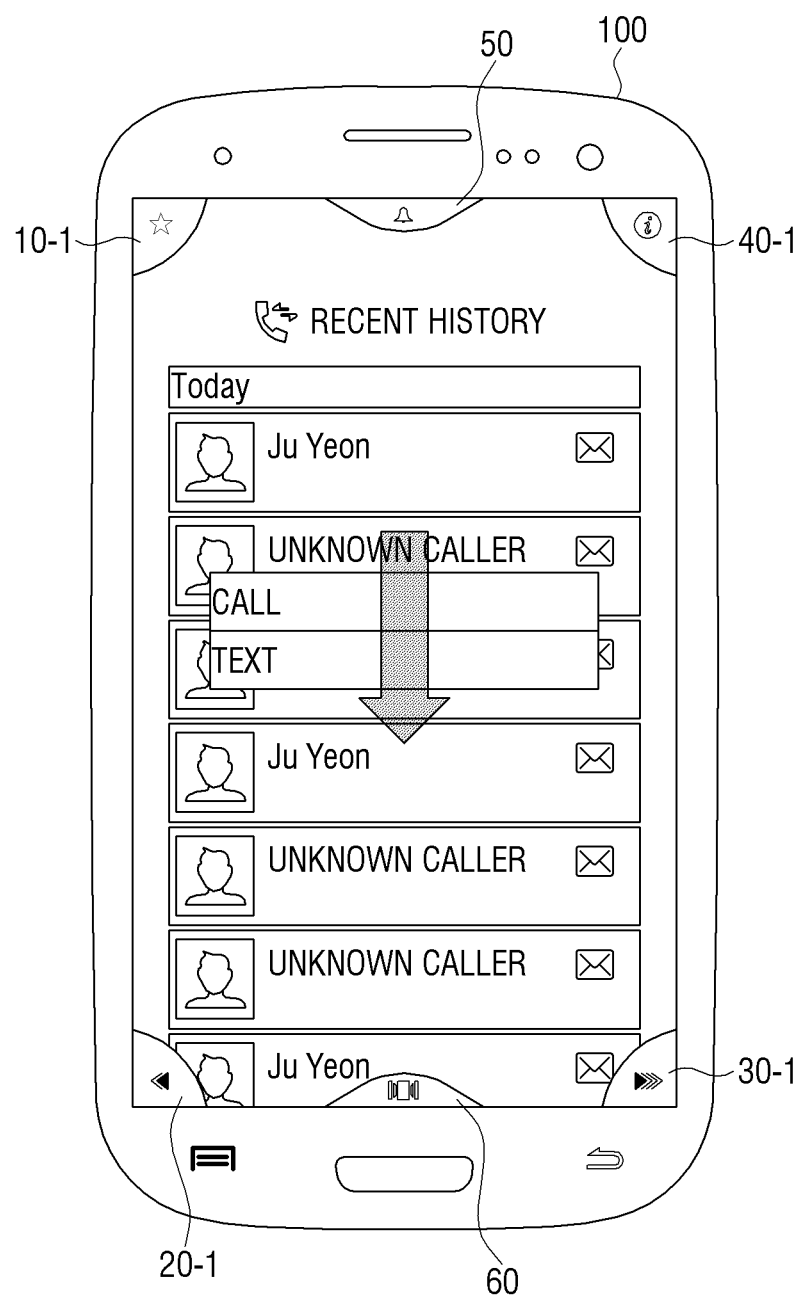

FIGS. 20A and 20B are views illustrating a recent call history menu according to an exemplary embodiment.

Referring to FIG. 20A, the display apparatus 100 may display recently-called user information in a vertical direction. The user may select information about one user, possibly using drag touch input.

When one user information is selected, referring to FIG. 20B, a call menu item and a text message item corresponding to the selected user are displayed. With the talkback function set, the selected user information may be outputted as a voice message.

FIGS. 21A to 21E are views illustrating a menu structure for folder generation according to an exemplary embodiment.

The user may create a folder on the display apparatus 100. Accordingly, in response to selecting of a '+' item in FIG.

Figure 21A:
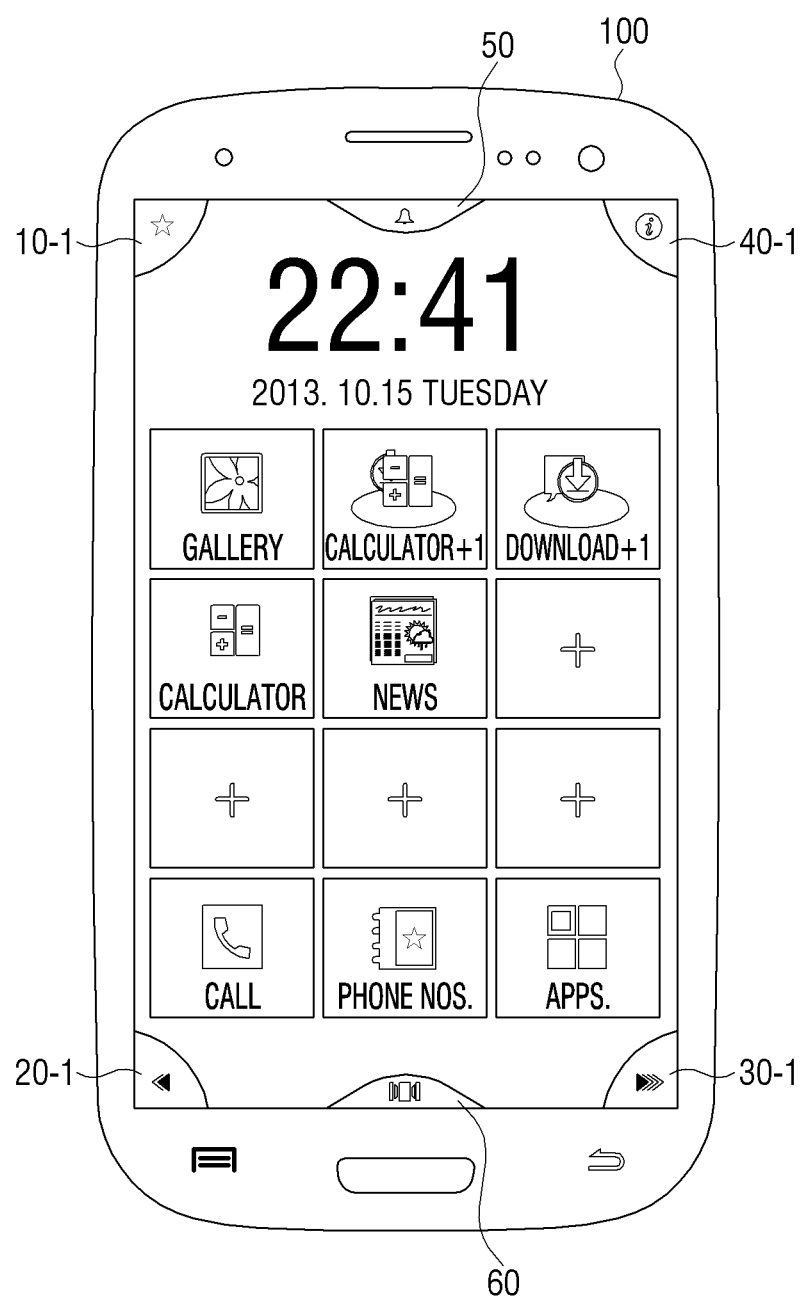
FIGS. 21A to 21E are views illustrating folder generation using a menu structure according to an exemplary embodiment.
Figure 21B:
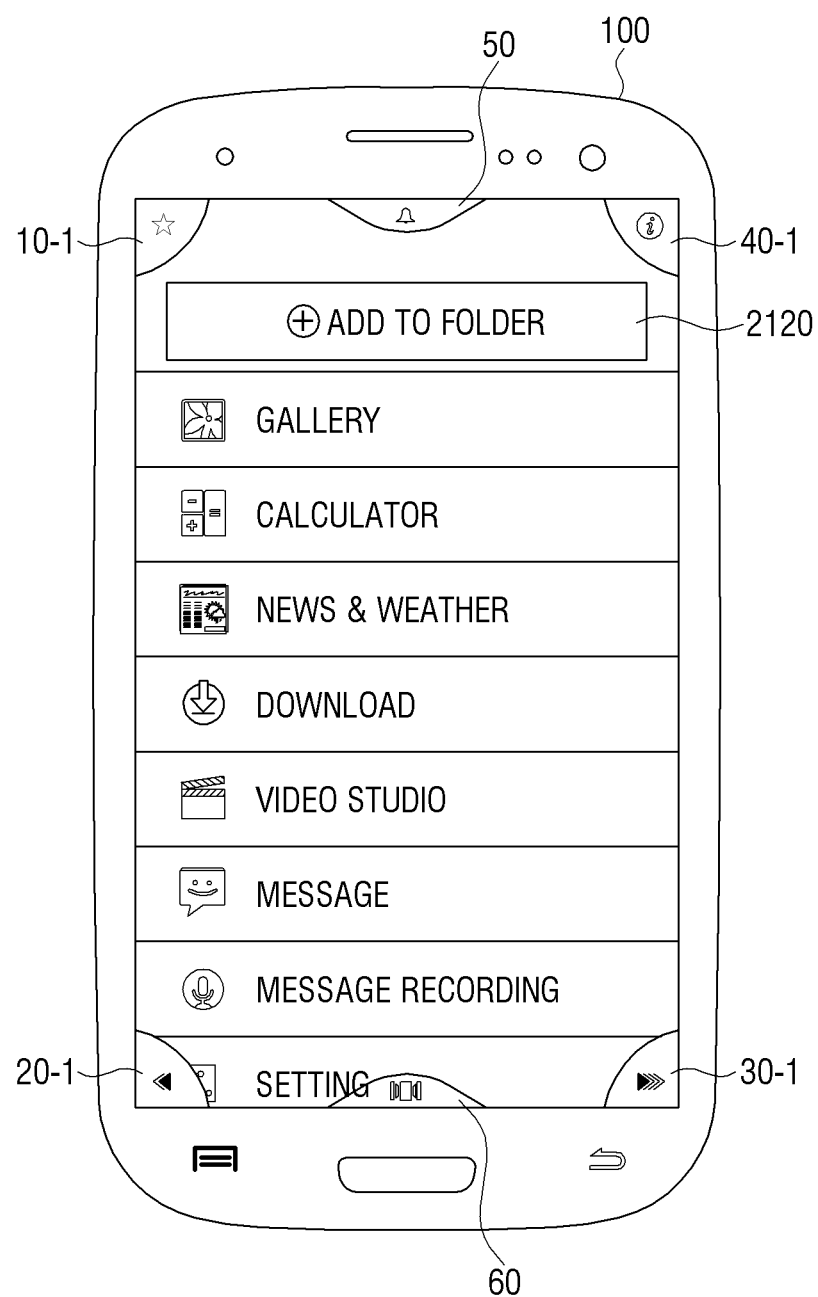
Figure 21C:
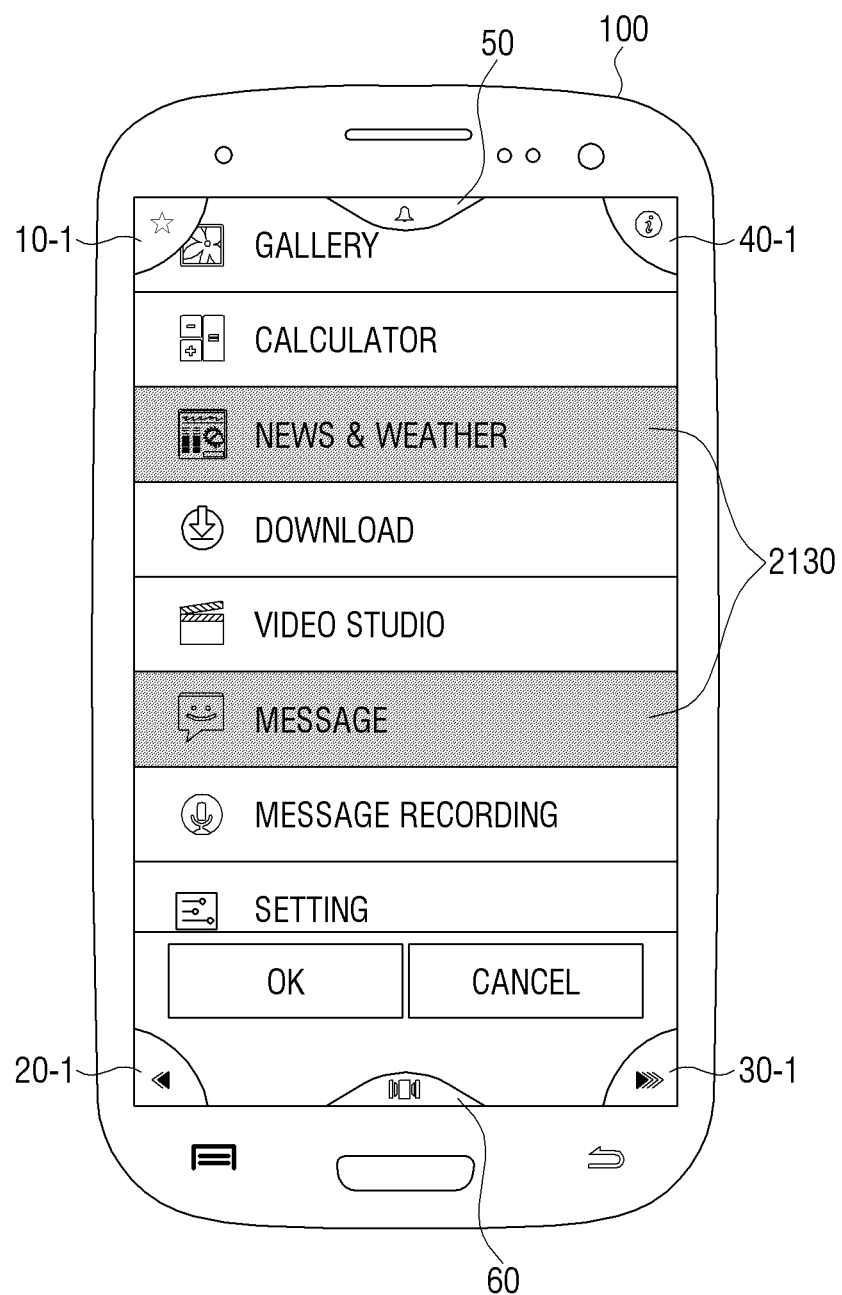
Figure 21D:
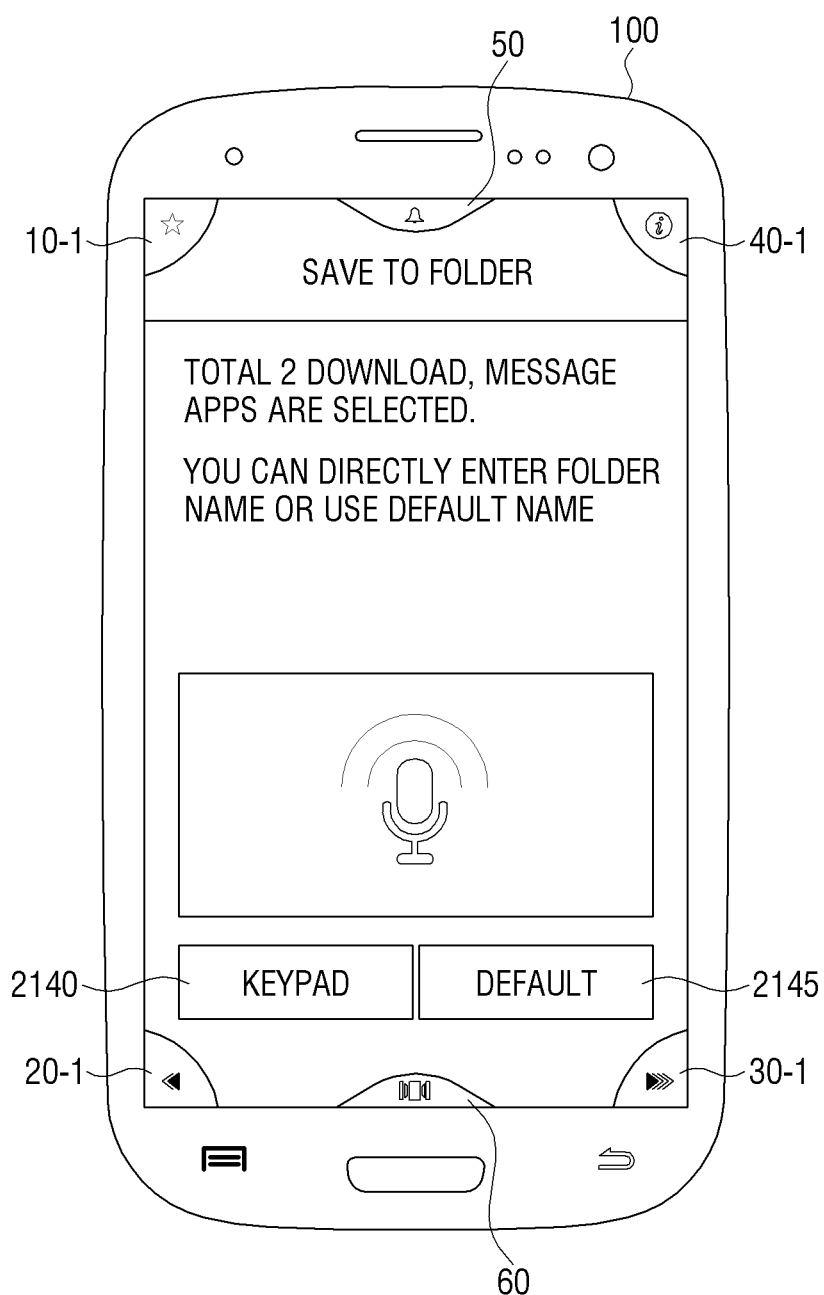
Figure 21E:
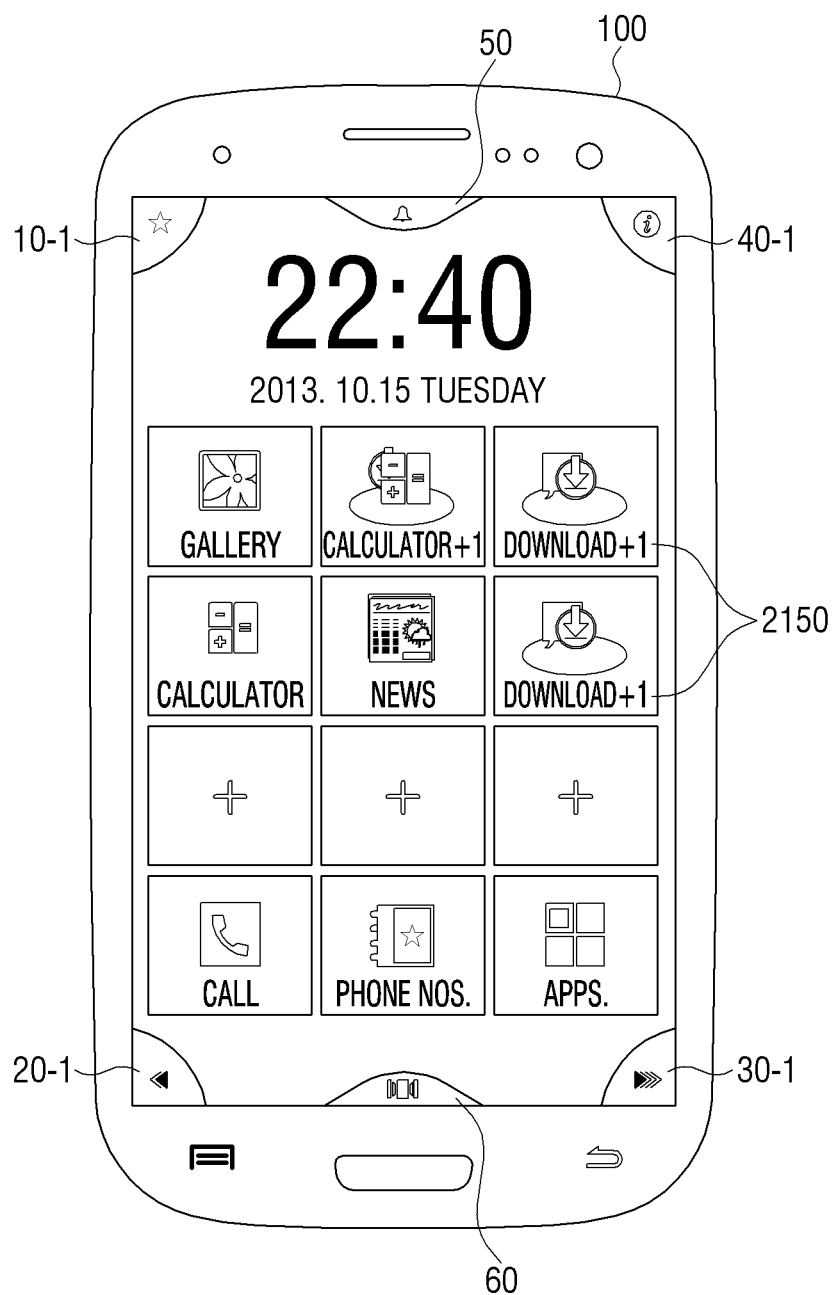

21A, a screen to create a folder appears (FIG. 21B). The folder is thus created in response to selecting of 'add to folder' item 2120, and the user may select a type of application that is added to the folder. Referring to the exemplary embodiment of FIG. 21C, the user may select one or more applications and may select a "news & weather" application and a "message" application 2130. Next, the display apparatus 100 displays a screen on which the folder name can be set (FIG. 21D). FIG. 21D shows a function of converting user's voice into text and setting this as a folder name. In another embodiment, a 'keypad input' item 2140 with which the user can directly input folder name, or 'default input' item 2145 with which the folder name is set automatically, generated according to the application name, may be selected. When the folder name is finalized, a new icon is generated and displayed at the initially selected location, i.e., at the '+' location. In the exemplary embodiment of FIG. 21E, the folder name is automatically set to be 'download', and because the folder includes more than one application, this is indicated with '+1' mark 2150.

Meanwhile, to increase security, the recent display apparatus 100 provides lock and unlock function, which can be challenging to a visually-impaired user.

Figure 22A:
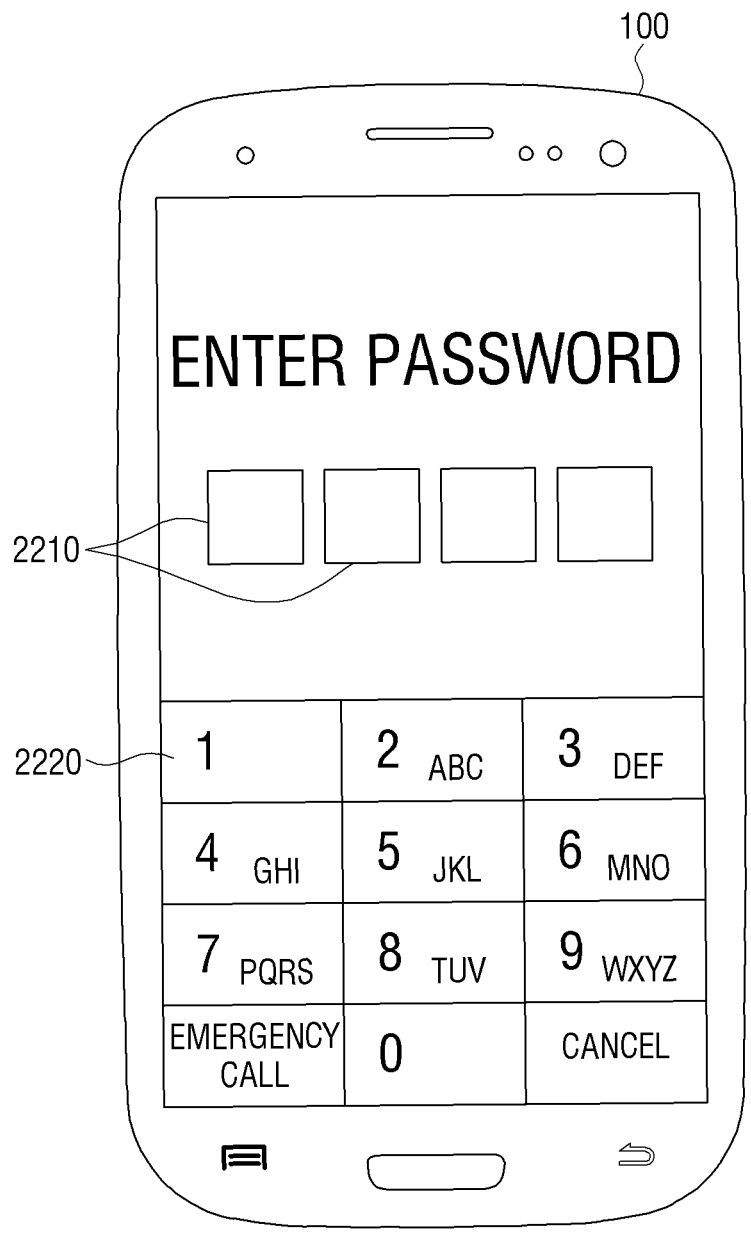
FIGS. 22A and 22B are views illustrating a screen to set lock function of a related display apparatus.
Figure 22B:
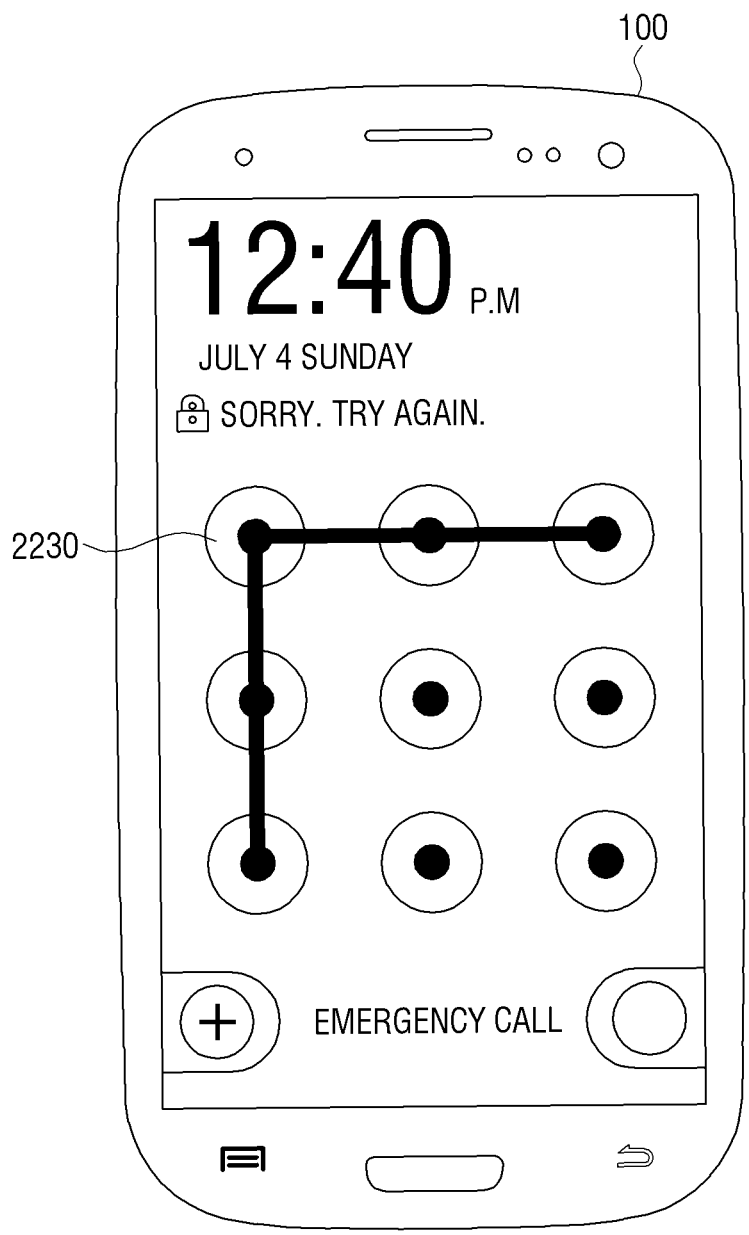

FIGS. 22A and 22B are views illustrating a lock function setting screen of a related display apparatus.

FIG. 22A illustrates a screen of the display apparatus on which it is possible to unlock by inputting password. However, with the talkback function set, the numbers can be spoken as the user inputs them, deteriorating security.

FIG. 22B illustrates an unlock function according to which a user inputs a pattern by connecting a plurality of dots with a drag touch input so that the inputted pattern is compared with a password pattern and lock is undone when the patterns match. However, visually-impaired user would experience inconvenience, since the user would not be able to easily find the reference point to draw a pattern to unlock. Accordingly, it is necessary to provide users with impaired vision with lock and unlock functions that can alert the user to the reference location without compromising security.

Figure 23B:
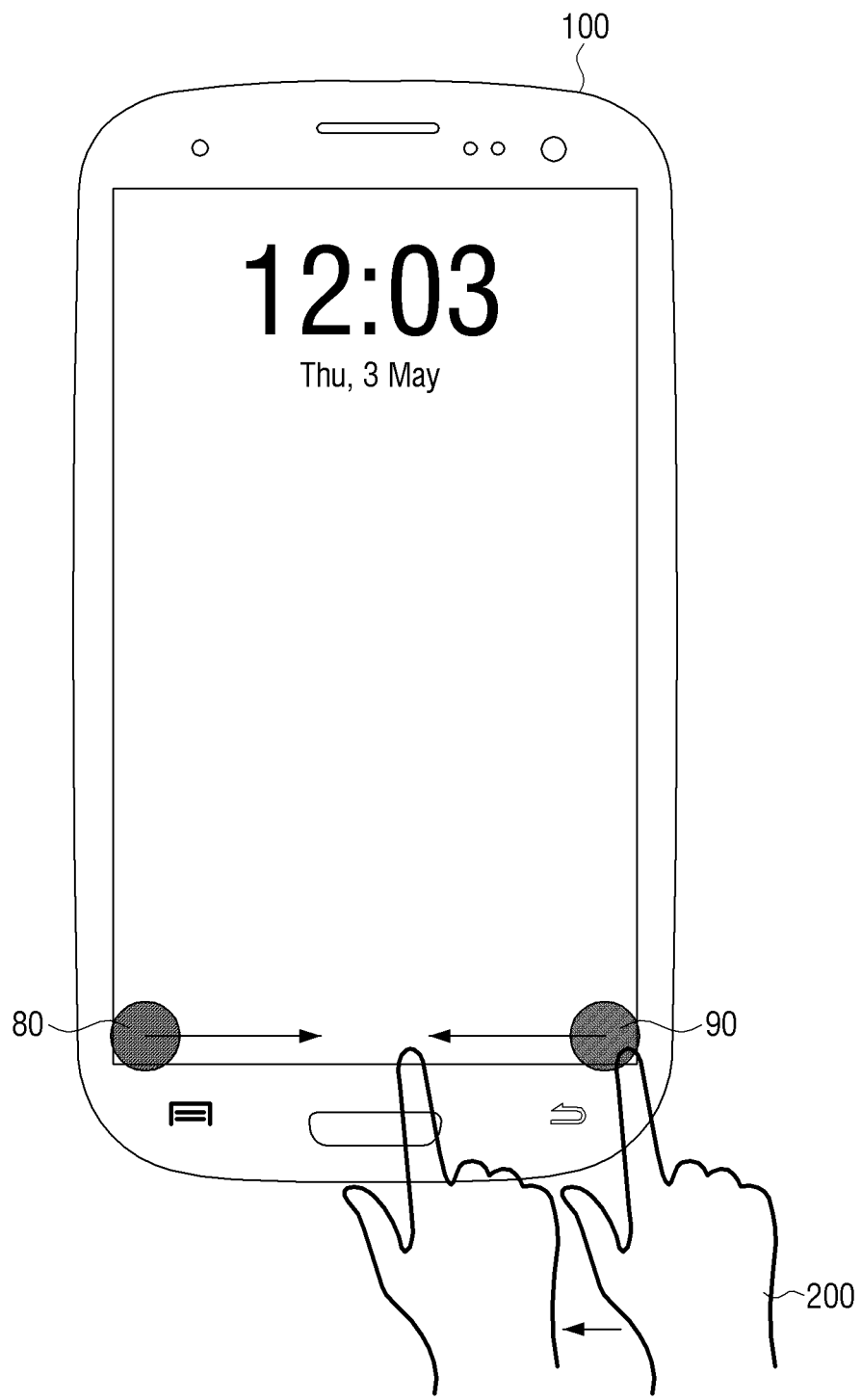
Figure 23C:
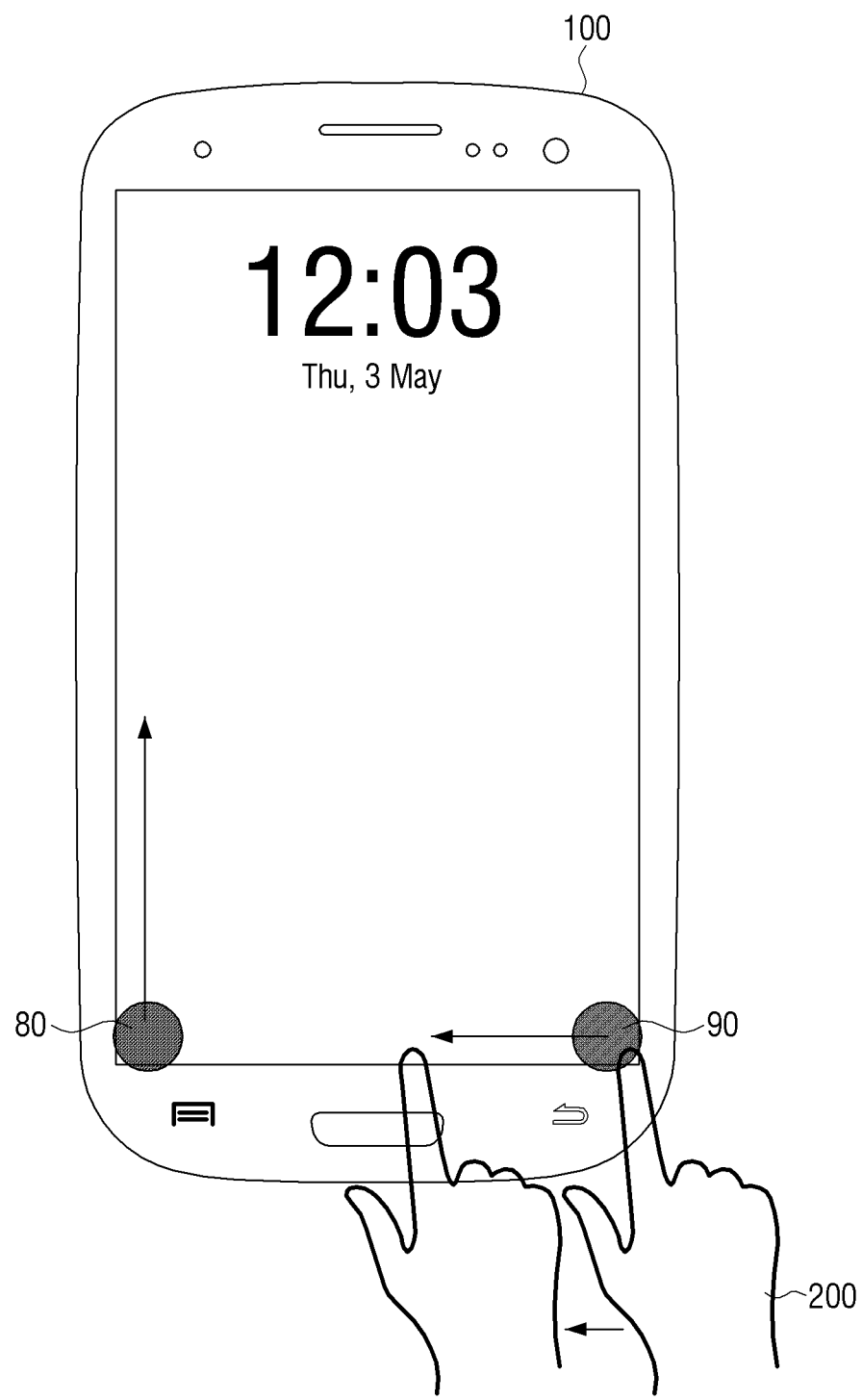

FIGS. 23A to 23C are views illustrating unlock functions according to an exemplary embodiment.

Referring to FIG. 23A, in response to a first drag input beginning from the first edge area of the screen and to a second drag input beginning from the second edge area of the screen, the controller 120 of the display apparatus 100 perceives a pattern based on a combination of the first and second drag inputs and matches the perceived pattern with a password pattern. The controller 120 then unlocks the screen of the display apparatus, depending on the result of the matching.

The first and second drag inputs may be upward and downward drag input, or leftward and rightward drag input to the screen.

Further, in response to a drag input to the first and second edge areas, the controller 120 may control haptic vibration to be generated and outputted.

Further, when the path of drag touch by the first and second drag inputs is a preset length or longer, these are considered to be normal drag inputs, while considered to be an input error when the path of drag touch is shorter than the preset length. For example, for a downward drag input on the screen, the input is considered to be normal when the path of drag touch is ⅓ of the total height of the screen or longer, while the input is considered an input error and ignored when the path of drag touch is shorter than ⅓ of the total height of the screen.

Accordingly, a variety of lock patterns may be set in accordance with a combination of direction, locations, or frequencies of input of the first and second drag inputs.

FIG. 23A illustrates a pattern combining a downward drag input on the left upper edge area 70 of the screen, an upward drag input on the left-lower edge area 80 of the screen, and an upward drag input on the right lower edge area 90 of the screen, for matching with a password pattern.

FIG. 23B illustrates a pattern combining a rightward drag input on the left lower edge area 80 of the screen, and a leftward drag input on the right lower edge area 90 of the screen, for matching with a password pattern.

FIG. 23C illustrates a pattern combining an upward drag input on the left lower edge area 80 of the screen, and a leftward drag input on the right lower edge area 90 of the screen, for matching with a password pattern.

According to another exemplary embodiment, when the screen is unlocked, the controller 120 may execute a preset application in response to the aforementioned drag input being made to edge areas of the screen of the display apparatus 100.

FIGS. 24A to 24D are views illustrating an execution of applications according to another exemplary embodiment.

Referring to FIGS. 24A to 24D, in response to a drag input beginning from the edge area of the screen, the controller 120 may execute a preset application that corresponds to the received drag input. The preset application may vary depending on the edge areas of the screen that receive the input.

Figure 24A:
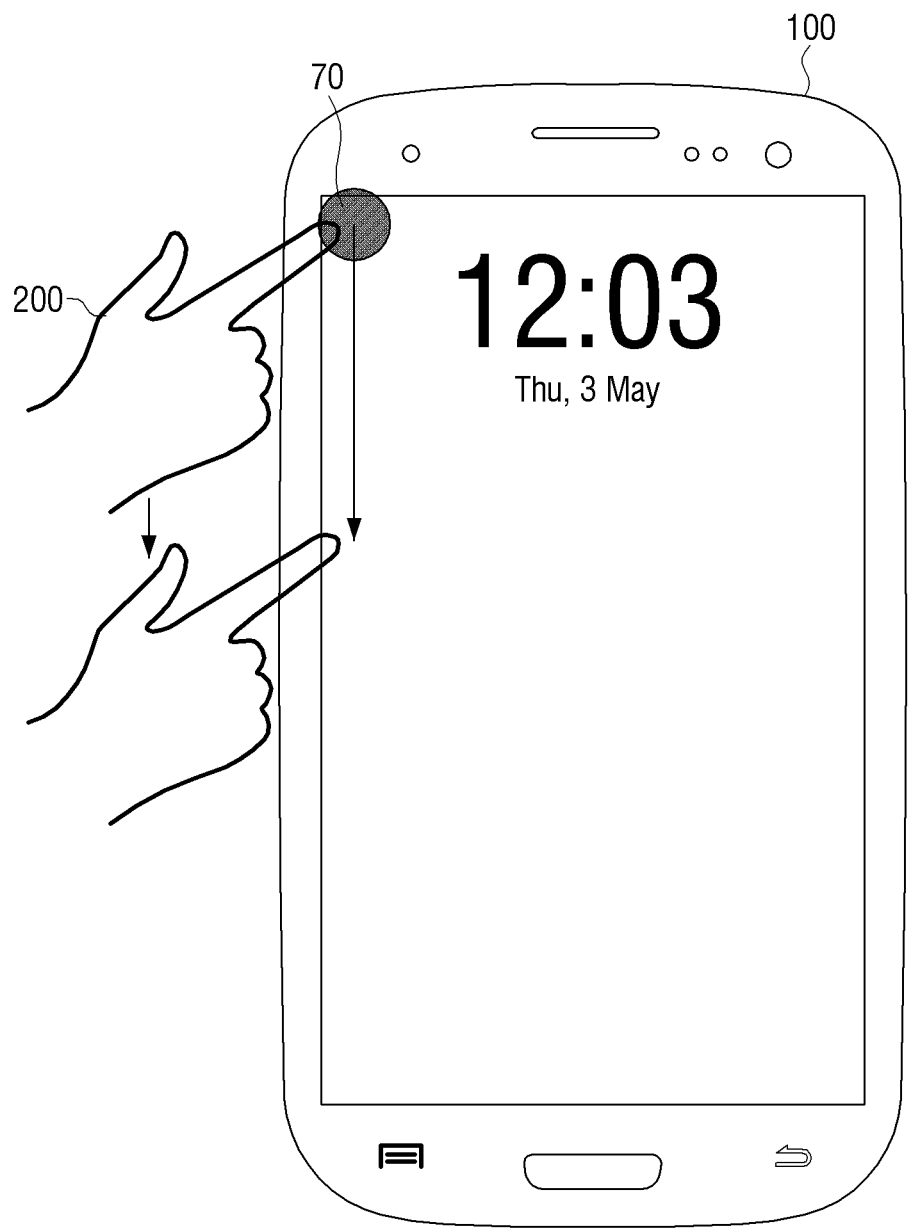
FIGS. 24A to 24D are views illustrating an execution of applications according to another exemplary embodiment.
Figure 24B:
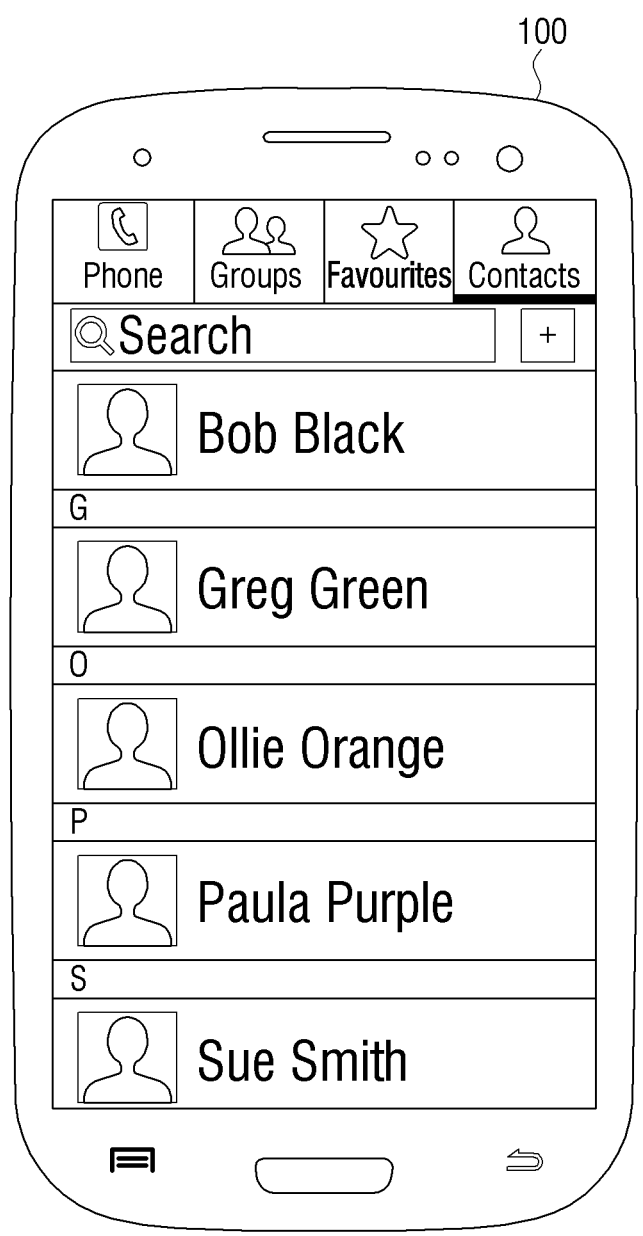

Referring to FIG. 24A, a drag input is made on the left upper edge area 70 of the screen to a downward direction. FIG. 24B illustrates a screen with the drag input received. As a result, a phone book application is executed.

Figure 24C:
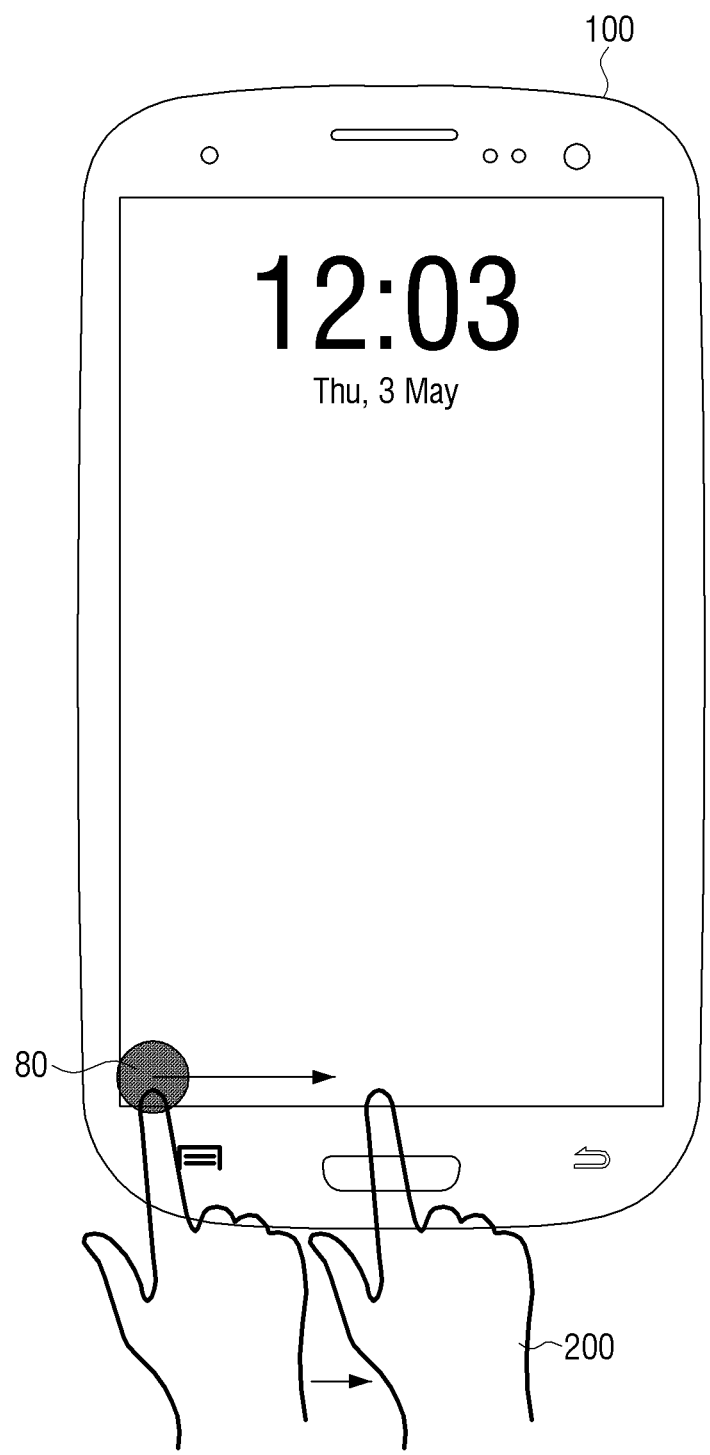
Figure 24D:
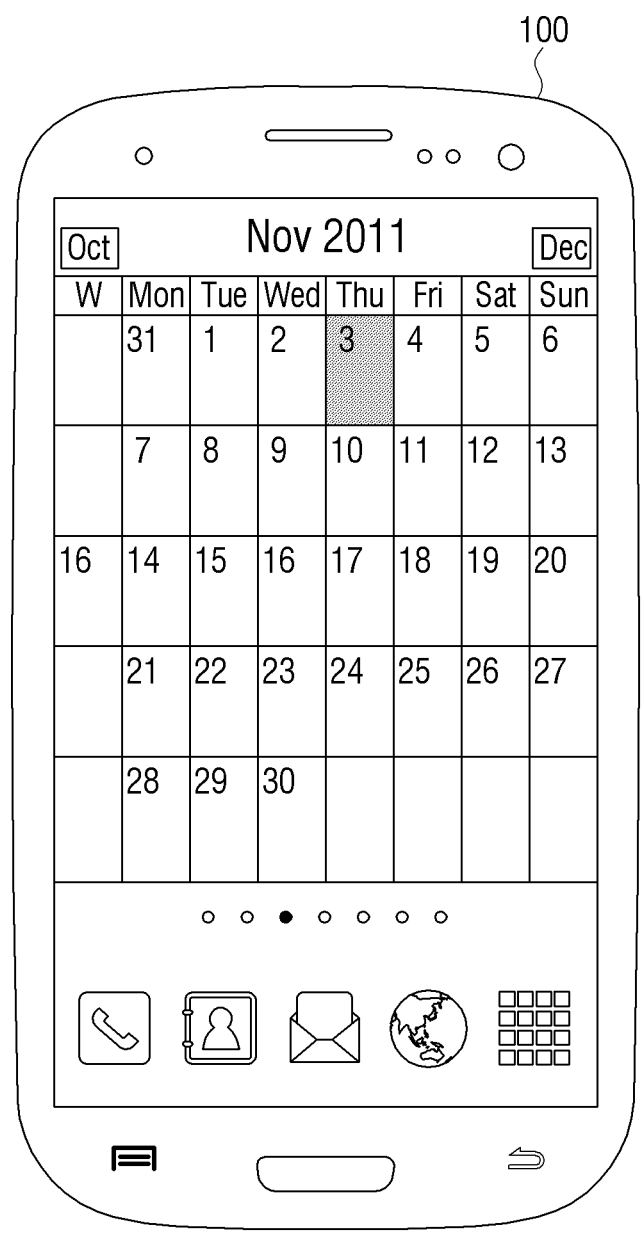

FIG. 24C illustrates a drag input being received in parallel relation from the left lower edge area 80 to rightward direction of the screen. FIG. 24D illustrates a screen with the drag input received. As a result, a calendar application is executed.

With screen lock set, in response to a touch received for more than a preset time on the edge area of the screen, the controller 120 may control so that an item such as 'important notice message' related with the information received at the display apparatus appears. However, with the touch input ceased, the item display may be ended and the screen lock image may be set again.

The item related with the information received at the display apparatus 100 may be at least one of message alarm information, call alarm information and e-mail alarm information.

Further, the item related with the information received at the display apparatus 100 may be related with the data that is received at the display apparatus 100 from an external device for a preset time period.

In various exemplary embodiments, the controller 120 may control so that a haptic vibration or a voice message is outputted in response to a touch or drag input to an edge area or a corner area of the screen. Types of the haptic vibration and voice message may vary depending on the location of the edge area or the corner area.

Figure 25:
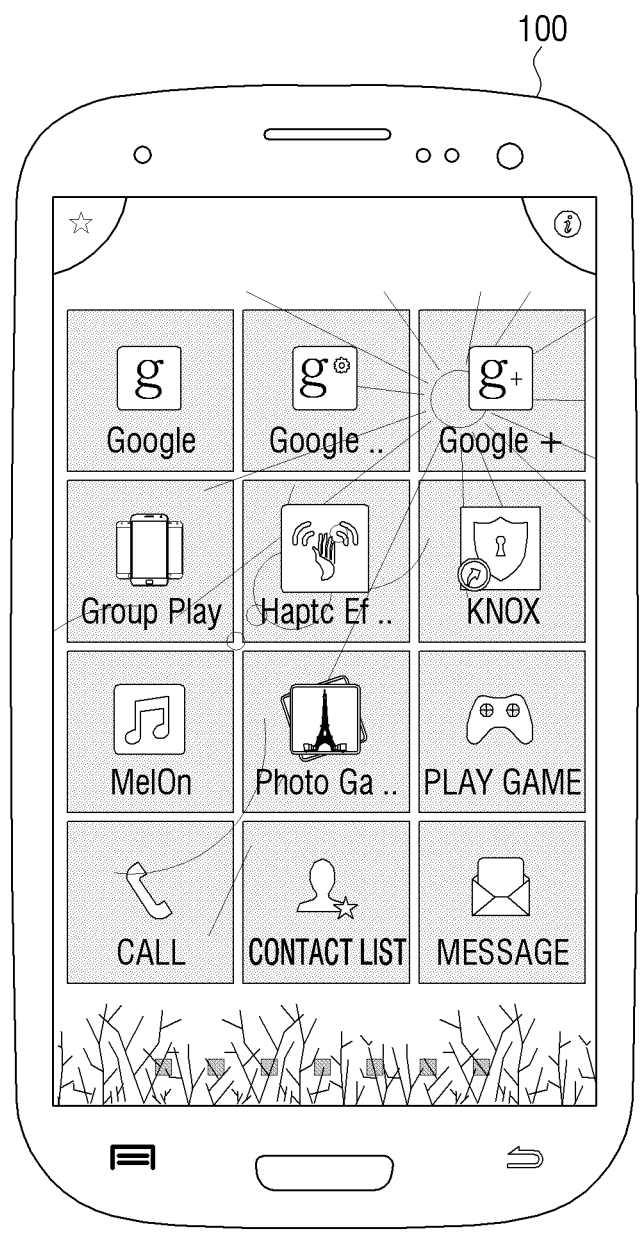
FIG. 25 is a view illustrating an interface of a display apparatus according to an exemplary embodiment.

FIG. 25 is a view illustrating an interface of a display apparatus according to another exemplary embodiment.

As illustrated in FIG. 25, the interface of the display apparatus 100 may include a plurality of transparent tiles. In the plurality of transparent tiles, a background image can penetrate through the tiles. According to a method which will be described hereinbelow, a plurality of transparent tiles may be set according to a user input.

Each tile out of the plurality of tiles indicates one of an application icon, a menu icon, or a shortcut icon. These icons are in shaped like tiles, and thus called tiles as a matter of convenience, but this is merely an example. According to an exemplary embodiment, icons may be in varying shapes and sizes.

FIGS. 26A to 26D are views illustrating a user interface for setting a plurality of transparent tiles according to an exemplary embodiment.

Figure 26A:
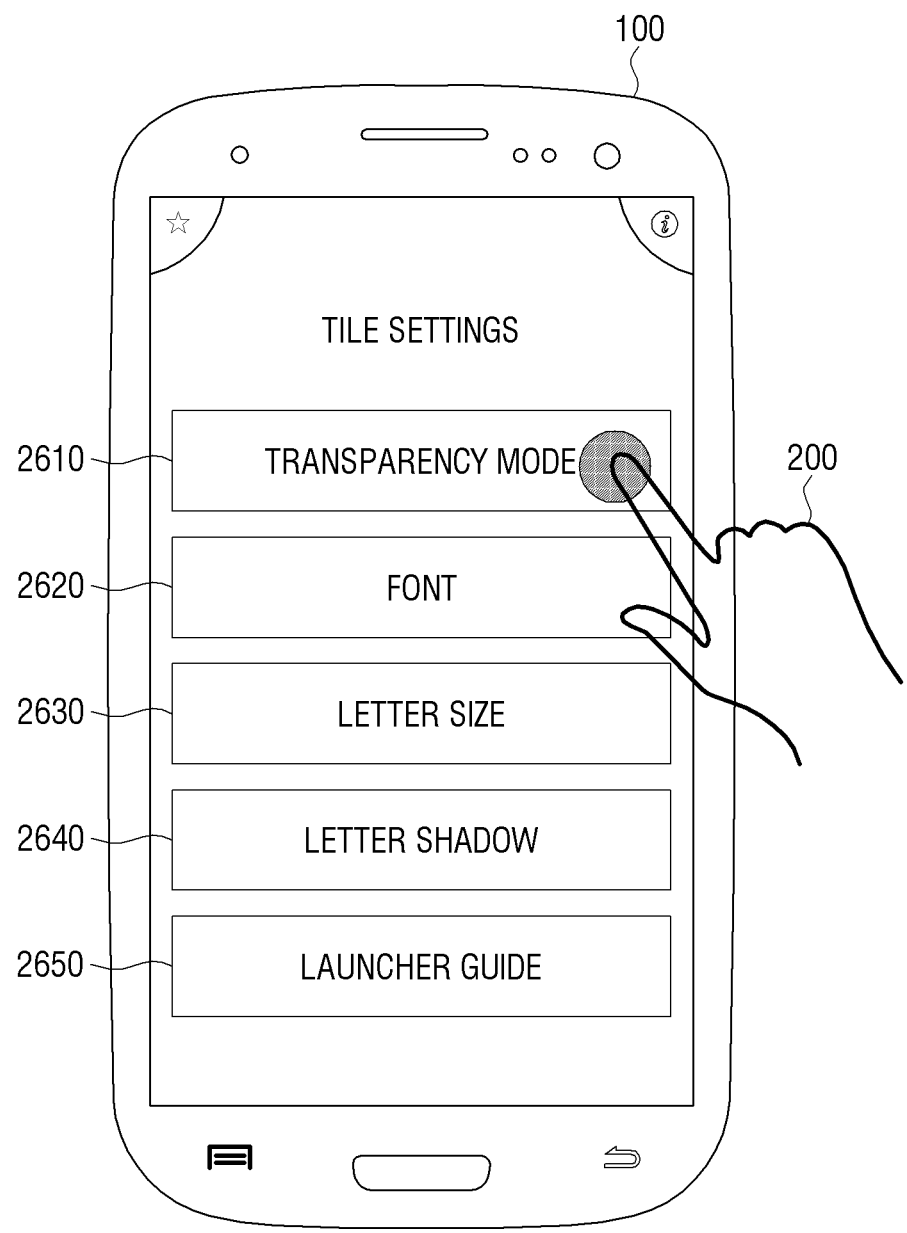
FIGS. 26A to 26D are views illustrating a user interface for setting a plurality of transparent tiles according to an exemplary embodiment.

As illustrated in FIG. 26A, the display apparatus 100 according to still another exemplary embodiment may display an interface for tile settings. The interface for tile settings may include at least one of a transparent mode setting menu item 2610, a font setting menu item 2620, a letter size adjustment menu item 2630, a letter shadow setting menu item 2640, and a launcher notice menu item 2650.

The transparent mode setting menu item 2610 is a menu item which provides user interface setting tile transparency. The font setting menu item 2620 is a menu item providing user interface for setting a tile font, the letter size adjustment item 2630 is a menu item providing user interface for adjusting letter size, the letter shadow setting menu item 2640 is a menu item providing user interface for setting shadow a for letters displayed on a tile, and the launch guide menu item 2650 is a menu item for displaying information on a launcher such as an application version.

A user may select a desired menu item through a touch input by the user object 200. When the talkback function is executed, the desired menu item may be selected by double taping the desired menu item. FIG. 26A illustrates selecting a transparent mode setting menu item.

Figure 26B:
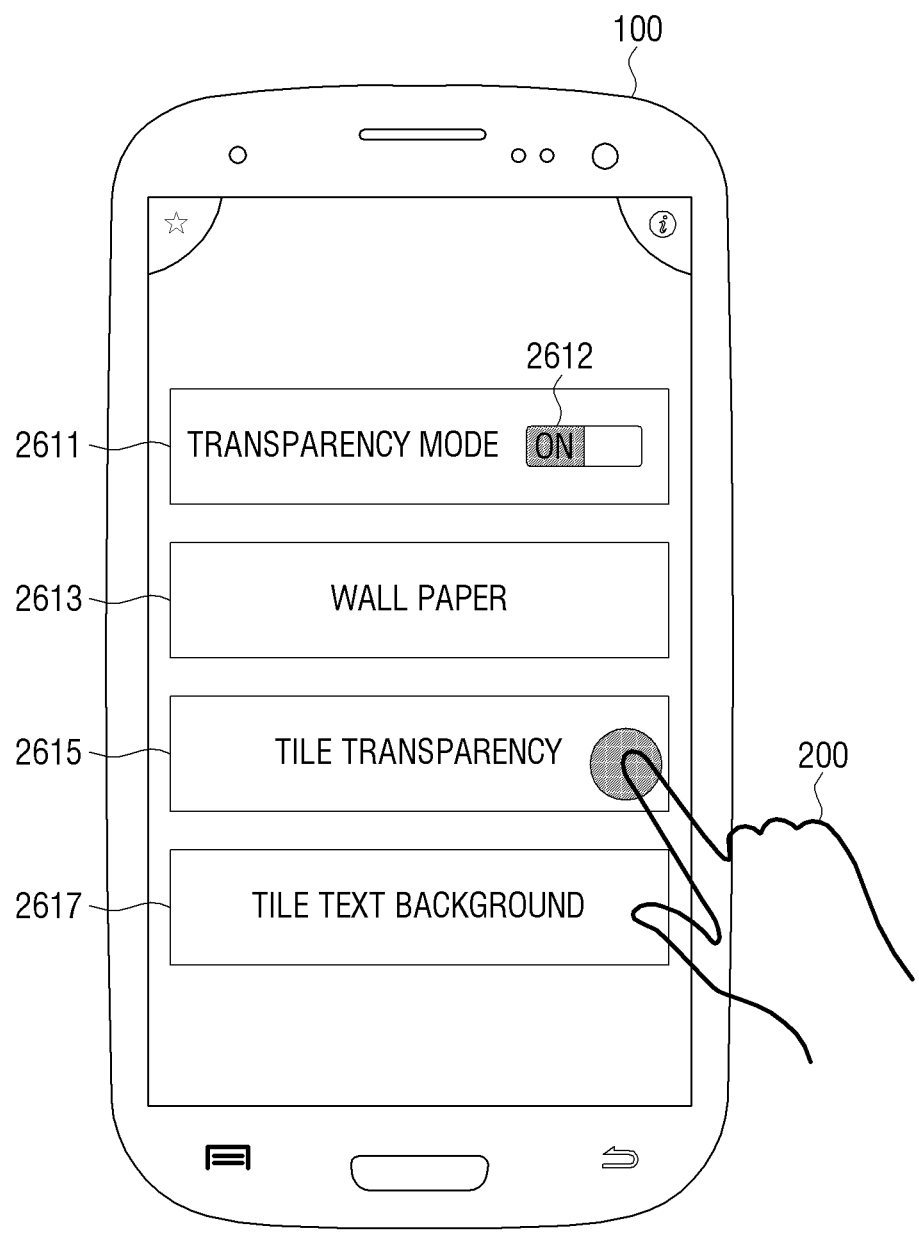

When the transparent mode setting menu item is selected, a user interface for setting the transparent mode is displayed as illustrated in FIG. 26B. The user interface may include at least one of a transparent mode on/off setting menu item 2611 to turn on the transparent mode, a wall paper setting item 2613 for changing a background image, a degree of tile transparency setting item 2615, and a tile text background setting item 2617 for setting a tile text background. The transparent mode on/off setting menu item 2611 may be selected and manipulated to turn-on or turn-off the transparent mode. In the turn-off state of the transparent mode, while the tag 2612 is touched and dragged to left direction, the transparent mode is turned on. On the other hand, to turn-off the transparent mode, while the tag 2612 is being touched, the tag may be dragged to the right direction. In a case when the talkback function is executed, when double tapping is performed, and while touch is being maintained in the second tap, the touch is dragged to a upward direction, the tag may be manipulated in the same manner.

Figure 26C:
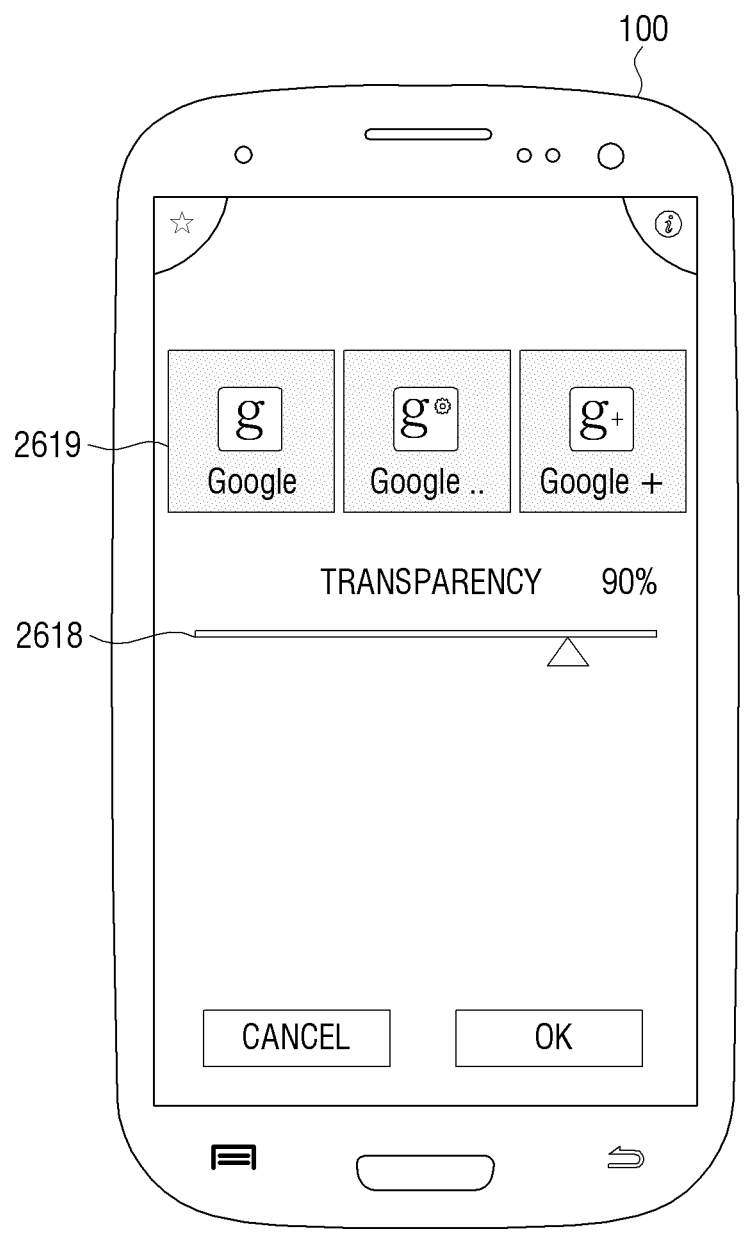

When the transparent mode is turned on, a degree of the tile transparency may be set. When the tile transparency setting item 2615 is selected using the user object 200, the interface which can set the tile transparency may be displayed as illustrated in FIG. 26C.

The interface which may set the tile transparency includes some tiles 2619 for which degree of transparency is set, a progress bar 2618 which indicates the set tile transparency, setting 'cancel' and 'OK' buttons. By touching and dragging the progress bar 2618 using the user object 200, a user may set a desired degree of tile transparency. In the exemplary embodiment of FIG. 26C, it is illustrated that a user sets degree of transparency as 90%. In the tiles 2619 displayed, the set degree of transparency is reflected and displayed.

Figure 26D:
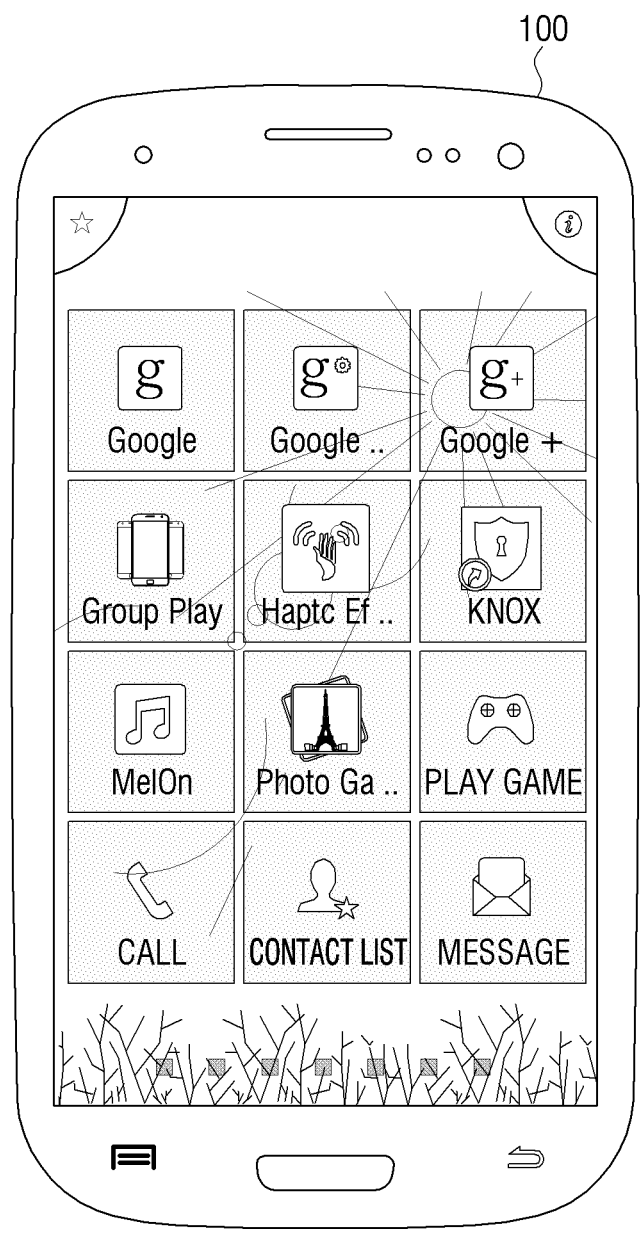

FIG. 26D illustrates a screen in which a plurality of tiles whose transparency is finally adjusted is displayed. It is known that the tile transparency increased compared to the first transparency (FIG. 25).

Figure 27:
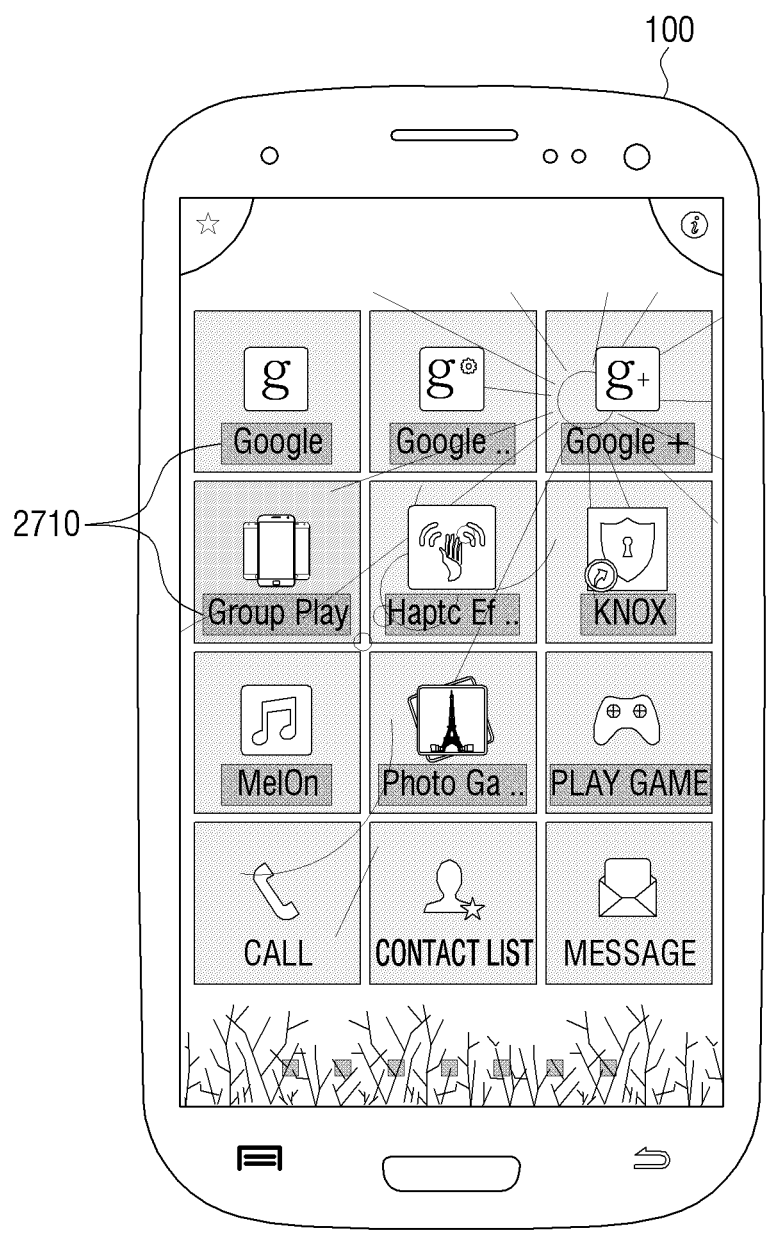
FIG. 27 is a view illustrating a user interface where a tile text background is set according to an exemplary embodiment.

FIG. 27 is a view illustrating a user interface where a tile text background is set according to still another exemplary embodiment.

A user may set the tile text background color by selecting the tile text background setting item 2617 to set tile text background illustrated in FIG. 26B. As to the above-described user interface, the tile is transparent, and thus is overlapped with drawings in the background, and consequently it may be difficult to identify the tile text. According to still another exemplary embodiment, by setting different colors of the areas where the tile text is located, the tile text background may be set so that the tile text may be recognized more distinctively. In this case, the tile text background, color, and contrast may be high. When a user selects the tile text background setting item 2617, as illustrated in FIG. 27, the tile text background is set, and consequently, the tile text may be recognized more distinctively.

FIGS. 28A to 28D are views illustrating a user interface for setting a specific tile color according to an exemplary embodiment.

As the number and variety of applications installed in the display apparatus 100 increases, it becomes hard for a user to rapidly find and select a desired application icon from among a plurality of application icons. In addition, in case of applications which a user frequently uses, a method to distinctively indicate these applications so that a user may rapidly find the applications is required. The related art display apparatus interface fails to have the technical means to overcome the above-described drawback.

A user interface according to still another exemplary embodiment provides a function to set a desired tile to a desired color.

Figure 28A:
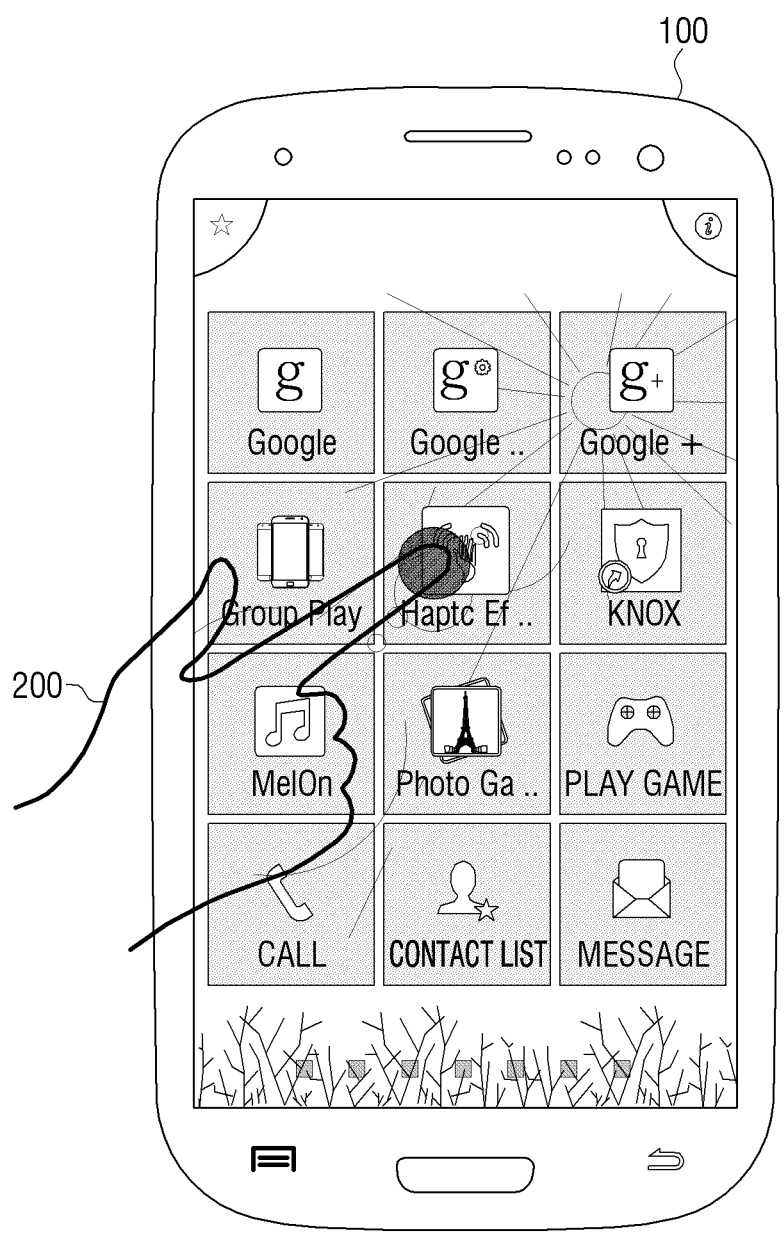
FIGS. 28A to 28D are views illustrating a user interface for setting a specific tile color according to an exemplary embodiment.

In FIG. 28A, a user selects a tile for which a user wishes to set the color. A user may select a desired tile by touching the tile for more than a preset time or by performing a double tap (when talkback is executed). Of course, the exemplary embodiment is not limited thereto. In FIG. 28A, a user selects a desired tile by using the user object 200.

Figure 28B:
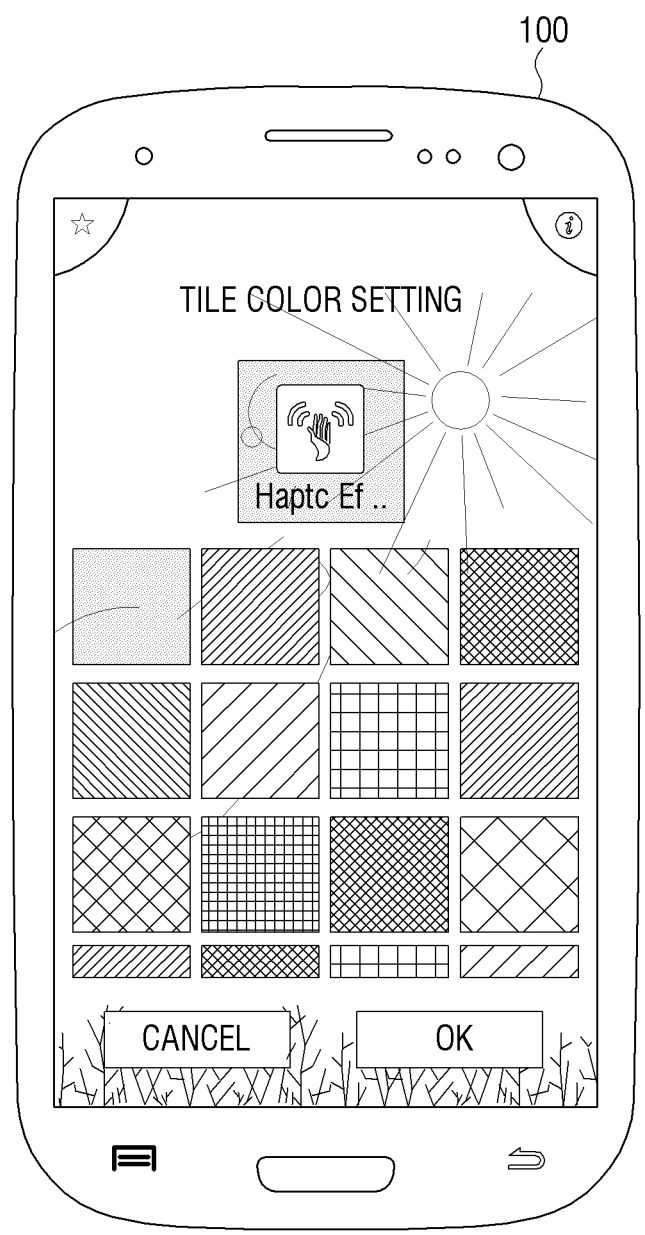

When a user selects a desired tile, an interface to change color of the selected tile is displayed. As illustrated in FIG. 28B, the display apparatus 100 may display the selected tiles and a plurality of colors which can be applied to the selected tiles.

Figure 28C:
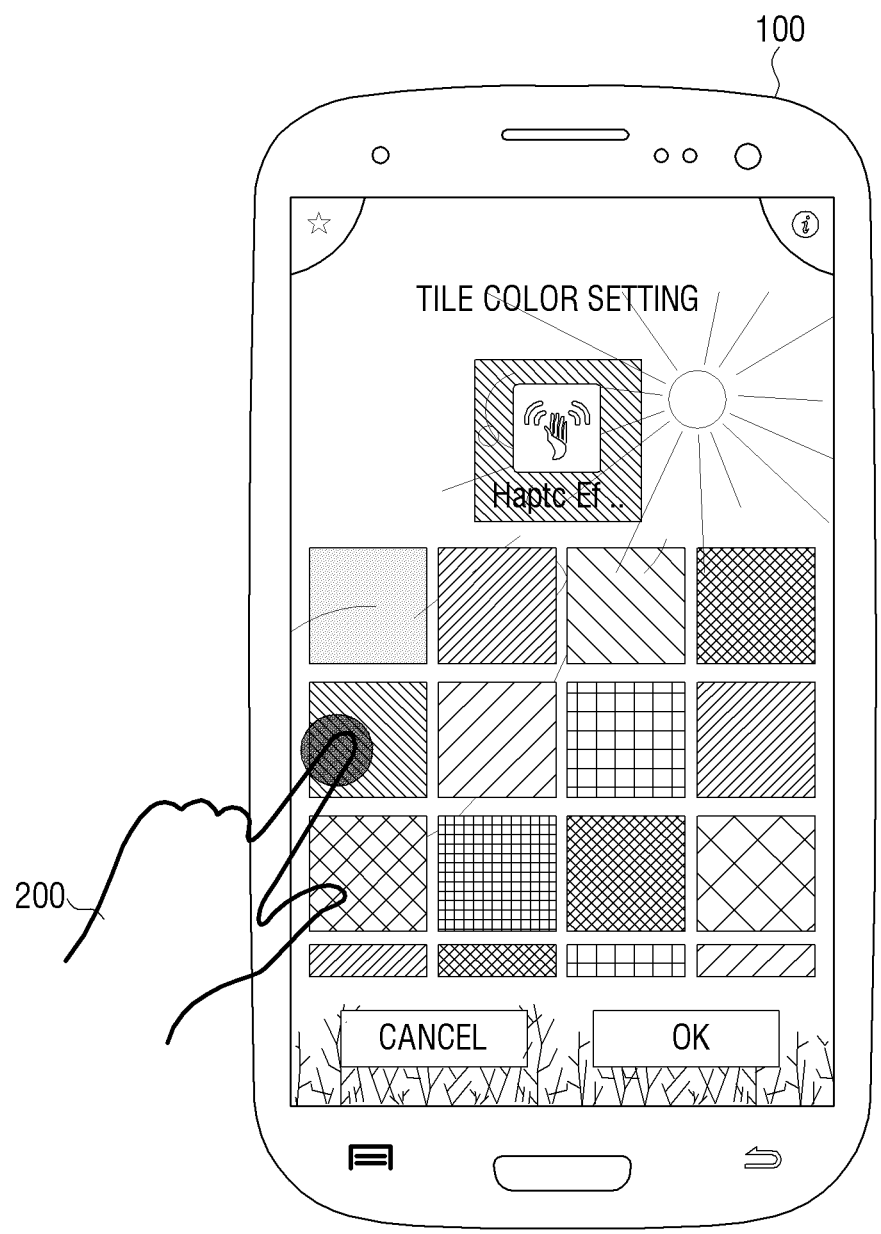

As illustrated in FIG. 28C, a user may select a desired color. The selected color is applied to the selected tile and is previewed.

Figure 28D:
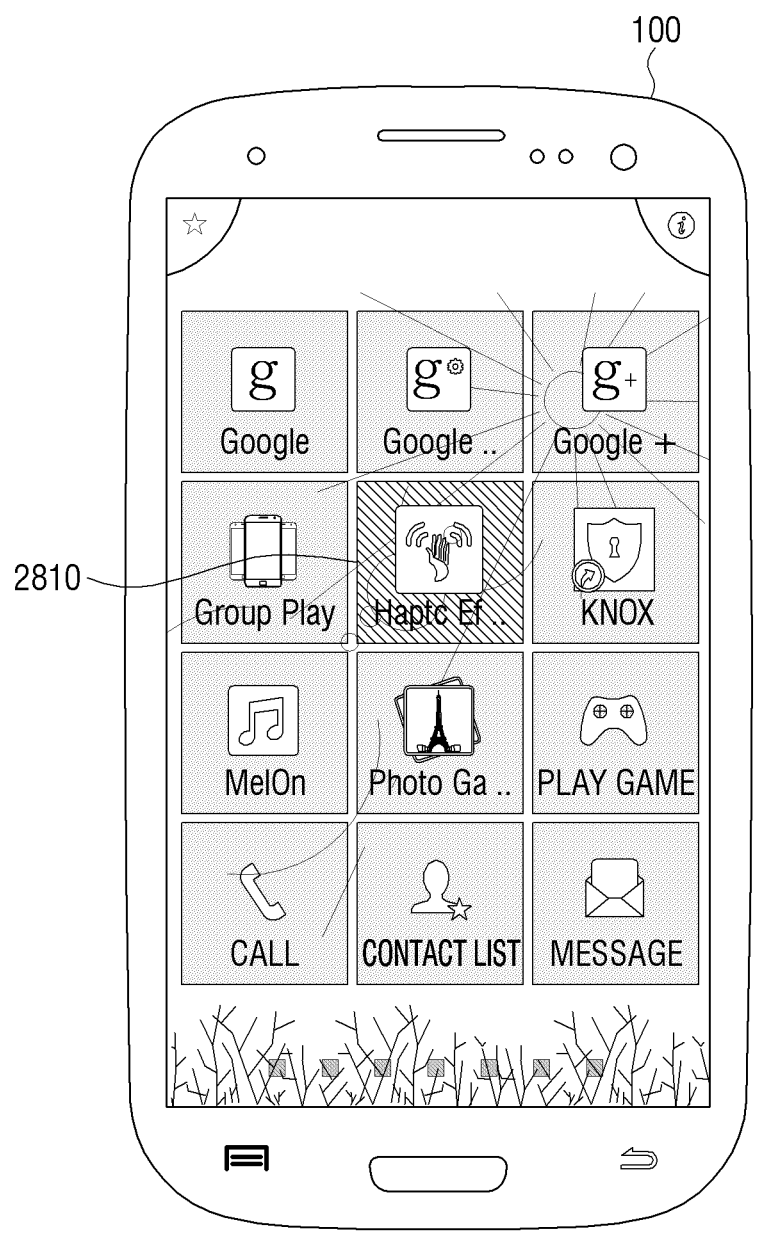

When a user selects 'OK,' as illustrated in FIG. 28D, a user interface to which color of the selected tile is set is displayed. The tile where color is set is distinctive over other tiles, and therefore, a user may find the tile more rapidly and easily. Although the tile color is set in the exemplary embodiment of FIGS. 28A to 28D, exemplary embodiments are not limited thereto. As non-limiting examples, in one or more exemplary embodiments, a pattern highlighting, or border may be set.

Hereinbelow, a method for performing a function of a display according to a variety of embodiments will be explained.

FIGS. 29 to 36 are flowcharts illustrating methods for performing various functions of a display apparatus according to various exemplary embodiments.

Figure 29:
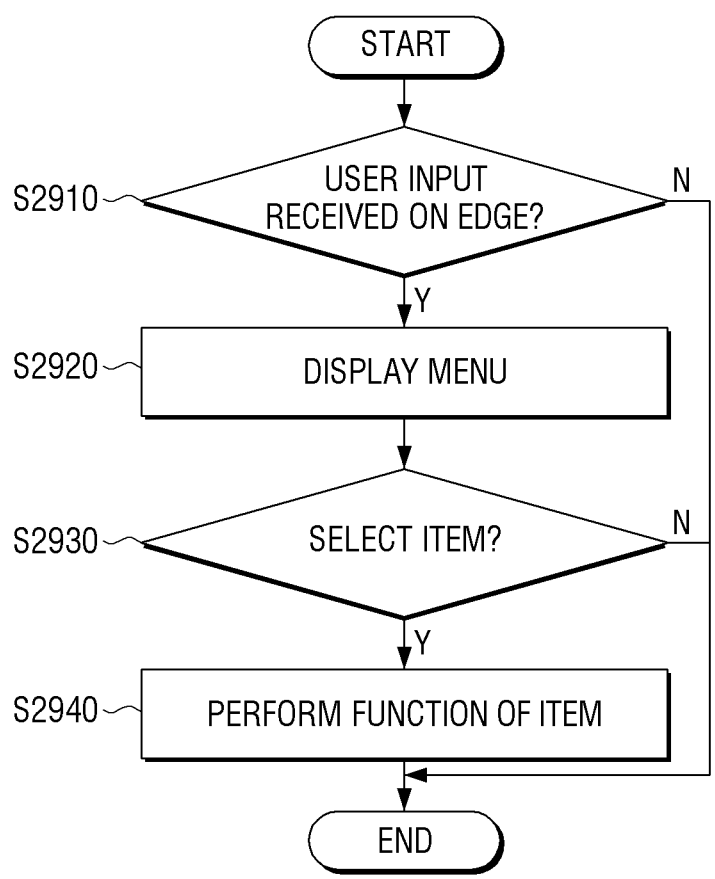
FIGS. 29 to 36 are flowcharts illustrating methods for performing various functions of a display apparatus according to various exemplary embodiments.

Referring to FIG. 29, a method for performing a function of a display apparatus according to an exemplary embodiment includes a user input receiving on an edge area of the screen at S2910-Y, and displaying a menu on the screen in response, at S2920. At S2930-Y, when an item is selected from the menu, at S2940, a function corresponding to the selected item is performed. The edge area of the screen may include at least two different edge areas, and displayed menu on the screen varies depending on a location where the user input is received.

The method for performing a function of the display apparatus may additionally include, with talkback function being set, outputting a voice message corresponding to a received user input, in response to the user input which may be a one tap touch.

Further, the method for performing the function of the display apparatus may additionally include, with the talkback function being set, performing a function corresponding to received user input in response to receipt of the user input which may be a multi-tap touch.

Further, the method for performing the function of the display apparatus may additionally include generating different haptic vibrations in response to a user input depending on the edge area where the user input is received.

Further, the method for performing the function of the display apparatus may additionally include highlighting the object, in response to a user input, which may be a one tap touch, being received with respect to an object displayed on the screen.

Further, the method for performing the function of the display apparatus may additionally include outputting a haptic vibration, in response to a user input being received on an item at a preset location on the screen among the plurality of items of the menu.

Further, according to the method for performing the function of the display apparatus, the edge area of the screen may include a corner area of the screen.

The edge area of the screen may include a center of any side of the screen, and a talkback function may be set in response to a user input which may be a multi-tap touch received with respect to the edge area.

The edge area may additionally include a side location of the screen that corresponds to at least one of a home button and a speaker of the display apparatus.

Further, the method for performing the function of the display apparatus may additionally include displaying a guide object in representation of the menu type on the edge area of the screen, and removing the displayed guide object from the screen in response to a user input which may be a preset touch gesture received to the screen.

Further, the edge area of the screen may be a center of any side of the screen and in response to a user input which may be a multi-tap touch received on the edge area, a function corresponding to the received user input may be performed, and the function may vary depending on the number of taps of the multi-tap touch.

Figure 30:
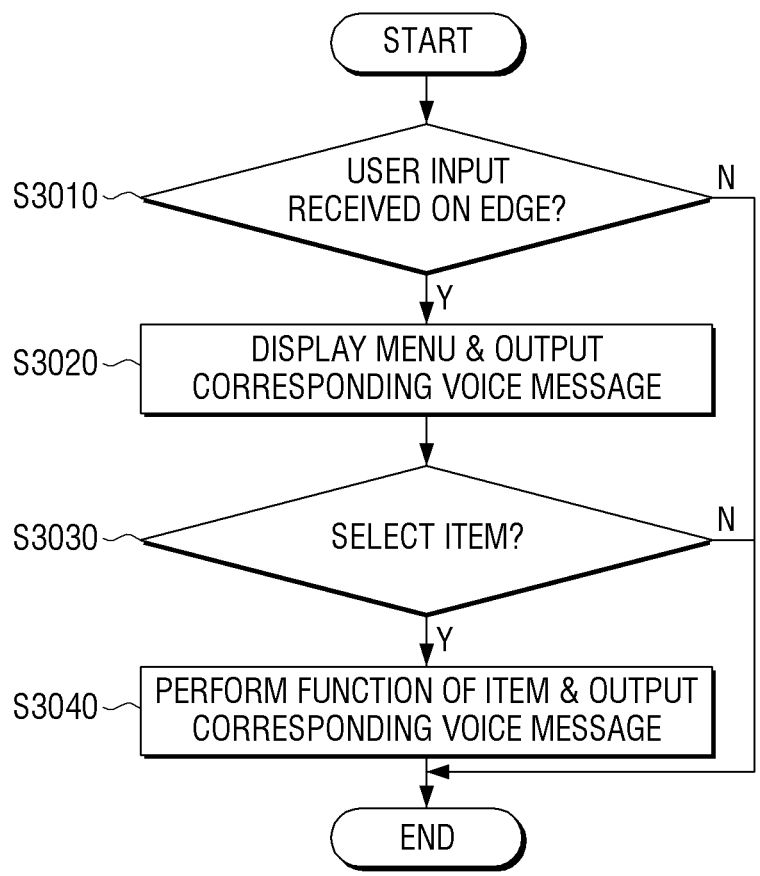

Referring to FIG. 30, a method for performing a function of a display apparatus according to another exemplary embodiment may include receiving a user input on an edge area at S3010-Y, displaying a menu on the screen and outputting a corresponding voice message, at S3020. The method may include selecting an item from the menu at S3030-Y, performing a function corresponding to the selected item and outputting a corresponding voice message, at S3040. The edge area of the screen may include at least two different edge areas and a displayed menu on the screen may vary depending on a location where the user input is received.

According to the method for performing the function of the display apparatus in one exemplary embodiment, the displaying the menu on the screen may include varying a plurality of items of the menu at preset time intervals, as long as the touch input is received on the edge area.

Figure 31:
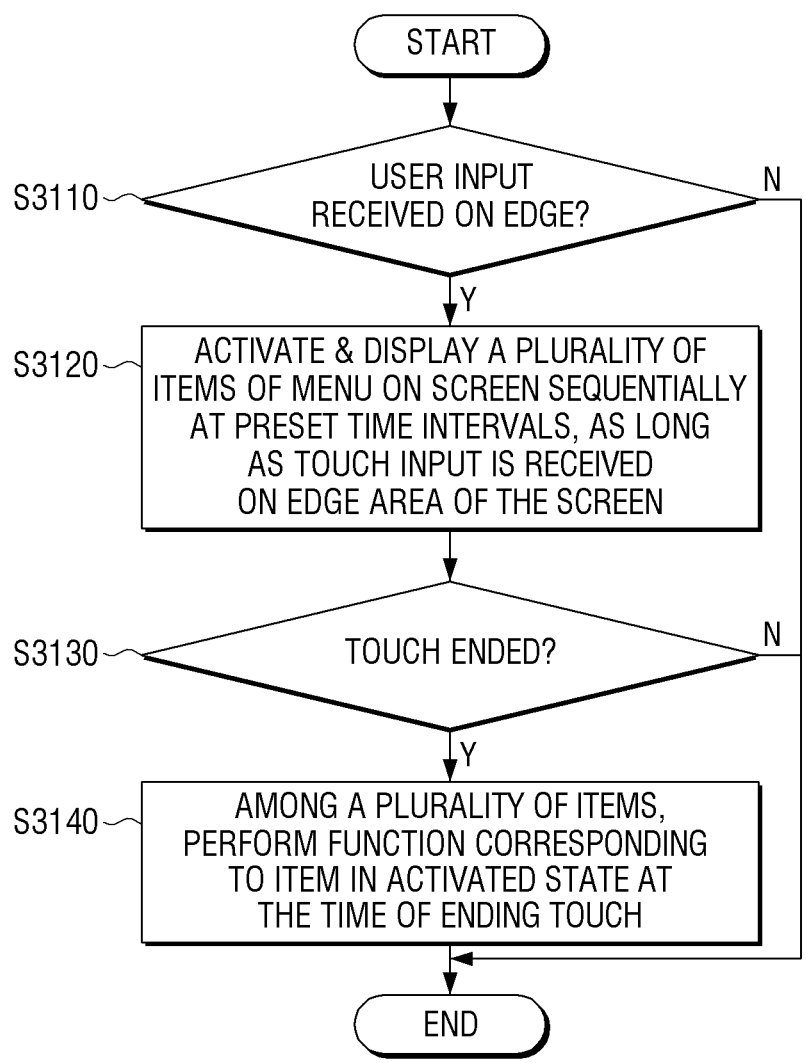

Referring to FIG. 31, a method for performing a function of a display apparatus according to another embodiment may include receiving a user input on an edge area at (S3110-Y), and activating and displaying a plurality of menu items on the screen, activating and deactivating the plurality of menu items, sequentially at preset time intervals, as long as the touch input is received on the edge area of the screen (S3120). When the touch has ended (S3130-Y), the method may include performing a function of an item that was in the activated state at the time of ending the touch input, among the plurality of items (S3140).

Figure 32:
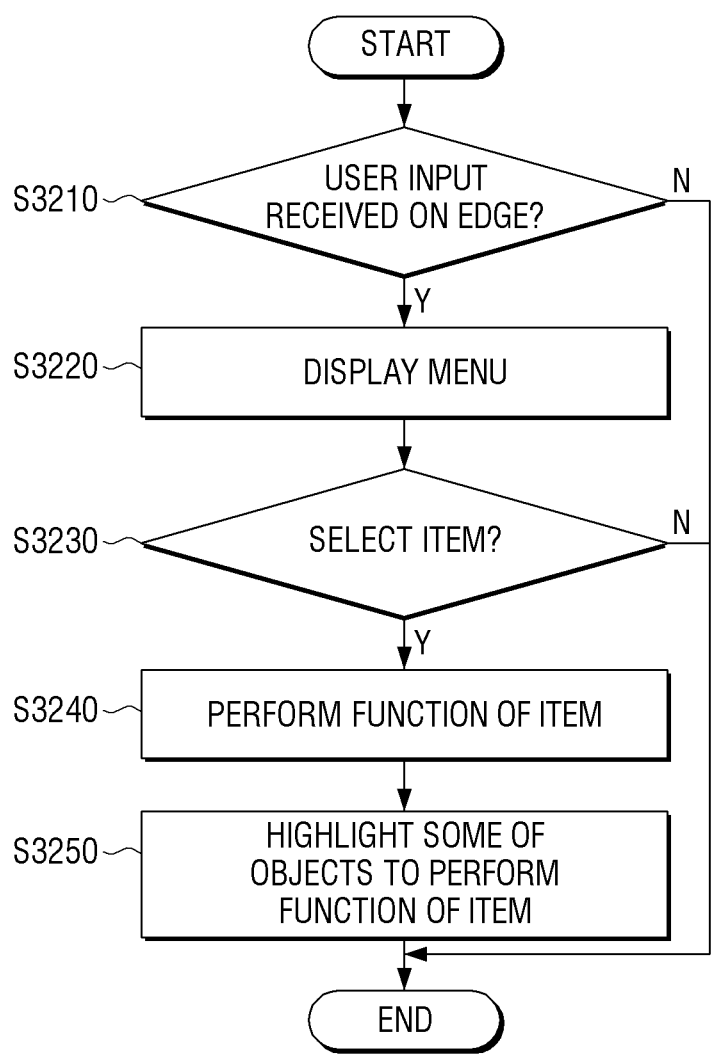

Referring to FIG. 32, a method for performing a function of a display apparatus according to another exemplary embodiment may include receiving a user input on an edge area of the screen at S3210-Y, and displaying a menu on the screen at S3220. When an item is selected from the menu at S3230-Y, the method may include performing a function corresponding to the selected item, at S3240. Further, the method may include highlighting part of the objects provided to perform the function of the item. The edge area of the screen may include at least two different edge areas and a displayed menu on the screen may vary depending on a location where the user input is received.

The method for performing the function of the display apparatus may additionally include generating different haptic feedbacks, in response to receipt of user inputs to different edge areas.

Further, the performing the function corresponding to the selected item may additionally include activating an item at a preset location among the displayed menu, and selecting the activated item in response to a receipt of a double tap input on the screen.

Figure 33:
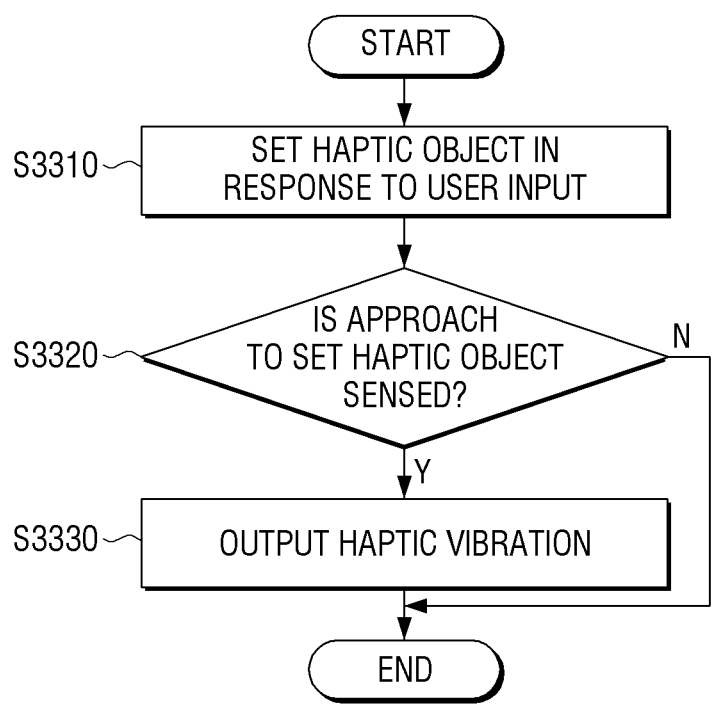

Referring to FIG. 33, a method for performing a function of a display apparatus according to an exemplary embodiment may include setting a haptic object in response to user input at S3310, sensing approach input with respect to the haptic object as set at S3320-Y, and outputting a haptic vibration at S3330.

Further, the performing the function corresponding to the selected item may additionally include, in response to sensing an approaching input with respect to the set haptic object, outputting a voice message corresponding to the sensed approach input may be additionally included.

Figure 34:
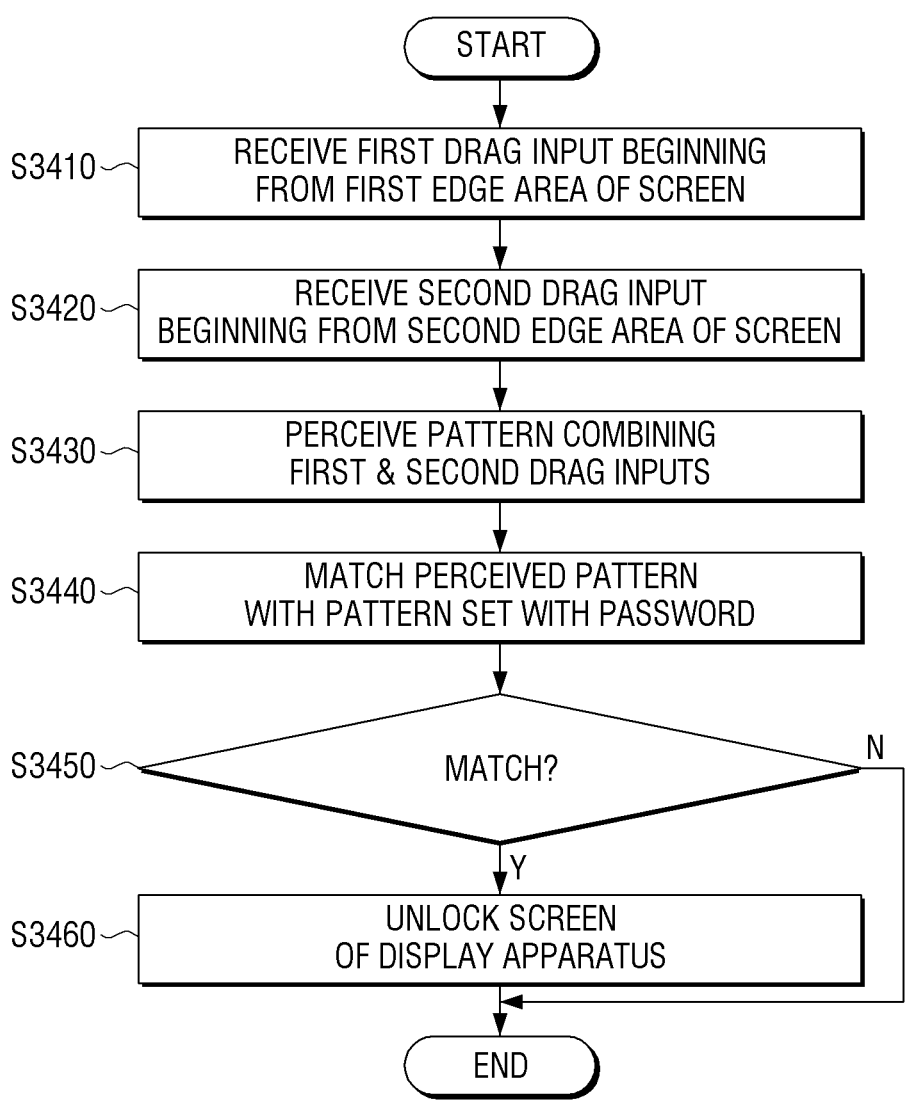

Referring to FIG. 34, a method for performing a function of a display apparatus according to an exemplary embodiment may include receiving a first drag input beginning from a first edge area of the screen at S3410, receiving a second drag input beginning from a second edge area of the screen at S3420, perceiving a pattern combining the first and second drag inputs at S3430, matching the perceived pattern with a password pattern at S3440, determining if that the perceived pattern and the password pattern match at S3450-Y, and unlocking the screen of the display at S3460.

The first and second drag inputs may be upward and downward drag inputs, or leftward and rightward drag inputs to the screen.

Figure 35:
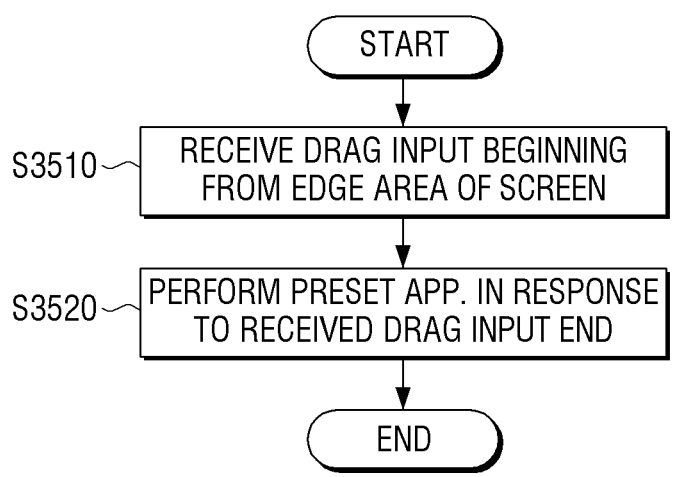

Referring to FIG. 35, a method for performing a function of a display apparatus according to an exemplary embodiment may include receiving a drag input beginning from an edge area of the screen at S3510, and executing a preset application in response to the received drag input, in which the preset application may vary depending on the edge area of the screen and drag direction of the received drag input.

The edge area of the screen may include a first corner area and a second corner area, and the executing the preset application may include, in response to receipt of a drag input beginning from the first corner area, executing a phone book application, and in response of a drag input beginning from the second corner area, executing a schedule application.

Further, the method for performing function of the display apparatus may additionally include, in response to the receipt of a touch input for a preset time or longer on a corner area of the screen and with the screen of the display apparatus in a locked state, displaying relevant items to the information received at the display apparatus.

Further, the method for performing function of the display apparatus may additionally include, in response to ending of the touch input, removing the item displayed on the display and again displaying a screen lock image.

The relevant items to the information received at the display apparatus 100 may be at least one of message alarm information, call alarm information and e-mail alarm information.

Further, the relevant items to the information received at the display apparatus 100 may be associated with the data that is received from an external device to the display apparatus within a preset time period.

Further, the method for performing functions of the display apparatus may additionally include, in response to a touch on the displayed item or approach input, outputting a voice message or haptic vibration corresponding to the item.

Figure 36:
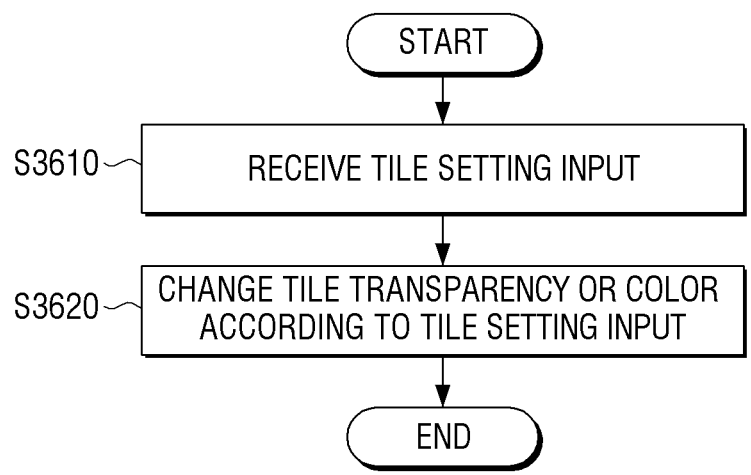

Further, referring to FIG. 36, a method for performing functions of the display apparatus according to another exemplary embodiment includes receiving tile setting input (S3610) and changing tile transparency or color according to tile setting input (S3620).

In addition, the method for performing functions of the display apparatus may include setting a tile text background according to the tile setting input. Details of each step have been described above.

Meanwhile, the method for performing functions of the display apparatus may be stored in a computer-readable non-transitory recording media in a form of program. The non-transitory readable media refer to those that are readable by an electronic apparatus and that are capable of storing data semi-permanently, rather than those such as register, cache that store data for a short period of time. For example, the non-transitory readable media may include CD, DVD, hard disk, Blu-ray disk, USB, memory card or ROM.

Further, the method for performing function of the display apparatus may be imbedded in a hardware IC, in a form of imbedded software such as FPGA, and may be provided as part of the display apparatus 100 described above.

In various exemplary embodiments, a more intuitive user experience is provided by utilizing physical elements and reference points of the apparatus, and an interface becomes more accessible by utilization of fixed locations such as corners or edges. Further, it is possible to shift between menus because beginning and ending reference points for menu change are provided. Furthermore, easier ways of manipulation are provided, and it is possible to quickly execute main functions. It is also possible to access frequently-used functions and when the functions are executed, simple process is provided and can be implemented in response to simple gesture. Further, visually-impaired users can be provided with increased security.

The foregoing exemplary embodiments and advantages are merely exemplary and are not to be construed as limiting the exemplary embodiments. The present teaching can be readily applied to other types of apparatuses and methods. Also, the description of the exemplary embodiments is intended to be illustrative, and not to limit the scope of the claims.

What is claimed is:

1. A method for performing a function of a display apparatus, comprising:
displaying, in response to a touch input being received on an edge area of a screen of the display apparatus, a menu comprising a plurality of application icons on the edge area;
generating, in response to the touch input being received, a haptic vibration;
while the touch input is maintained at a same location, the plurality of application icons are sequentially activated at a preset time interval, a currently-activated application icon is displayed at a center of the menu, an enlarged image of the currently-activated application icon is displayed at a center of the screen, and a voice message corresponding to the currently-activated application icon is outputted through a speaker; and
performing, in response to a release of the touch input, a function corresponding to the enlarge image of the currently-activated application icon,
wherein the menu displays different application icons according to a position of the touch input at the edge area, and
wherein the generating comprises generating different haptic vibrations according to the position of the touch input at the edge area.

2. The method of claim 1, wherein the touch input is a first touch input, and the method further comprises performing, with a talkback function being set, a function corresponding to a second touch input, and
wherein the second touch input comprises a multi-tap touch.

3. The method of claim 1, wherein the generating comprises generating the haptic vibration in response to the enlarged image of the currently-activated application icon being displayed at the center of the screen.

4. The method of claim 1, wherein the edge area comprises a corner area of the screen.

5. The method of claim 4, wherein the touch input is a first touch input, and the method further comprises setting, in response to a second touch input of a multi-tap touch being received with respect to the edge area, a talkback function.

6. The method of claim 1, wherein the edge area comprises a side location of the screen corresponding to at least one of a home button and the speaker of the display apparatus.

7. The method of claim 1, wherein the touch input is a first touch input, and the method further comprises:
displaying, on at least one edge area among a plurality of edge areas of the screen, a guide object corresponding to the displayed menu corresponding to the at least one edge area among the plurality of edge areas; and
removing the displayed guide object from the screen in response to a second touch input.

8. The method of claim 1,
wherein the touch input is a first touch input, and the method further comprises:
performing, in response to a second touch input of a multi-tap touch received with respect to at least one edge area among a plurality of edge areas, a function corresponding to the second touch input, wherein the at least one edge area among the plurality of edge areas of the screen comprises a center area of a side of the screen, and wherein the function corresponding to the second touch input is determined based on a number of taps of the multi-tap touch.

* * * * *